United States Patent
Bueche, Jr.

(10) Patent No.: US 11,900,755 B1
(45) Date of Patent: Feb. 13, 2024

(54) SYSTEM, COMPUTING DEVICE, AND METHOD FOR DOCUMENT DETECTION AND DEPOSIT PROCESSING

(71) Applicant: United Services Automobile Association (USAA), San Antonio, TX (US)

(72) Inventor: Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 312 days.

(21) Appl. No.: 17/107,050

(22) Filed: Nov. 30, 2020

(51) Int. Cl.
| | |
|---|---|
| G07D 7/20 | (2016.01) |
| G06T 7/13 | (2017.01) |
| G06T 5/00 | (2006.01) |
| G06N 20/00 | (2019.01) |
| G06Q 20/04 | (2012.01) |
| G06T 7/194 | (2017.01) |

(52) U.S. Cl.
CPC .......... *G07D 7/2016* (2013.01); *G06N 20/00* (2019.01); *G06Q 20/042* (2013.01); *G06T 5/002* (2013.01); *G06T 7/13* (2017.01); *G06T 7/194* (2017.01)

(58) Field of Classification Search
CPC ......... G06T 7/2016; G06T 7/194; G06T 7/13; G06T 5/002; G06N 20/00; G06Q 20/042
USPC ....................................................... 382/137
See application file for complete search history.

(56) References Cited

U.S. PATENT DOCUMENTS

| | | | |
|---|---|---|---|
| 1,748,489 | A | 2/1930 | McCarthy et al. |
| 2,292,825 | A | 8/1942 | Dilks et al. |
| 3,005,282 | A | 10/1961 | Christiansen |
| 3,341,820 | A | 9/1967 | Grillmeier, Jr. et al. |
| 3,576,972 | A | 5/1971 | Wood |
| 3,593,913 | A | 7/1971 | Bremer |
| 3,620,553 | A | 11/1971 | Donovan |

(Continued)

FOREIGN PATENT DOCUMENTS

| | | |
|---|---|---|
| CA | 2619884 | 3/2007 |
| CN | 1897644 A | 1/2007 |

(Continued)

OTHER PUBLICATIONS

"Accept "Customer Not Present"Checks," Accept Check Online, http://checksoftware.com, cited in U.S. Pat. No. 7,900,822, as dated 2007 (1 pg).

(Continued)

*Primary Examiner* — Gabriel I Garcia
(74) *Attorney, Agent, or Firm* — Crowell & Moring LLP

(57) ABSTRACT

An image of a check is captured by an imaging device and processing of the digital image of the check for deposit at a remote server may be accomplished with a downloaded software application on a portable computing device associated with the imaging device. The downloaded application may include one or more trained machine learning models for processing the captured image. The portable computing device may utilize deterministic algorithms for certain image processing tasks and machine learning models for others. The selection between machine learning and deterministic processing may be made locally on the portable device or in response to instructions from an institution server to use a particular processing method.

20 Claims, 14 Drawing Sheets

(56) References Cited

U.S. PATENT DOCUMENTS

| | | |
|---|---|---|
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,027,142 A | 5/1977 | Paup et al. |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,346,442 A | 8/1982 | Musmanno |
| 4,417,136 A | 11/1983 | Rushby et al. |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldston |
| 4,640,413 A | 2/1987 | Kaplan |
| 4,644,144 A | 2/1987 | Chandek |
| 4,722,444 A | 2/1988 | Murphy et al. |
| 4,722,544 A | 2/1988 | Weber |
| 4,727,435 A | 2/1988 | Otani |
| 4,737,911 A | 4/1988 | Freeman |
| 4,739,411 A | 4/1988 | Bolton |
| 4,774,574 A | 9/1988 | Daly et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,896,363 A | 1/1990 | Taylor et al. |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,077,805 A | 12/1991 | Tan |
| 5,091,968 A | 2/1992 | Higgins et al. |
| 5,122,950 A | 6/1992 | Benton et al. |
| 5,134,564 A | 7/1992 | Dunn et al. |
| 5,146,606 A | 9/1992 | Grondalski |
| 5,157,620 A | 10/1992 | Shaar |
| 5,159,548 A | 10/1992 | Caslavka |
| 5,164,833 A | 11/1992 | Aoki |
| 5,175,682 A | 12/1992 | Higashiyama et al. |
| 5,187,750 A | 2/1993 | Behera |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,233,547 A | 8/1993 | Kapp et al. |
| 5,237,158 A | 8/1993 | Kern et al. |
| 5,237,159 A | 8/1993 | Stephens |
| 5,237,620 A | 8/1993 | Deaton et al. |
| 5,257,320 A | 10/1993 | Etherington et al. |
| 5,265,008 A | 11/1993 | Benton |
| 5,268,968 A | 12/1993 | Yoshida |
| 5,283,829 A | 2/1994 | Anderson |
| 5,321,816 A | 6/1994 | Rogan |
| 5,345,090 A | 9/1994 | Hludzinski |
| 5,347,302 A | 9/1994 | Simonoff |
| 5,350,906 A | 9/1994 | Brody |
| 5,373,550 A | 12/1994 | Campbell |
| 5,383,113 A | 1/1995 | Kight et al. |
| 5,419,588 A | 5/1995 | Wood |
| 5,422,467 A | 6/1995 | Graef |
| 5,444,616 A | 8/1995 | Nair et al. |
| 5,444,794 A | 8/1995 | Uhland, Sr. |
| 5,455,875 A | 10/1995 | Chevion et al. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,530,773 A | 6/1996 | Thompson |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,664,027 A | 9/1997 | Ittner |
| 5,668,897 A | 9/1997 | Stolfo |
| 5,673,320 A | 9/1997 | Ray et al. |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,761,686 A | 6/1998 | Bloomberg |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,848,185 A | 12/1998 | Koga et al. |
| 5,859,935 A | 1/1999 | Johnson et al. |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,889,884 A | 3/1999 | Hashimoto et al. |
| 5,890,141 A | 3/1999 | Carney et al. |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,903,904 A | 5/1999 | Peairs |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,501 A | 7/1999 | Neil |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,005,623 A | 12/1999 | Takahashi |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,023,705 A | 2/2000 | Bellinger et al. |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,059,185 A | 5/2000 | Funk et al. |
| 6,064,753 A | 5/2000 | Bolle et al. |
| 6,064,762 A | 5/2000 | Haenel |
| 6,072,941 A | 6/2000 | Suzuki et al. |
| 6,073,119 A | 6/2000 | Borenmisza-Wahr |
| 6,073,121 A | 6/2000 | Ramzy |
| 6,085,168 A | 7/2000 | Mori |
| 6,086,708 A | 7/2000 | Colgate |
| 6,089,450 A | 7/2000 | Koeple |
| 6,089,610 A | 7/2000 | Greene |

(56) References Cited

U.S. PATENT DOCUMENTS

| | | |
|---|---|---|
| 6,092,047 A | 7/2000 | Hyman et al. |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,128,603 A | 10/2000 | Dent et al. |
| 6,141,339 A | 10/2000 | Kaplan et al. |
| 6,145,738 A | 11/2000 | Stinson et al. |
| 6,148,102 A | 11/2000 | Stolin |
| 6,149,056 A | 11/2000 | Stinson et al. |
| 6,151,409 A | 11/2000 | Chen et al. |
| 6,151,423 A | 11/2000 | Melen |
| 6,151,426 A | 11/2000 | Lee |
| 6,159,585 A | 12/2000 | Rittenhouse |
| 6,170,744 B1 | 1/2001 | Lee |
| 6,178,270 B1 | 1/2001 | Taylor et al. |
| 6,178,409 B1 | 1/2001 | Weber et al. |
| 6,181,837 B1 | 1/2001 | Cahill et al. |
| 6,188,506 B1 | 2/2001 | Kaiserman |
| 6,189,785 B1 | 2/2001 | Lowery |
| 6,192,165 B1 | 2/2001 | Irons |
| 6,195,452 B1 | 2/2001 | Royer |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,523 B1 | 8/2001 | Tedesco et al. |
| 6,282,826 B1 | 9/2001 | Richards |
| 6,289,178 B1 | 9/2001 | Kazami |
| 6,293,469 B1 | 9/2001 | Masson et al. |
| 6,304,860 B1 | 10/2001 | Martin |
| 6,310,647 B1 | 10/2001 | Parulski et al. |
| 6,314,452 B1 | 11/2001 | Dekel |
| 6,315,195 B1 | 11/2001 | Ramachandrun |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,339,766 B1 | 1/2002 | Gephart |
| 6,351,553 B1 | 2/2002 | Hayosh |
| 6,351,735 B1 | 2/2002 | Deaton et al. |
| 6,354,490 B1 | 3/2002 | Weiss et al. |
| 6,363,162 B1 | 3/2002 | Moed et al. |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-Chu |
| 6,450,403 B1 | 9/2002 | Martens et al. |
| 6,463,220 B1 | 10/2002 | Dance et al. |
| 6,464,134 B1 | 10/2002 | Page |
| 6,469,745 B1 | 10/2002 | Yamada et al. |
| 6,470,325 B1 | 10/2002 | Leemhuis |
| 6,473,519 B1 | 10/2002 | Pidhirny et al. |
| 6,502,747 B1 | 1/2003 | Stoutenburg et al. |
| 6,505,178 B1 | 1/2003 | Flenley |
| 6,546,119 B2 | 4/2003 | Ciolli et al. |
| 6,564,380 B1 | 5/2003 | Murphy |
| 6,574,377 B1 | 6/2003 | Cahill et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,647,136 B2 | 11/2003 | Jones et al. |
| 6,654,487 B1 | 11/2003 | Downs, Jr. |
| 6,661,910 B2 | 12/2003 | Jones et al. |
| 6,668,372 B1 | 12/2003 | Wu |
| 6,669,086 B2 | 12/2003 | Abdi et al. |
| 6,672,452 B1 | 1/2004 | Alves |
| 6,682,452 B2 | 1/2004 | Quintus |
| 6,695,204 B1 | 2/2004 | Stinson |
| 6,697,091 B1 | 2/2004 | Rzepkowski et al. |
| 6,704,039 B2 | 3/2004 | Pena |
| 6,711,474 B1 | 3/2004 | Treyz et al. |
| 6,726,097 B2 | 4/2004 | Graef |
| 6,728,397 B2 | 4/2004 | McNeal |
| 6,738,087 B2 | 5/2004 | Belkin et al. |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss et al. |
| 6,760,414 B1 | 7/2004 | Schurko et al. |
| 6,760,470 B1 | 7/2004 | Bogosian et al. |
| 6,763,226 B1 | 7/2004 | McZeal |
| 6,781,962 B1 | 8/2004 | Williams |
| 6,786,398 B1 | 9/2004 | Stinson et al. |
| 6,789,054 B1 | 9/2004 | Makhlouf |
| 6,796,489 B2 | 9/2004 | Slater et al. |
| 6,796,491 B2 | 9/2004 | Nakajima |
| 6,806,903 B1 | 10/2004 | Okisu et al. |
| 6,807,294 B2 | 10/2004 | Yamazaki |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,873,728 B2 | 3/2005 | Bernstein et al. |
| 6,883,140 B1 | 4/2005 | Acker |
| 6,898,314 B2 | 5/2005 | Kung et al. |
| 6,902,105 B2 | 6/2005 | Koakutsu |
| 6,910,023 B1 | 6/2005 | Schibi |
| 6,913,188 B2 | 7/2005 | Wong |
| 6,922,487 B2 | 7/2005 | Dance et al. |
| 6,930,718 B2 | 8/2005 | Parulski et al. |
| 6,931,255 B2 | 8/2005 | Mekuria |
| 6,931,591 B1 | 8/2005 | Brown |
| 6,934,719 B2 | 8/2005 | Nally |
| 6,044,773 A1 | 9/2005 | Abrahams |
| 6,944,773 B1 | 9/2005 | Abrahams |
| 6,947,610 B2 | 9/2005 | Sun |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,027,171 B1 | 4/2006 | Watanabe |
| 7,028,886 B1 | 4/2006 | Maloney |
| 7,039,048 B1 | 5/2006 | Monta |
| 7,046,991 B2 | 5/2006 | Little |
| 7,051,001 B1 | 5/2006 | Slater |
| 7,058,036 B1 | 6/2006 | Yu |
| 7,062,099 B2 | 6/2006 | Li et al. |
| 7,062,456 B1 | 6/2006 | Riehl et al. |
| 7,062,768 B1 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |

(56) References Cited

U.S. PATENT DOCUMENTS

| | | |
|---|---|---|
| 7,116,446 B2 | 10/2006 | Maurer |
| 7,117,171 B1 | 10/2006 | Pollin |
| 7,120,461 B2 | 10/2006 | Cho |
| 7,131,571 B2 | 11/2006 | Swift et al. |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,185,805 B1 | 3/2007 | McShirley |
| 7,197,173 B2 | 3/2007 | Jones et al. |
| 7,200,255 B2 | 4/2007 | Jones |
| 7,204,412 B2 | 4/2007 | Foss, Jr. |
| 7,207,478 B1 | 4/2007 | Blackson et al. |
| 7,216,106 B1 | 5/2007 | Buchanan |
| 7,219,082 B2 | 5/2007 | Forte |
| 7,219,831 B2 | 5/2007 | Murata |
| 7,240,336 B1 | 7/2007 | Baker |
| 7,245,765 B2 | 7/2007 | Myers et al. |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,277,191 B2 | 10/2007 | Metcalfe et al. |
| 7,290,034 B2 | 10/2007 | Budd |
| 7,296,734 B2 | 11/2007 | Pliha |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,331,523 B2 | 2/2008 | Meier et al. |
| 7,336,813 B2 | 2/2008 | Prakash et al. |
| 7,343,320 B1 | 3/2008 | Treyz |
| 7,349,566 B2 | 3/2008 | Jones et al. |
| 7,349,585 B2 | 3/2008 | Li |
| 7,350,697 B2 | 4/2008 | Swift et al. |
| 7,356,505 B2 | 4/2008 | March |
| 7,369,713 B2 | 5/2008 | Suino |
| 7,377,425 B1 | 5/2008 | Ma |
| 7,379,978 B2 | 5/2008 | Anderson |
| 7,383,227 B2 | 6/2008 | Weinflash et al. |
| 7,385,631 B2 | 6/2008 | Maeno |
| 7,386,511 B2 | 6/2008 | Buchanan |
| 7,388,683 B2 | 6/2008 | Rodriguez et al. |
| 7,389,912 B2 | 6/2008 | Starrs |
| 7,391,897 B2 | 6/2008 | Jones et al. |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,419,093 B1 | 9/2008 | Blackson et al. |
| 7,421,107 B2 | 9/2008 | Lugg |
| 7,421,410 B1 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,460,700 B2 | 12/2008 | Tsunachima et al. |
| 7,461,779 B2 | 12/2008 | Ramachandran |
| 7,461,780 B2 | 12/2008 | Potts |
| 7,464,859 B1 | 12/2008 | Hawkins |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Statou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve et al. |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,568,615 B2 | 8/2009 | Corona et al. |
| 7,571,848 B2 | 8/2009 | Cohen |
| 7,577,614 B1 | 8/2009 | Warren et al. |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,609,889 B2 | 10/2009 | Guo et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,647,897 B2 | 1/2010 | Jones |
| 7,668,363 B2 | 2/2010 | Price |
| 7,672,022 B1 | 3/2010 | Fan |
| 7,672,940 B2 | 3/2010 | Viola |
| 7,676,409 B1 | 3/2010 | Ahmad |
| 7,680,732 B1 | 3/2010 | Davies et al. |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,714,778 B2 | 5/2010 | Dupray |
| 7,720,735 B2 | 5/2010 | Anderson et al. |
| 7,734,545 B1 | 6/2010 | Fogliano |
| 7,743,979 B2 | 6/2010 | Fredman |
| 7,753,268 B1 | 7/2010 | Robinson et al. |
| 7,761,358 B2 | 7/2010 | Craig et al. |
| 7,766,223 B1 | 8/2010 | Mello |
| 7,766,244 B1 | 8/2010 | Field |
| 7,769,650 B2 | 8/2010 | Bleunven |
| 7,778,457 B2 | 8/2010 | Nepomniachtchi et al. |
| 7,792,752 B1 | 9/2010 | Kay |
| 7,792,753 B1 | 9/2010 | Slater et al. |
| 7,793,833 B2 | 9/2010 | Yoon et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,865,384 B2 | 1/2011 | Anderson et al. |
| 7,865,425 B2 | 1/2011 | Waelbroeck |
| 7,873,200 B1 | 1/2011 | Oakes, III et al. |
| 7,873,556 B1 | 1/2011 | Dolan |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,895,054 B2 | 2/2011 | Slen et al. |
| 7,896,232 B1 | 3/2011 | Prasad et al. |

(56) References Cited

U.S. PATENT DOCUMENTS

| | | |
|---|---|---|
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,935,441 B2 | 5/2011 | Tononishi |
| 7,949,587 B1 | 5/2011 | Morris et al. |
| 7,950,698 B2 | 5/2011 | Popadic et al. |
| 7,953,441 B2 | 5/2011 | Lors |
| 7,958,053 B2 | 6/2011 | Stone |
| 7,962,411 B1 | 6/2011 | Prasad et al. |
| 7,970,677 B1 | 6/2011 | Oakes, III et al. |
| 7,974,869 B1 | 7/2011 | Sharma |
| 7,974,899 B1 | 7/2011 | Prasad et al. |
| 7,978,900 B2 | 7/2011 | Nepomniachtchi et al. |
| 7,979,326 B2 | 7/2011 | Kurushima |
| 7,987,231 B2 | 7/2011 | Karkanias |
| 7,996,312 B1 | 8/2011 | Beck et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,000,514 B2 | 8/2011 | Nepomniachtchi et al. |
| 8,001,051 B1 | 8/2011 | Smith et al. |
| 8,009,931 B2 | 8/2011 | Li |
| 8,045,784 B2 | 10/2011 | Price et al. |
| 8,046,301 B1 | 10/2011 | Smith et al. |
| 8,051,453 B2 | 11/2011 | Arseneau et al. |
| 8,060,442 B1 | 11/2011 | Hecht et al. |
| 8,064,729 B2 | 11/2011 | Li |
| 8,065,307 B2 | 11/2011 | Haslam et al. |
| 8,091,778 B1 | 1/2012 | Block et al. |
| 8,106,956 B2 | 1/2012 | Nikkanen |
| 8,116,533 B2 | 2/2012 | Kiplinger et al. |
| 8,118,654 B1 | 2/2012 | Nicolas |
| 8,131,636 B1 | 3/2012 | Viera et al. |
| 8,159,520 B1 | 4/2012 | Dhanoa |
| 8,203,640 B2 | 6/2012 | Kim et al. |
| 8,204,293 B2 | 6/2012 | Csulits et al. |
| 8,235,284 B1 | 8/2012 | Prasad et al. |
| 8,266,076 B2 | 9/2012 | Lopez et al. |
| 8,271,385 B2 | 9/2012 | Emerson et al. |
| 8,290,237 B1 | 10/2012 | Burks et al. |
| 8,313,020 B2 | 11/2012 | Ramachandran |
| 8,320,657 B1 | 11/2012 | Burks et al. |
| 8,332,329 B1 | 12/2012 | Thiele |
| 8,341,077 B1 | 12/2012 | Nichols et al. |
| 8,351,677 B1 | 1/2013 | Oakes, III et al. |
| 8,351,678 B1 | 1/2013 | Medina, III |
| 8,358,826 B1 | 1/2013 | Medina et al. |
| 8,364,563 B2 | 1/2013 | Choiniere, Sr. |
| 8,369,650 B2 | 2/2013 | Zamfir et al. |
| 8,374,963 B1 | 2/2013 | Billman |
| 8,391,599 B1 | 3/2013 | Medina, III |
| 8,392,332 B1 | 3/2013 | Oakes et al. |
| 8,396,623 B2 | 3/2013 | Maeda et al. |
| 8,401,962 B1 | 3/2013 | Bent et al. |
| 8,422,758 B1 | 4/2013 | Bueche, Jr. |
| 8,433,127 B1 | 4/2013 | Harpel et al. |
| 8,433,647 B1 | 4/2013 | Yarbrough |
| 8,452,689 B1 | 5/2013 | Medina, III |
| RE44,274 E | 6/2013 | Popadic et al. |
| 8,464,933 B1 | 6/2013 | Prasad et al. |
| 8,483,473 B2 | 7/2013 | Roach |
| 8,531,518 B1 | 9/2013 | Zomet |
| 8,538,124 B1 | 9/2013 | Harpel et al. |
| 8,542,921 B1 | 9/2013 | Medina |
| 8,548,267 B1 | 10/2013 | Yacoub et al. |
| 8,559,766 B2 | 10/2013 | Tilt et al. |
| 8,582,862 B2 | 11/2013 | Nepomniachtchi et al. |
| 8,611,635 B1 | 12/2013 | Medina, III |
| 8,660,952 B1 | 2/2014 | Viera et al. |
| 8,688,579 B1 | 4/2014 | Ethington et al. |
| 8,699,779 B1 | 4/2014 | Prasad et al. |
| 8,708,227 B1 | 4/2014 | Oakes, III et al. |
| 8,731,321 B2 | 5/2014 | Fujiwara et al. |
| 8,732,081 B1 | 5/2014 | Oakes, III et al. |
| 8,751,345 B1 | 6/2014 | Borzych et al. |
| 8,751,356 B1 | 6/2014 | Garcia |
| 8,751,379 B1 | 6/2014 | Bueche, Jr. |
| 8,768,038 B1 | 7/2014 | Sherman et al. |
| 8,768,836 B1 | 7/2014 | Acharya |
| 8,799,147 B1 | 8/2014 | Walls et al. |
| 8,818,033 B1 | 8/2014 | Liu |
| 8,824,772 B2 | 9/2014 | Viera |
| 8,837,806 B1 | 9/2014 | Ethington et al. |
| 8,843,405 B1 | 9/2014 | Hartman et al. |
| 8,929,640 B1 | 1/2015 | Mennie et al. |
| 8,959,033 B1 | 2/2015 | Oakes, III et al. |
| 8,977,571 B1 | 3/2015 | Bueche, Jr. et al. |
| 8,990,862 B1 | 3/2015 | Smith |
| 9,009,071 B1 | 4/2015 | Watson et al. |
| 9,036,040 B1 | 5/2015 | Danko |
| 9,058,512 B1 | 6/2015 | Medina, III |
| 9,064,284 B1 | 6/2015 | Janiszeski et al. |
| 9,129,340 B1 | 9/2015 | Medina, III et al. |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,195,986 B2 | 11/2015 | Christy et al. |
| 9,224,136 B1 | 12/2015 | Oakes, III et al. |
| 9,235,860 B1 | 1/2016 | Boucher et al. |
| 9,270,804 B2 | 2/2016 | Dees et al. |
| 9,286,514 B1 | 3/2016 | Newman |
| 9,311,634 B1 | 4/2016 | Hildebrand |
| 9,336,517 B1 | 5/2016 | Prasad et al. |
| 9,384,409 B1 | 7/2016 | Ming |
| 9,387,813 B1 | 7/2016 | Moeller et al. |
| 9,390,339 B1 | 7/2016 | Danko |
| 9,401,011 B2 | 7/2016 | Medina, III et al. |
| 9,424,569 B1 | 8/2016 | Sherman et al. |
| 9,524,269 B1 | 12/2016 | Brinkmann et al. |
| 9,569,756 B1 | 2/2017 | Bueche, Jr. et al. |
| 9,613,467 B2 | 4/2017 | Roberts et al. |
| 9,613,469 B2 | 4/2017 | Fish et al. |
| 9,619,872 B1 | 4/2017 | Medina, III et al. |
| 9,626,183 B1 | 4/2017 | Smith et al. |
| 9,626,662 B1 | 4/2017 | Prasad et al. |
| 9,779,392 B1 | 10/2017 | Prasad et al. |
| 9,779,452 B1 | 10/2017 | Medina et al. |
| 9,785,929 B1 | 10/2017 | Watson et al. |
| 9,792,654 B1 | 10/2017 | Limas et al. |
| 9,818,090 B1 | 11/2017 | Bueche, Jr. et al. |
| 9,824,453 B1 | 11/2017 | Collins |
| 9,886,642 B1 | 2/2018 | Danko |
| 9,892,454 B1 | 2/2018 | Pollack et al. |
| 9,898,778 B1 | 2/2018 | Pollack et al. |
| 9,898,808 B1 | 2/2018 | Medina, III et al. |
| 9,904,848 B1 | 2/2018 | Newman |
| 9,946,923 B1 | 4/2018 | Medina |
| 10,013,605 B1 | 7/2018 | Oakes, III et al. |
| 10,013,681 B1 | 7/2018 | Oakes, III et al. |
| 10,157,326 B2 | 12/2018 | Long et al. |
| 10,181,087 B1 | 1/2019 | Danko |
| 10,210,767 B2 | 2/2019 | Johansen |
| 10,217,375 B2 | 2/2019 | Waldron |
| 10,235,660 B1 | 3/2019 | Bueche, Jr. et al. |
| 10,325,420 B1 | 6/2019 | Moon |
| 10,354,235 B1 | 7/2019 | Medina |
| 10,360,448 B1 | 7/2019 | Newman |
| 10,373,136 B1 | 8/2019 | Pollack et al. |
| 10,380,559 B1 | 8/2019 | Oakes, III et al. |
| 10,380,562 B1 | 8/2019 | Prasad et al. |
| 10,380,565 B1 | 8/2019 | Prasad |
| 10,380,683 B1 | 8/2019 | Voutour et al. |
| 10,380,993 B1 | 8/2019 | Clauer Salyers |
| 10,402,638 B1 | 9/2019 | Oakes, III et al. |
| 10,402,790 B1 | 9/2019 | Clark et al. |
| 10,402,944 B1 | 9/2019 | Pribble et al. |
| 10,460,295 B1 | 10/2019 | Oakes, III et al. |
| 10,460,381 B1 | 10/2019 | Pollack et al. |
| 10,482,432 B1 | 11/2019 | Oakes, III et al. |
| 10,504,185 B1 | 12/2019 | Buentello |
| 10,521,781 B1 | 12/2019 | Singfield |
| 10,552,810 B1 | 2/2020 | Ethington et al. |
| 10,574,879 B1 | 2/2020 | Prasad et al. |

(56) References Cited

U.S. PATENT DOCUMENTS

| | | |
|---|---|---|
| 10,621,559 B1 | 4/2020 | Oakes, III et al. |
| 10,621,660 B1 | 4/2020 | Medina et al. |
| 10,706,466 B1 | 7/2020 | Ethington et al. |
| 10,713,629 B1 | 7/2020 | Medina, III |
| 10,719,815 B1 | 7/2020 | Oakes, III et al. |
| 10,769,598 B1 | 9/2020 | Oakes, III et al. |
| 10,769,603 B1 | 9/2020 | Prasad |
| 10,810,561 B1 | 10/2020 | Pollack et al. |
| 10,818,282 B1 | 10/2020 | Clauer Salyers |
| 10,839,358 B1 | 11/2020 | Prasad et al. |
| 10,846,667 B1 * | 11/2020 | Hecht .................. G06Q 20/322 |
| 10,848,665 B1 | 11/2020 | Prasad et al. |
| 10,855,914 B1 | 12/2020 | Prasad et al. |
| 10,896,408 B1 | 1/2021 | Prasad et al. |
| 10,915,879 B1 | 2/2021 | Pollack et al. |
| 10,956,728 B1 | 3/2021 | Voutour |
| 10,956,879 B1 | 3/2021 | Eidson et al. |
| 11,030,752 B1 * | 6/2021 | Backlund ............... G06V 30/40 |
| 11,042,940 B1 | 6/2021 | Limas |
| 11,042,941 B1 | 6/2021 | Limas |
| 11,062,130 B1 | 7/2021 | Medina, III |
| 11,062,131 B1 | 7/2021 | Medina, III |
| 11,062,283 B1 | 7/2021 | Prasad |
| 11,064,111 B1 | 7/2021 | Prasad |
| 11,068,976 B1 | 7/2021 | Voutour |
| 11,070,868 B1 | 7/2021 | Mortensen |
| 11,121,989 B1 | 9/2021 | Castinado |
| 11,182,753 B1 | 11/2021 | Oakes, III et al. |
| 11,222,315 B1 | 1/2022 | Prasad et al. |
| 11,232,517 B1 | 1/2022 | Medina et al. |
| 11,250,398 B1 | 2/2022 | Prasad et al. |
| 11,288,898 B1 | 3/2022 | Moon |
| 11,328,267 B1 | 5/2022 | Medina, III |
| 2001/0004235 A1 | 6/2001 | Maloney |
| 2001/0014881 A1 | 8/2001 | Drummond |
| 2001/0016084 A1 | 8/2001 | Pollard et al. |
| 2001/0018739 A1 | 8/2001 | Anderson |
| 2001/0020949 A1 | 9/2001 | Gong et al. |
| 2001/0027994 A1 | 10/2001 | Hayashida |
| 2001/0030695 A1 | 10/2001 | Prabhu et al. |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0051965 A1 | 12/2001 | Guillevic |
| 2001/0054020 A1 | 12/2001 | Barth et al. |
| 2002/0001393 A1 | 1/2002 | Jones |
| 2002/0013767 A1 | 1/2002 | Katz |
| 2002/0016763 A1 | 2/2002 | March |
| 2002/0016769 A1 | 2/2002 | Barbara et al. |
| 2002/0023055 A1 | 2/2002 | Antognini et al. |
| 2002/0025085 A1 | 2/2002 | Gustafson et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0040340 A1 | 4/2002 | Yoshida |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075380 A1 | 6/2002 | Seeger et al. |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0120582 A1 | 8/2002 | Elston et al. |
| 2002/0120846 A1 | 8/2002 | Stewart et al. |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138445 A1 | 9/2002 | Laage |
| 2002/0138522 A1 | 9/2002 | Muralidhar |
| 2002/0145035 A1 | 10/2002 | Jones |
| 2002/0147798 A1 | 10/2002 | Huang |
| 2002/0150279 A1 | 10/2002 | Scott |
| 2002/0150311 A1 | 10/2002 | Lynn |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0152170 A1 | 10/2002 | Dutta et al. |
| 2002/0153414 A1 | 10/2002 | Stoutenburg et al. |
| 2002/0154127 A1 | 10/2002 | Vienneau et al. |
| 2002/0154815 A1 | 10/2002 | Mizutani |
| 2002/0159648 A1 | 10/2002 | Alderson et al. |
| 2002/0169715 A1 | 11/2002 | Ruth et al. |
| 2002/0171820 A1 | 11/2002 | Okamura |
| 2002/0172516 A1 | 11/2002 | Aoyama |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0009420 A1 | 1/2003 | Jones |
| 2003/0015583 A1 | 1/2003 | Abdi et al. |
| 2003/0018897 A1 | 1/2003 | Bellis, Jr. et al. |
| 2003/0023557 A1 | 1/2003 | Moore |
| 2003/0026609 A1 | 2/2003 | Parulski |
| 2003/0038227 A1 | 2/2003 | Sesek |
| 2003/0046223 A1 | 3/2003 | Crawford |
| 2003/0050889 A1 | 3/2003 | Burke |
| 2003/0051138 A1 | 3/2003 | Maeda et al. |
| 2003/0053692 A1 | 3/2003 | Hong et al. |
| 2003/0055756 A1 | 3/2003 | Allan |
| 2003/0055776 A1 | 3/2003 | Samuelson |
| 2003/0072568 A1 | 4/2003 | Lin et al. |
| 2003/0074315 A1 | 4/2003 | Lam |
| 2003/0075596 A1 | 4/2003 | Koakutsu |
| 2003/0075916 A1 | 4/2003 | Gorski |
| 2003/0078883 A1 | 4/2003 | Stewart et al. |
| 2003/0081121 A1 | 5/2003 | Swan |
| 2003/0081824 A1 | 5/2003 | Mennie |
| 2003/0086615 A1 | 5/2003 | Dance et al. |
| 2003/0093367 A1 | 5/2003 | Allen-Rouman et al. |
| 2003/0093369 A1 | 5/2003 | Ijichi et al. |
| 2003/0097592 A1 | 5/2003 | Adusumilli |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0119478 A1 | 6/2003 | Nagy et al. |
| 2003/0126078 A1 | 7/2003 | Vihinen |
| 2003/0126082 A1 | 7/2003 | Omura et al. |
| 2003/0130940 A1 | 7/2003 | Hansen et al. |
| 2003/0130958 A1 | 7/2003 | Narayanan et al. |
| 2003/0132384 A1 | 7/2003 | Sugiyama et al. |
| 2003/0133608 A1 | 7/2003 | Bernstein et al. |
| 2003/0133610 A1 | 7/2003 | Nagarajan et al. |
| 2003/0135457 A1 | 7/2003 | Stewart et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0177448 A1 | 9/2003 | Levine et al. |
| 2003/0187790 A1 | 10/2003 | Swift et al. |
| 2003/0191615 A1 | 10/2003 | Bailey |
| 2003/0191869 A1 | 10/2003 | Williams |
| 2003/0200107 A1 | 10/2003 | Allen et al. |
| 2003/0200174 A1 | 10/2003 | Star |
| 2003/0202690 A1 | 10/2003 | Jones et al. |
| 2003/0212904 A1 | 11/2003 | Randle et al. |
| 2003/0213841 A1 | 11/2003 | Josephson et al. |
| 2003/0217005 A1 | 11/2003 | Drummond et al. |
| 2003/0218061 A1 | 11/2003 | Filatov |
| 2003/0225705 A1 | 12/2003 | Park et al. |
| 2003/0231285 A1 | 12/2003 | Ferguson |
| 2003/0233278 A1 | 12/2003 | Marshall |
| 2003/0233318 A1 | 12/2003 | King et al. |
| 2004/0010466 A1 | 1/2004 | Anderson |

(56) References Cited

U.S. PATENT DOCUMENTS

| | | |
|---|---|---|
| 2004/0010803 A1 | 1/2004 | Berstis |
| 2004/0012496 A1 | 1/2004 | De Souza |
| 2004/0012679 A1 | 1/2004 | Fan |
| 2004/0013284 A1 | 1/2004 | Yu |
| 2004/0017482 A1 | 1/2004 | Weitman |
| 2004/0024626 A1 | 2/2004 | Bruijning |
| 2004/0024708 A1 | 2/2004 | Masuda |
| 2004/0029591 A1 | 2/2004 | Chapman et al. |
| 2004/0030741 A1 | 2/2004 | Wolton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0061913 A1 | 4/2004 | Takiguchi |
| 2004/0066031 A1 | 4/2004 | Wong |
| 2004/0066419 A1 | 4/2004 | Pyhalammi |
| 2004/0069841 A1 | 4/2004 | Wong |
| 2004/0071333 A1 | 4/2004 | Douglas et al. |
| 2004/0075754 A1 | 4/2004 | Nakajima et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0133516 A1 | 7/2004 | Buchanan et al. |
| 2004/0136586 A1 | 7/2004 | Okamura |
| 2004/0138974 A1 | 7/2004 | Shimamura |
| 2004/0148235 A1 | 7/2004 | Craig et al. |
| 2004/0158549 A1 | 8/2004 | Matena |
| 2004/0165096 A1 | 8/2004 | Maeno |
| 2004/0170259 A1 | 9/2004 | Park |
| 2004/0171371 A1 | 9/2004 | Paul |
| 2004/0184766 A1 | 9/2004 | Kim et al. |
| 2004/0193878 A1 | 9/2004 | Dillinger et al. |
| 2004/0201695 A1 | 10/2004 | Inasaka |
| 2004/0201741 A1 | 10/2004 | Ban |
| 2004/0202349 A1 | 10/2004 | Erol et al. |
| 2004/0205459 A1 | 10/2004 | Green |
| 2004/0210515 A1 | 10/2004 | Hughes |
| 2004/0210523 A1 | 10/2004 | Gains et al. |
| 2004/0217170 A1 | 11/2004 | Takiguchi et al. |
| 2004/0225604 A1 | 11/2004 | Foss, Jr. et al. |
| 2004/0228277 A1 | 11/2004 | Williams |
| 2004/0236647 A1 | 11/2004 | Acharya |
| 2004/0236688 A1 | 11/2004 | Bozeman |
| 2004/0238619 A1 | 12/2004 | Nagasaka et al. |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267665 A1 | 12/2004 | Nam et al. |
| 2004/0267666 A1 | 12/2004 | Minami |
| 2005/0001421 A1 | 1/2005 | Luth et al. |
| 2005/0001924 A1 | 1/2005 | Honda |
| 2005/0010108 A1 | 1/2005 | Rahn et al. |
| 2005/0015332 A1 | 1/2005 | Chen |
| 2005/0015341 A1 | 1/2005 | Jackson |
| 2005/0015342 A1 | 1/2005 | Murata |
| 2005/0021466 A1 | 1/2005 | Buchanan et al. |
| 2005/0030388 A1 | 2/2005 | Stavely et al. |
| 2005/0033645 A1 | 2/2005 | Duphily |
| 2005/0033685 A1 | 2/2005 | Reyes |
| 2005/0033690 A1 | 2/2005 | Antognini et al. |
| 2005/0033695 A1 | 2/2005 | Minowa |
| 2005/0034046 A1 | 2/2005 | Berkmann |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0077351 A1 | 4/2005 | De Jong |
| 2005/0078192 A1 | 4/2005 | Sakurai |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0100216 A1 | 5/2005 | Myers et al. |
| 2005/0102208 A1 | 5/2005 | Gudgeon |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0128333 A1 | 6/2005 | Park |
| 2005/0131820 A1 | 6/2005 | Rodriguez |
| 2005/0133586 A1 | 6/2005 | Rekeweg et al. |
| 2005/0143136 A1 | 6/2005 | Lev et al. |
| 2005/0144131 A1 | 6/2005 | Aziz |
| 2005/0149436 A1 | 7/2005 | Elterich |
| 2005/0157174 A1 | 7/2005 | Kitamura et al. |
| 2005/0165641 A1 | 7/2005 | Chu |
| 2005/0168566 A1 | 8/2005 | Tada |
| 2005/0171899 A1 | 8/2005 | Dunn |
| 2005/0171907 A1 | 8/2005 | Lewis |
| 2005/0177494 A1 | 8/2005 | Kelly et al. |
| 2005/0177499 A1 | 8/2005 | Thomas |
| 2005/0177510 A1 | 8/2005 | Hilt et al. |
| 2005/0177518 A1 | 8/2005 | Brown |
| 2005/0182710 A1 | 8/2005 | Andersson et al. |
| 2005/0188306 A1 | 8/2005 | Mackenzie |
| 2005/0190269 A1 | 9/2005 | Grignani |
| 2005/0198364 A1 | 9/2005 | David del Val et al. |
| 2005/0203430 A1 | 9/2005 | Williams et al. |
| 2005/0205660 A1 | 9/2005 | Munte |
| 2005/0205661 A1 | 9/2005 | Taylor |
| 2005/0209961 A1 | 9/2005 | Michelsen |
| 2005/0213805 A1 | 9/2005 | Blake et al. |
| 2005/0216409 A1 | 9/2005 | McMonagle et al. |
| 2005/0216410 A1 | 9/2005 | Davis et al. |
| 2005/0218209 A1 | 10/2005 | Heilper et al. |
| 2005/0220324 A1 | 10/2005 | Klein et al. |
| 2005/0228733 A1 | 10/2005 | Bent et al. |
| 2005/0238257 A1 | 10/2005 | Kaneda et al. |
| 2005/0244035 A1 | 11/2005 | Klein et al. |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0273430 A1 | 12/2005 | Pliha |
| 2005/0278250 A1 | 12/2005 | Zair |
| 2005/0281448 A1 | 12/2005 | Lugg |
| 2005/0281450 A1 | 12/2005 | Richardson |
| 2005/0281471 A1 | 12/2005 | LeComte |
| 2005/0281474 A1 | 12/2005 | Huang |
| 2005/0289030 A1 | 12/2005 | Smith |
| 2005/0289059 A1 | 12/2005 | Brewington et al. |
| 2005/0289182 A1 | 12/2005 | Pandian et al. |
| 2006/0002426 A1 | 1/2006 | Madour |
| 2006/0004660 A1 | 1/2006 | Pranger |
| 2006/0015450 A1 | 1/2006 | Guck et al. |
| 2006/0015733 A1 | 1/2006 | O'Malley et al. |

(56) References Cited

U.S. PATENT DOCUMENTS

| | | |
|---|---|---|
| 2006/0017752 A1 | 1/2006 | Kurzweil et al. |
| 2006/0025697 A1 | 2/2006 | Kurzweil |
| 2006/0026140 A1 | 2/2006 | King |
| 2006/0039628 A1 | 2/2006 | Li et al. |
| 2006/0039629 A1 | 2/2006 | Li et al. |
| 2006/0041506 A1 | 2/2006 | Mason et al. |
| 2006/0171697 A1 | 2/2006 | Nijima |
| 2006/0004537 A1 | 3/2006 | Kim et al. |
| 2006/0045321 A1 | 3/2006 | Yu |
| 2006/0045379 A1 | 3/2006 | Heaney, Jr. et al. |
| 2006/0047593 A1 | 3/2006 | Naratil |
| 2006/0049242 A1 | 3/2006 | Mejias et al. |
| 2006/0053056 A1 | 3/2006 | Alspach-Goss |
| 2006/0059085 A1 | 3/2006 | Tucker |
| 2006/0064368 A1 | 3/2006 | Forte |
| 2006/0071950 A1 | 4/2006 | Kurzweil et al. |
| 2006/0077941 A1 | 4/2006 | Alagappan et al. |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0103893 A1 | 5/2006 | Azimi et al. |
| 2006/0106691 A1 | 5/2006 | Sheaffer |
| 2006/0106717 A1 | 5/2006 | Randle |
| 2006/0108168 A1 | 5/2006 | Fischer et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124728 A1 | 6/2006 | Kotovich et al. |
| 2006/0124730 A1 | 6/2006 | Maloney |
| 2006/0144924 A1 | 7/2006 | Stover |
| 2006/0144937 A1 | 7/2006 | Heilper et al. |
| 2006/0144950 A1 | 7/2006 | Johnson |
| 2006/0152576 A1 | 7/2006 | Kiessling et al. |
| 2006/0159367 A1 | 7/2006 | Zeineh et al. |
| 2006/0161499 A1 | 7/2006 | Rich et al. |
| 2006/0161501 A1 | 7/2006 | Waserstein |
| 2006/0164682 A1 | 7/2006 | Lev |
| 2006/0166178 A1 | 7/2006 | Driedijk |
| 2006/0167818 A1 | 7/2006 | Wentker et al. |
| 2006/0181614 A1 | 8/2006 | Yen et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0202014 A1 | 9/2006 | VanKirk et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0210192 A1 | 9/2006 | Orhun |
| 2006/0212391 A1 | 9/2006 | Norman et al. |
| 2006/0212393 A1 | 9/2006 | Brown |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0221198 A1 | 10/2006 | Fry et al. |
| 2006/0221415 A1 | 10/2006 | Kawamoto |
| 2006/0222260 A1 | 10/2006 | Sambongi et al. |
| 2006/0229976 A1 | 10/2006 | Jung |
| 2006/0229986 A1 | 10/2006 | Corder |
| 2006/0229987 A1 | 10/2006 | Leekley |
| 2006/0238503 A1 | 10/2006 | Smith |
| 2006/0242062 A1 | 10/2006 | Peterson |
| 2006/0242063 A1 | 10/2006 | Peterson |
| 2006/0248009 A1 | 11/2006 | Hicks et al. |
| 2006/0249567 A1 | 11/2006 | Byrne |
| 2006/0255124 A1 | 11/2006 | Hoch |
| 2006/0270421 A1 | 11/2006 | Phillips |
| 2006/0273165 A1 | 12/2006 | Swift et al. |
| 2006/0274164 A1 | 12/2006 | Kimura et al. |
| 2006/0279628 A1 | 12/2006 | Fleming |
| 2006/0282383 A1 | 12/2006 | Doran |
| 2006/0289630 A1 | 12/2006 | Updike et al. |
| 2006/0291744 A1 | 12/2006 | Ikeda et al. |
| 2007/0002157 A1 | 1/2007 | Shintani et al. |
| 2007/0005467 A1 | 1/2007 | Haigh et al. |
| 2007/0013721 A1 | 1/2007 | Vau et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0030357 A1 | 2/2007 | Levien et al. |
| 2007/0030363 A1 | 2/2007 | Cheatle et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0058874 A1 | 3/2007 | Sunao et al. |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0116364 A1 | 5/2007 | Kleihorst et al. |
| 2007/0118472 A1 | 5/2007 | Allen-Rouman et al. |
| 2007/0118747 A1 | 5/2007 | Pintsov et al. |
| 2007/0122024 A1 | 5/2007 | Haas et al. |
| 2007/0124241 A1 | 5/2007 | Newton |
| 2007/0127805 A1 | 6/2007 | Foth et al. |
| 2007/0129955 A1 | 6/2007 | Dalmia |
| 2007/0130063 A1 | 6/2007 | Jindia |
| 2007/0131758 A1 | 6/2007 | Mejias et al. |
| 2007/0136078 A1 | 6/2007 | Plante |
| 2007/0136198 A1 | 6/2007 | Foth et al. |
| 2007/0138255 A1 | 6/2007 | Carreon et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0154098 A1 | 7/2007 | Geva et al. |
| 2007/0156438 A1 | 7/2007 | Popadic et al. |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0175977 A1 | 8/2007 | Bauer et al. |
| 2007/0179883 A1 | 8/2007 | Questembert |
| 2007/0183000 A1 | 8/2007 | Eisen et al. |
| 2007/0183652 A1 | 8/2007 | Backstrom et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polyon et al. |
| 2007/0206877 A1 | 9/2007 | Wu et al. |
| 2007/0208816 A1 | 9/2007 | Baldwin et al. |
| 2007/0214086 A1 | 9/2007 | Homoki |
| 2007/0217669 A1 | 9/2007 | Swift et al. |
| 2007/0233525 A1 | 10/2007 | Boyle |
| 2007/0233585 A1 | 10/2007 | Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0244811 A1 | 10/2007 | Tumminaro |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |

(56) References Cited

U.S. PATENT DOCUMENTS

| | | |
|---|---|---|
| 2007/0258634 A1 | 11/2007 | Simonoff |
| 2007/0262137 A1 | 11/2007 | Brown |
| 2007/0262148 A1 | 11/2007 | Yoon |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0010204 A1 | 1/2008 | Rackley III et al. |
| 2008/0013831 A1 | 1/2008 | Aoki |
| 2008/0021802 A1 | 1/2008 | Pendelton |
| 2008/0040280 A1 | 2/2008 | Davis et al. |
| 2008/0046362 A1 | 2/2008 | Easterly |
| 2008/0052182 A1 | 2/2008 | Marshall |
| 2008/0059376 A1 | 3/2008 | Davis |
| 2008/0062437 A1 | 3/2008 | Rizzo |
| 2008/0063253 A1 | 3/2008 | Wood |
| 2008/0065524 A1 | 3/2008 | Matthews et al. |
| 2008/0068674 A1 | 3/2008 | McIntyre |
| 2008/0069427 A1 | 3/2008 | Liu |
| 2008/0071679 A1 | 3/2008 | Foley |
| 2008/0071721 A1 | 3/2008 | Wang |
| 2008/0073423 A1 | 3/2008 | Heit et al. |
| 2008/0080760 A1 | 4/2008 | Ronca |
| 2008/0086420 A1 | 4/2008 | Gilder et al. |
| 2008/0086421 A1 | 4/2008 | Gilder |
| 2008/0086770 A1 | 4/2008 | Kulkarni et al. |
| 2008/0091599 A1 | 4/2008 | Foss, Jr. |
| 2008/0097899 A1 | 4/2008 | Jackson et al. |
| 2008/0097907 A1 | 4/2008 | Till et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0115066 A1 | 5/2008 | Pavley et al. |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0140552 A1 | 6/2008 | Blaikie |
| 2008/0140579 A1 | 6/2008 | Sanjiv |
| 2008/0147549 A1 | 6/2008 | Rathbun et al. |
| 2008/0155672 A1 | 6/2008 | v |
| 2008/0156438 A1 | 7/2008 | Stumphauzer et al. |
| 2008/0162319 A1 | 7/2008 | Breeden et al. |
| 2008/0162320 A1 | 7/2008 | Mueller et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0192129 A1 | 8/2008 | Walker |
| 2008/0205751 A1 | 8/2008 | Mischler |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder et al. |
| 2008/0249951 A1 | 10/2008 | Gilder et al. |
| 2008/0250196 A1 | 10/2008 | Mori |
| 2008/0262950 A1 | 10/2008 | Christensen et al. |
| 2008/0262953 A1 | 10/2008 | Anderson |
| 2008/0275821 A1 | 11/2008 | Bishop et al. |
| 2008/0301441 A1 | 12/2008 | Calman et al. |
| 2008/0304769 A1 | 12/2008 | Hollander et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0076921 A1 | 3/2009 | Nelson et al. |
| 2009/0092309 A1 | 4/2009 | Calman et al. |
| 2009/0094148 A1 | 4/2009 | Gilder et al. |
| 2009/0108080 A1 | 4/2009 | Meyer |
| 2009/0110281 A1 | 4/2009 | Hirabayashi |
| 2009/0114716 A1 | 5/2009 | Ramachandran |
| 2009/0132813 A1 | 5/2009 | Schibuk |
| 2009/0141962 A1 | 6/2009 | Borgia et al. |
| 2009/0164350 A1 | 6/2009 | Sorbe et al. |
| 2009/0164370 A1 | 6/2009 | Sorbe et al. |
| 2009/0166406 A1 | 7/2009 | Pigg et al. |
| 2009/0167870 A1 | 7/2009 | Caleca et al. |
| 2009/0171723 A1 | 7/2009 | Jenkins |
| 2009/0171795 A1 | 7/2009 | Clouthier et al. |
| 2009/0171819 A1 | 7/2009 | Emde et al. |
| 2009/0171825 A1 | 7/2009 | Roman |
| 2009/0173781 A1 | 7/2009 | Ramachadran |
| 2009/0176511 A1 | 7/2009 | Morrison |
| 2009/0185241 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0190823 A1 | 7/2009 | Walters |
| 2009/0192938 A1 | 7/2009 | Amos |
| 2009/0212929 A1 | 8/2009 | Drory et al. |
| 2009/0222347 A1 | 9/2009 | Whitten |
| 2009/0236413 A1 | 9/2009 | Mueller et al. |
| 2009/0240574 A1 | 9/2009 | Carpenter |
| 2009/0240620 A1 | 9/2009 | Kendrick et al. |
| 2009/0252437 A1 | 10/2009 | Li |
| 2009/0254447 A1 | 10/2009 | Blades |
| 2009/0257641 A1 | 10/2009 | Liu et al. |
| 2009/0263019 A1 | 10/2009 | Tzadok et al. |
| 2009/0271287 A1 | 10/2009 | Halpern |
| 2009/0281904 A1 | 11/2009 | Pharris |
| 2009/0284637 A1 | 11/2009 | Parulski et al. |
| 2009/0290751 A1 | 11/2009 | Ferman et al. |
| 2009/0292628 A1 | 11/2009 | Dryer et al. |
| 2009/0313167 A1 | 12/2009 | Dujari et al. |
| 2009/0319425 A1 | 12/2009 | Tumminaro et al. |
| 2009/0327129 A1 | 12/2009 | Collas et al. |
| 2010/0007899 A1 | 1/2010 | Lay |
| 2010/0008579 A1 | 1/2010 | Smirnov |
| 2010/0016016 A1 | 1/2010 | Brundage et al. |
| 2010/0027679 A1 | 2/2010 | Sunahara et al. |
| 2010/0030687 A1 | 2/2010 | Panthaki et al. |
| 2010/0038839 A1 | 2/2010 | DeWitt et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0069093 A1 | 3/2010 | Morrison |
| 2010/0069155 A1 | 3/2010 | Schwartz |
| 2010/0076890 A1 | 3/2010 | Low |
| 2010/0078471 A1 | 4/2010 | Lin et al. |
| 2010/0078472 A1 | 4/2010 | Lin et al. |
| 2010/0082468 A1 | 4/2010 | Low et al. |
| 2010/0082470 A1 | 4/2010 | Walach |
| 2010/0112975 A1 | 5/2010 | Sennett |
| 2010/0128131 A1 | 5/2010 | Tenchio et al. |
| 2010/0150424 A1 | 6/2010 | Nepomniachtchi et al. |
| 2010/0161408 A1 | 6/2010 | Karson |
| 2010/0165015 A1 | 7/2010 | Barkley et al. |
| 2010/0198733 A1 | 8/2010 | Gantman et al. |
| 2010/0201711 A1 | 8/2010 | Fillion et al. |
| 2010/0225773 A1 | 9/2010 | Lee |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0262607 A1 | 10/2010 | Vassilvitskii |
| 2010/0274693 A1 | 10/2010 | Bause et al. |
| 2010/0287250 A1 | 11/2010 | Carlson |
| 2010/0312705 A1 | 12/2010 | Caruso et al. |
| 2011/0015963 A1 | 1/2011 | Chafle |
| 2011/0016084 A1 | 1/2011 | Mundy et al. |
| 2011/0016109 A1 | 1/2011 | Vassilvitskii |
| 2011/0054780 A1 | 3/2011 | Dhanani |
| 2011/0069180 A1 | 3/2011 | Nijemcevic et al. |
| 2011/0082747 A1 | 4/2011 | Khan |
| 2011/0083101 A1 | 4/2011 | Sharon |
| 2011/0105092 A1 | 5/2011 | Felt |
| 2011/0106675 A1 | 5/2011 | Perlman |

(56) References Cited

U.S. PATENT DOCUMENTS

| | | |
|---|---|---|
| 2011/0112967 A1 | 5/2011 | Anderson et al. |
| 2011/0112985 A1 | 5/2011 | Kocmond |
| 2011/0170740 A1 | 7/2011 | Coleman |
| 2011/0191161 A1 | 8/2011 | Dai |
| 2011/0251956 A1 | 10/2011 | Cantley et al. |
| 2011/0276483 A1 | 11/2011 | Saegert et al. |
| 2011/0280450 A1 | 11/2011 | Nepomniachtchi et al. |
| 2011/0285874 A1 | 11/2011 | Showering et al. |
| 2011/0310442 A1 | 12/2011 | Popadic et al. |
| 2012/0036014 A1 | 2/2012 | Sunkada |
| 2012/0045112 A1 | 2/2012 | Lundblad et al. |
| 2012/0047070 A1 | 2/2012 | Pharris |
| 2012/0052874 A1 | 3/2012 | Kumar |
| 2012/0062732 A1 | 3/2012 | Marman et al. |
| 2012/0089514 A1 | 4/2012 | Kraemling et al. |
| 2012/0098705 A1 | 4/2012 | Yost |
| 2012/0099792 A1 | 4/2012 | Chevion et al. |
| 2012/0109793 A1 | 5/2012 | Abeles |
| 2012/0113489 A1 | 5/2012 | Heit et al. |
| 2012/0150767 A1 | 6/2012 | Chacko |
| 2012/0185388 A1 | 7/2012 | Pranger |
| 2012/0185393 A1 | 7/2012 | Atsmon et al. |
| 2012/0229872 A1 | 9/2012 | Dolev |
| 2012/0230577 A1 | 9/2012 | Calman et al. |
| 2012/0296768 A1 | 11/2012 | Fremont-Smith |
| 2013/0021651 A9 | 1/2013 | Popadic et al. |
| 2013/0120595 A1 | 5/2013 | Roach et al. |
| 2013/0155474 A1 | 6/2013 | Roach et al. |
| 2013/0159183 A1 | 6/2013 | Lopez |
| 2013/0191261 A1 | 7/2013 | Chandler |
| 2013/0198071 A1 | 8/2013 | Jurss |
| 2013/0201534 A1 | 8/2013 | Carlen |
| 2013/0223721 A1 | 8/2013 | Nepomniachtchi et al. |
| 2013/0297353 A1 | 11/2013 | Strange et al. |
| 2013/0324160 A1 | 12/2013 | Sabatellil |
| 2013/0332004 A1 | 12/2013 | Gompert et al. |
| 2013/0332219 A1 | 12/2013 | Clark |
| 2013/0346306 A1 | 12/2013 | Kopp |
| 2013/0346307 A1 | 12/2013 | Kopp |
| 2014/0010467 A1 | 1/2014 | Mochizuki et al. |
| 2014/0032406 A1 | 1/2014 | Roach et al. |
| 2014/0037183 A1 | 2/2014 | Gorski et al. |
| 2014/0067661 A1 | 3/2014 | Elischer |
| 2014/0156501 A1 | 6/2014 | Howe |
| 2014/0197922 A1 | 7/2014 | Stanwood et al. |
| 2014/0203508 A1 | 7/2014 | Pedde |
| 2014/0207673 A1 | 7/2014 | Jeffries |
| 2014/0207674 A1 | 7/2014 | Schroeder |
| 2014/0236820 A1 | 8/2014 | Carlton et al. |
| 2014/0244476 A1 | 8/2014 | Shvarts |
| 2014/0258169 A1 | 9/2014 | Wong et al. |
| 2014/0279453 A1 | 9/2014 | Belchee et al. |
| 2014/0313335 A1 | 10/2014 | Koravadi |
| 2014/0351137 A1 | 11/2014 | Chisholm |
| 2014/0374486 A1 | 12/2014 | Collins, Jr. |
| 2015/0039528 A1 | 2/2015 | Minogue et al. |
| 2015/0090782 A1 | 4/2015 | Dent et al. |
| 2015/0134517 A1 | 5/2015 | Cosgray |
| 2015/0235484 A1 | 8/2015 | Kraeling et al. |
| 2015/0244994 A1 | 8/2015 | Jang et al. |
| 2015/0294523 A1 | 10/2015 | Smith |
| 2015/0348591 A1 | 12/2015 | Kaps et al. |
| 2016/0026866 A1 | 1/2016 | Sundaresan |
| 2016/0034590 A1 | 2/2016 | Endras et al. |
| 2016/0142625 A1 | 5/2016 | Weksler et al. |
| 2016/0189500 A1 | 6/2016 | Kim et al. |
| 2016/0307388 A1 | 10/2016 | Williams |
| 2016/0335816 A1 | 11/2016 | Thoppae et al. |
| 2017/0039637 A1 | 2/2017 | Wandelmer |
| 2017/0068421 A1 | 3/2017 | Carlson |
| 2017/0132583 A1 | 5/2017 | Nair |
| 2017/0146602 A1 | 5/2017 | Samp et al. |
| 2017/0229149 A1 | 8/2017 | Rothschild et al. |
| 2017/0263120 A1 | 9/2017 | Durie, Jr. et al. |
| 2017/0337610 A1 | 11/2017 | Beguesse |
| 2018/0025251 A1* | 1/2018 | Welinder .............. G06T 5/007 |
| | | 382/199 |
| 2018/0108252 A1 | 4/2018 | Pividori |
| 2018/0197118 A1 | 7/2018 | McLaughlin |
| 2019/0026577 A1 | 1/2019 | Hall et al. |
| 2019/0122222 A1 | 4/2019 | Uechi |
| 2019/0311227 A1* | 10/2019 | Kriegman ............. G06V 30/40 |
| 2020/0311844 A1* | 10/2020 | Luo ...................... G06V 40/172 |
| 2021/0097615 A1 | 4/2021 | Gunn, Jr. |

FOREIGN PATENT DOCUMENTS

| | | |
|---|---|---|
| CN | 1967565 A | 5/2007 |
| EP | 0 984 410 A1 | 3/2000 |
| EP | 1 855 459 A2 | 11/2007 |
| JP | 2004-23158 | 1/2004 |
| JP | 2004-23158 A | 1/2004 |
| JP | 3708807 | 10/2005 |
| JP | 2006-174105 A | 6/2006 |
| KR | 20040076131 A | 8/2004 |
| WO | WO 96/14707 A1 | 5/1996 |
| WO | WO 98/37655 A1 | 8/1998 |
| WO | WO 01/61436 | 8/2001 |
| WO | WO 01/61436 A2 | 8/2001 |
| WO | WO 2004/008350 A1 | 1/2004 |
| WO | WO 2005/043857 | 5/2005 |
| WO | WO 2005/124657 A1 | 12/2005 |
| WO | WO 2006/075967 A1 | 7/2006 |
| WO | WO 2006/086768 A2 | 8/2006 |
| WO | WO 2006/136958 A2 | 12/2006 |
| WO | WO 2007/024889 | 3/2007 |

OTHER PUBLICATIONS

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html, cited in U.S. Pat. No. 7,900,822, as dated 2007 (9 pgs).

"Check 21—The check is not in the post", RedTitan Technology 2004 http://www.redtitan.com/check21/htm (3 pgs).

"Check 21 Solutions," Columbia Financial International, Inc. http://www.columbiafinancial.us/check21/solutions.htm, cited in U.S. Pat. No. 7,900,822, as dated 2007 (8 pgs).

"Check Fraud: A Guide to Avoiding Losses", All Net, http://all.net/books/audit/checkfraud/security.htm, cited in U.S. Pat. No. 7,900,822, as dated 2007 (1 pg).

"Clearing House Electronic Check Clearing System (CHECCS) Operating Rules," An IP.com Prior Art Database Technical Disclosure, Jul. 29, 2015 (35 pgs).

"Compliance with Regulation CC", http./www/federalreserve.gov/Pubs/regcc/regcc.htm, Jan. 24, 2006 (6 pgs).

"Custom Personalized Bank Checks and Address Labels" Checks Your Way Inc., http://www.checksyourway.com/htm/web_pages/faq.htm, cited in U.S. Pat. No. 7,900,822, as dated 2007 (6 pgs).

"Deposit Now: Quick Start User Guide," BankServ, 2007, 29 pages.

"Direct Deposit Application for Payroll", Purdue University, Business Office From 0003, http://purdue.edu/payroll/pdf/dierctdepositapplication.pdf, Jul. 2007 (2 pgs).

"Direct Deposit Authorization Form", www.umass.edu/humres/library/DDForm.pdf, May 2003 (3 pgs).

"Direct Deposit," University of Washington, http://www.washington.edu/admin/payroll/directdeposit.html, cited in U.S. Pat. No. 7,900,822, as dated 2007 (3 pgs).

"Electronic Billing Problem: The E-check is in the mail" American Banker—vol. 168, No. 95, May 19, 2003 (4 pgs).

"First Wireless Handheld Check and Credit Card Processing Solution Launched by Commerciant®, MobileScape® 5000 Eliminates Bounced Checks, Enables Payments Everywhere," Business Wire, Mar. 13, 2016, 3 pages.

(56) References Cited

OTHER PUBLICATIONS

"Frequently Asked Questions" Bank of America, http://www.bankofamerica.com/deposits/checksave/index.cfm?template-lc_faq_bymail, cited in U.S. Pat. No. 7,900,822, as dated 2007 (2 pgs).
"Full Service Direct Deposit", www.nonprofitstaffing.com/images/upload/ditdepform.pdf. cited in U.S. Pat. No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miltek Systems, 2008 (2 pgs).
"It's the easiest way to Switch banks", LNB, http://www.inkby.com/pdf/LNBswitch-kit10-07.pdf cited in U.S. Pat. No. 7,996,316, as dated 2007 (7 pgs).
"Lesson 38—More Bank Transactions", Turtle Soft, http://www.turtlesoft.com/goldenseal-software-manual.lesson38.htm, cited in U.S. Pat. No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).
"NOVA Enhances Electronic Check Service to Benefit Multi-Lane Retailers," Business Wire, Nov. 28, 2006, 2 pages.
"Personal Finance", PNC, http://www.pnc.com/webapp/unsec/productsandservice.do?sitearea=/PNC/home/personal/account+services/quick+switch/quick+switch+faqs, cited in U.S. Pat. No. 7,900,822, as dated 2007 (12 pgs).
"Quicken Bill Pay", Retrieved from the Internet on Nov. 27, 2007 at: <URL:http://quicken intuit.com/quicken-bill-pay-jhtml>, 2 pgs.
"Refractive Index" Wikipedia, the free encyclopedia; http://en.wikipedia.org/wiki/refractiveindex.com Oct. 16, 2007 (4 pgs).
"Remote check deposit is the answer to a company's banking problem," Daily Breeze, Torrance, CA, Nov. 17, 2006, 2 pgs.
"Remote Deposit Capture", Plante & Moran, http://plantemoran.com/industries/fincial/institutions/bank/resources/community+bank+advisor/2007+summer+issue/remote+deposit+capture.htm, cited in U.S. Pat. No. 7,900,822, as dated 2007 (3 pgs).
"Remote Deposit" National City, http://www.nationalcity.com/smallbusiness/cashmanagement/remotedeposit/default.asp; cited in U.S. Pat. No. 7,900,822, as dated 2007 (1 pg).
"Save on ATM Fees", RedEye Edition, Chicago Tribune, Chicago, IL Jun. 30, 2007 (2 pgs).
"SNB Check Capture: SmartClient User's Guide," Nov. 2006, 21 pgs.
"Start to Simplify with Check Imaging a Smarter Way to Bank", Retrieved from the Internet on Nov. 27, 2007, at <URL:http://www.midnatbank.com/Internet%20Banking/Internet_Banking.html>, 3 pgs.
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d908484987.brc, cited in U.S. Pat. No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html, cited in U.S. Pat. No. 7,900,822, as dated 2007 (12 pgs).
"Exchangeable image file format for digital still cameras: Exif Version 2.2," Standard of Electronics and Information Technology Industries Associate, JEITA CP-3451, Technical Standardization Committee on AV & IT Stroage Systems and Equpments, Japan Electronics and Information Technology Industries Association, Apr. 2002 (154 pgs). (retrieved from: http://www.exif.org/Exif2-2.PDF).
"Getting Started with ICLs aka X9.37 Files", All My Papers, May 2, 2006, 39 pgs.
"Machine Accepts Bank Deposits", *New York Times*, Apr. 12, 1961, 1 pg.
"Sprint PCS Vision Guide", 2005, 86 pgs.
"Vodafone calls on moviles to go live!", 2002, 8 pgs.
12 CFR § 229.51 and Appendix D to Part 229 (Jan. 1, 2005 edition), 3 pgs.
149 Cong. Rec. H9289, Oct. 8, 2003, 6 pgs.
ABA Routing System Transit Number, Wikipedia, dated Sep. 27, 2006, 3 pgs.
About Network Servers, GlobalSpec (retrieved from https://webarchive.org/web/20051019130842/http://globalspec.com80/LearnMore/Networking_Communication_Equipment/Networking_Equipment/Network_Servers_("GlobalSpec").
Accredited Standards Committee Technical Report TR 33-2006, dated Aug. 28, 2006, 75 pgs.
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler/Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Andrew S. Tanenbaum, Modern Operating Systems, Second Edition (2001).
ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI X9.7-1999(R2007), Bank Check Background and Convenience Amount Field Specification, dated Jul. 11, 2007, 86 pgs.
ANSI, "Return Reasons for Check Image Exchange of IRDS", dated May 6, 2016, 23 pgs.
ANSI, "Specifications For Electronic Exchange of Check and Image Data", dated Jul. 11, 2006, 230 pgs.
*Apple Announces the New iPhone 3GS—The Fastest, Most Powerful iPhone Yet*, Jun. 8, 2009, located on the Internet at: http://www.apple.com.rensroom/2009/06/08Apple-Announces-the-New-iPhone-3GS-The Fastest-Most-Powerful-iPhone-Yet, 4 pgs.
Apple Reinvents the Phone with iPhone, Jan. 2007, located on the Internet at: https://www.apple.com/newsroom/2007/01/09Apple-Reinvents-the-Phone-with-iPhone/, 4 pgs.
Aradhye, Hrishikesh B., "A Generic Method for Determining Up/Down Orientation of Text in Roman and Non-Roman Scripts," Pattern Recognition Society, Dec. 13, 2014, 18 pages.
Archive Index Systems; Panini My Vision X-30 or VX30 or X30 © 1994-2008 Archive Systems, Inc. P./O. Box 40135 Bellevue, WA USA 98015 (2 pgs).
Arnold et al, The Java Programming Language, Fourth Edition (2005).
ASCX9, "Specification for Electronic Exchange of Check and Image Data", date Mar. 31, 2003, 156 pgs.
Askey, *Canon EOS 40D Review* (pts. 1,4,10), Digital Photography Review, located on the Internet at: https://www.dpreview.com/reviews/canoneos40d, 24 pgs.
Askey, *Leica Digilux 2 Review* (pts. 1,3,7), Digital Photography Review, May 20, 2004, located on the Internet at: : https://www.dpreview.com/reviews/leicadigilux2, 20 pgs.
Askey, Nikon D300 In-depth Review (pts. 1,3,9), Digital Photography Review, Mar. 12, 2008, located on the Internet at: : https://www.preview.com/reviews/nikond300, 24 pgs.
Askey, *Panasonic Lumix DMC-L1 Review* (pts. 1,3,7), Digital Photography Review, Apr. 11, 2007, located on the Internet at: https://www.dpreview.com/reviews/panasonicdmc11, 24 pgs.

(56) References Cited

OTHER PUBLICATIONS

Askey, *Sony Cyber-shot DSC-R1 Review* (pts, 1,3,7), Digital Photography Review, Dec. 6, 2005, located on the Internet at: http://www.dpreview.com.reviews/sonydscr1, 24 pgs.
Associate of German Banks, SEPA 2008: Uniform PAyment Instruments for Europe, Berlin, cited in U.S. Pat. No. 7,900,822, as dated Jul. 2007, Bundesverbankd deutscher banken ev, (42 pgs).
*Automated Clearing Houses* (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
Automated Merchant Systems, Inc., "Electornic Check Conversion," http://www.automatedmerchant.com/electronic_check_conversion.cfm, 2006, downloaded Oct. 18, 2006 (3 pgs).
Bank Systems & Technology, United Article, May 1, 2006, http://www.banktech.com/showarticle.jhtml?articleID=187003126, "Are you Winning in the Payment World?" (4 pgs).
Bankers' Online, "Training Page: Learning the Bank Numbering System", Copyright 2004, 2 pgs.
BankServ, "DepositNow: What's the difference?" cited in U.S. Pat. No. 7,970,677, as dated 2006, (4 pgs).
BankServ, Product Overview, http://www.bankserv.com/products/remotedeposit.htm, cited in patent No. 7,970,677, as dated 2006, (3 pgs).
Berman, *How Hitchcock Turned a Small Budget Into a Great Triumph*, Time.com, Apr. 29, 2015, located on the Internet at: http://time.com/3823112/alfred-hitchcock-shadow-of-a-doubt, 1 pg.
*Big Red Book*, Adobe Systems Incorporated, copyright 2000, (attached as Exhibit 27 from the Defendant Wells Fargo Bank, N.A's Answer dated Aug. 14, 2018), 45 pgs.
Bills, Steve, "Automated Amount Scanning Is Trend in Remote-Deposit," American Banker, New York, NY, Aug. 30, 2005, (3 pgs).
Blafore, Bonnie "Lower Commissions, Fewer Amenities", Better Investing Madison Heights: Feb. 2003, vol. 52, Iss. 6, (4 pgs).
BLM Technologies, "Case Study: Addressing Check 21 and RDC Error and Fraud Threats,"Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, cited in U.S. Pat. No. 7,900,822, as dated Apr. 26, 2006 (3 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
BrainJar Validation Algorithms, archived on Mar. 16, 2016 from BrainJar.com, 2 pgs.
Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). (Retrieved from: https://pdfs.semanticscholar.org/93b2/ea0d12f24c91f3c46fa1c0d58a76bb132bd2.pdf).
Bruene, Jim; "Check Free to Enable In-Home Remote Check Deposit for Consumers and Small Business", NetBanker.com, Financial Insite, Inc., http://www.netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Edorsement Requirements," BankersOnline.com, http://www.bankersonline.com/cgi-bin/printview/printview.pl, Jan. 6, 2003 (3 pgs).
Callahan, J., "The first camera phone was sold 20 years ago, and it's not what you expect", Adroid Authority, 2019, 5 pgs.
Canon EOS 40D Digital Camera Instruction Manual, located on the Internet at: http://gdlp01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.
Canon White Paper, "Two Words Every Business Should Know—Remote Deposit", dated 2005, 7 pgs.
Canon, ImageFormula CR-25/CR-55, "Improve Your Bottom Line with Front-Line Efficiencies", 0117W117, 1207-55/25-1 OM-BSP, cited in U.S. Pat. No. 7,949,587 as dated 2007. (4 pgs).
Caplan, J. et al., "Most Influential Gadgets and Gizmos 2002: Sanyo SCP-5300", 2002, 1 pg.
Carrubba, P. et al., "Remote Deposit Capture: A White Paper Addressing Regulatory, Operational and Risk Issues," NetDeposit, Inc., 2006 (11 pgs).
CBM 2019-00027, Declaration of Bharat Prasad, dated Jul. 8, 2019, 32 pgs.
CBM 2019-00027, Patent Owner Preliminary Response and Exhibits 2001-1042, dated Jul. 8, 2019, 91 pgs.
CBM 2019-00028, "Motorola, Palm collaborate on smart phone", Copyright 2000 by Crin Communications, Inc., 1 pg.
CBM 2019-00028, Aspire 9800 Series User Guide, Copyright 2006 by Acer International, 122 pgs.
CBM 2019-00028, Dell XPS M1210 Owner's Manual Copyright 2006 by Dell Inc., 192 pgs.
CBM 2019-00028, Estridge, Bonnie "Is your phone smart enough?: The series that cute through the technobabble to bring you the best advice on the latest gadgets", Copyright 2006 by XPRESS—A1 Nsr Media, 3 pgs.
CBM 2019-00028, Lawler, Ryan "Apple shows Intel-based Macs, surge revenue", Copyright 2006 by The Yomiuri Shimbun, 2 pgs.
CBM 2019-00028, Nasaw, Daniel "Viruses Pose threat to "Smart"Cellphones—Computer Programs Could Cripple Devices and Shut Down Wireless Networks", Copyright 2004 by Factiva, 2 pgs.
CBM 2019-00028, Seitz, Patrick "Multifunction Trend Shaking Up The Handheld Device Industry; Solid Sales Expected in 2004; PDA, handset, camera—one single, small product can fill a variety of role", Copyright 2004 Investor's Business Daily, Inc., 3 pgs.
CBM 2019-00028, United Services Automobile Associates ("USAA")'s Patent Owner Preliminary Response, dated Jul. 8, 2019, 73 pgs.
CBM2019-00002 U.S. Pat. No. 9,818,090, Decision Dismissing Petition and Terminating Proceeding 37 C.F.R. § 42.5(a) and 42.71(a), dated Apr. 26, 2019, 5 pgs.
CBM2019-00002 U.S. Pat. No. 9,818,090, Declaration of Matthew Calman In Support of Patent Owner Preliminary Response, dated Feb. 20, 2019, 14 pgs.
CBM2019-00002 U.S. Pat. No. 9,818,090, Declaration of Tim Crews In Support of Patent Owner Preliminary Response, dated Feb. 20, 2019, 8 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, Ph.D., Oral and Videotaped Deposition, dated Jan. 23, 2019, 27 pgs.
CBM2019-00002 U.S. Pat. No. 9,818,090, United Services Automobile Association (USAA)'s Patent Owner Preliminary Response, dated Feb. 20, 2019, 75 pgs.
CBM2019-00002 U.S. Pat. No. 9,818,090, United Services Automobile Association (USAA)'s Updated Exhibit List, dated Mar. 19, 2019, 2 pgs.
CBM2019-00003 U.S. Pat. No. 8,699,779, Declaration of Matthew Calman in Support of Patent Owner Preliminary Response, dated Mar. 4, 2019, 15 pgs.
CBM2019-00003 U.S. Pat. No. 9,336,517, Decision Denying Institution of Covered Business Method Patent Review 37 C.F.R. § 42.208, dated Jun. 3, 2019, 28 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, Ph.D., Oral and Videotaped Deposition, dated Jan. 23, 2019, 27 pgs.
CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs.
CBM2019-00003 U.S. Pat. No. 9,336,517, Petitioner's Updated Exhibits List, dated May 14, 2019, 7 pgs.

(56) References Cited

OTHER PUBLICATIONS

CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.
CBM2019-00003 U.S. Pat. No. 8,977,571, Decision Denying Institution of Covered Business Method Patent Review 37 C.F.R. § 42.208, dated May 15, 2019, 33 pgs.
CBM2019-00004 U.S. Pat. No. 8,977,571, Declaration of Matthew Calman In Support of Patent Owner Preliminary Response, dated Feb. 20, 2019, 14 pgs.
CBM2019-00004 U.S. Pat. No. 8,977,571, Declaration of Tim Crews In Support of Patent Owner Preliminary Response, dated Feb. 20, 2019, 8 pgs.
CBM2019-00004 U.S. Pat. No. 8,977,571, Defendant's Claim Construction Brief and supporting exhibits, *United Services Autombile Association v. Wells Fargo Bank, N.A.*, Case No. 2:18-cv-245, dated Apr. 25, 2019, 36 pgs.
CBM2019-00004 U.S. Pat. No. 8,977,571, Patent Owner's Sur-Reply Brief to Petitioner's Reply Brief to Patent Owner Preliminary Response Pursuant to Authorization Provided in Paper 14, dated Apr. 30, 2019, 7 pgs.
CBM2019-00004 U.S. Pat. No. 8,977,571, United Services Autombile Association (USAA)'s Patent Owner Preliminary Response, dated Feb. 20, 2019, 99 pgs.
CBM2019-00004 U.S. Pat. No. 8,977,571, United Services Autombile Association (USAA)'s Updated Exhibit List Pursuant to 37 CFR 43.63(e), dated Mar. 19, 2019, 8 pgs.
CBM2019-00005 U.S. Pat. No. 8,699,779 Peter Alexander, Ph.D., Oral and Videotaped Deposition, dated Jan. 23, 2019, 27 pgs.
CBM2019-00005 U.S. Pat. No. 8,699,779, Decision Denying Institution of Covered Business Method Patent Review 37 C.F.R. § 42.208, dated Jun. 3, 2019, 27 pgs.
CBM2019-00005 U.S. Pat. No. 8,699,779, Katie Knight Videotape Deposition Transcript, dated Feb. 8, 2019, 27 pgs.
CBM2019-00005 U.S. Pat. No. 8,699,779, Patent Owner's Sur-Reply Brief to Petitioner's Reply Brief to Patent Owner Preliminary Response Pursuant to Authorization Provided in Paper No. 15, dated May 1, 2019, 7 pgs.
CBM2019-00005 U.S. Pat. No. 8,699,779, United Services Autombile Association (USAA)'s Patent Owner Preliminary Response, dated Mar. 4, 2019, 103 pgs.
CBM2019-00027 U.S. Pat. No. 9,224,136 Declaration of Peter Alexander, Ph.D., dated Mar. 28, 2019, 147 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00027 U.S. Pat. No. 9,224,136 Petition For Covered Business Method Review of Claims 1-3, 5-9, 11-16 and 18 of U.S. Pat. No. 9,224,136, dated Mar. 28, 2019, 93 pgs.
CBM2019-00028 U.S. Pat. No. 10,013,681, Declaration of Peter Alexander, Ph.D., dated Mar. 28, 2019, 94 pgs.
CBM2019-00028 U.S. Pat. No. 10,013,681, Notice of Filing Date Accorded To Petition and Time For Filing Patent owner Preliminary Response for U.S. Pat. No. 10,013,681, dated Apr. 8, 2019, 3 pgs.
CBM2019-00028 U.S. Pat. No. 10,013,681, Petition For Covered Business Method Review of Claims 1-30 of U.S. Pat. No. 10,013,681, dated Mar. 28, 2019, 99 pgs.
CBM2019-00028 U.S. Pat. No. 10,013,681, Petitioner's Updated Exhibit List (as of Apr. 1, 2019) for U.S. Pat. No. 10,013,681, dated Apr. 1, 2019, 5 pgs.
CBM2019-00028 U.S. Pat. No. 10,013,681, Plaintiff United Services Automobile Association (USAA) Preliminary Claim Constructions And Extrinsic Evidence, dated Mar. 15, 2019, 74 pgs.
CBM2019-00028, "64 Million Smart Phones Shipped Worldwide in 2006" Canalys Newsroom, 2006, 3 pgs.
CBM2019-00028, "Smarter Than Your Average Phone", Copyright 2006 by Factiva, 4 pgs.

CBM2019-00028, 00000 C720w User Manual for Windows Mobile Smart Phone, Copyright 2006, 352 pgs.
CBM2019-00028, 17-Inch MacBook Pro User's Guide, Copyright 2006 by Apple Computer, Inc., 144 pgs.
CBM2019-00028, Burney, Brett "MacBook Pro with Intel processor is fast, innovative", Copyright 2006 by Plain Dealer Publishing Co., 2 pgs.
CBM2019-00028, Declaration of Matthew A. Calman in Support of Patent Owner Preliminary Response, dated Jul. 8, 28 pgs.
CBM2019-00028, Jewell, Mark "Cell Phone Shipments Reach Record 208M" Copyright 2005 by Associated Press, 1 pg.
CBM2019-00028, Malykhina, Elena "Get Smart", Copyright 2006 by ProQuest Information and Learning Company, 6 pgs.
CBM2019-00028, Nokia 9500 Communicator user Guide, Copyright 2006 by Nokia Corporation, 112 pgs.
CBM2019-00028, Palm Treo 700W Smartphone manual, Copyright 2005 by Palm, Inc., 96 pgs.
CBM2019-00028, Robinson, Daniel, "Client Week—Handsets advance at 3GSM", Copyright 2004 by VNU Business Publications Ltd., 2 pgs.
CBM2019-00028, Wong, May "HP unveils new mobile computers", Copyright 2006 by The Buffalo News, 2 pgs.
CBM2019-00029 U.S. Pat. No. 10,013,605, Declaration of Peter Alexander, Ph.D., dated Mar. 28, 2019, 76 pgs.
CBM2019-00029 U.S. Pat. No. 10,013,605, Petition For Covered Business Method Review of Claims 1-3, 5-14, 16-29 of U.S. Pat. No. 10,013,605, dated Mar. 28, 2019, 88 pgs.
CBM2019-00029, "Dynamism.com: Take tomorrow's tech home today with Dynamism.com: Latest gadgets merge next generation technology with high style design", Copyright 2006 Normans Media Limited, 2 pgs.
CBM2019-00029, Declaration of Matthew A. Calman in Support of Patent Owner Preliminary Response, dated Jul. 17, 2019, 29 pgs.
CBM2019-00029, Defendant's Claim Construction Brief, filed in Civil Action No. 2:18-CV-366, dated May 31, 2019, 28 pgs.
CBM2019-00029, Hp User Guide, Additional Product Information, Copyright 2006 by Hewlett-Packard Development Company, L.P., 204 pgs.
CBM2019-00029, Palenchar, Joseph, "PDA Phone Adds WIFI VoIP, Turn-By- Turn GPS Navigation", Copyright 2006 by Reed Business Information, 2 pgs.
CBM2019-00029, Pocket PC User Manual, Version 1, dated May 2006 by Microsoft, 225 pgs.
CBM2019-00029, United Services Automobile Association (USAA)'s Patent Owner Preliminary Response, dated Jul. 17, 2019, 76 pgs.
CBR online, "Diebold launches ATM depository technology", Oct. 4, 2007, 5 pgs.
Century Remote Deposit High-Speed Scanner User's Manual Release 2006, (Century Manual), Century Bank, 2006, (32 pgs).
Certificate of Accuracy related to Article entitled, "Deposit checks by mobile" on webpage: https://www.elmundo.es/navegante/2005/07/21/empresas/1121957427.html signed by Christian Paul Scrogum (translator) on Sep. 9, 2021.
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018), 11 pgs.
Chen, Brian et al., *iPhone 3GS Trounces Predecessors, Rivals in Web Browser Speed Test*, Wired, Jun. 24, 2009, located on the Internet at: www.wired.com/2009.3gs-speed/, 10 pgs.
Cheq Information Technology White Paper, "Teller Scanner Performance and Scanner Design: Camera Position Relative to the Feeder", dated 2005, 7 pgs.
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
Claim Construction Memorandum Opinion and Order, filed in Civil Action No. 2:18-CV-245, dated Jun. 13, 2019, 48 pgs.

(56) References Cited

OTHER PUBLICATIONS

Claim Construction Memorandum Opinion and Order, *United Services Automobile Association* v. *Wells Fargo Bank, N.A.*, Civil Action No. 2:18-CV-366, dated Jul. 29, 2019, 36 pgs.
CNN.com/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures A New Checking Twist", Bank Technology News Article—May 2005, www.americanbanker.com/btn_article.html?id=20050502YQ50FSYG (2 pgs).
Consumer Assistance & Information—Check 21 https://www.fdic.gov/consumers/assistance/protection/check21.html (FDIC).
Cormac Herley, "Recursive Method to Extract Rectangular Objects From Scans", 4 pages, Oct. 2003.
Craig Vaream, "Image Deposit Solutions" Emerging Solutions for More Efficient Check Processing, Nov. 2005, 16 pages.
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
Credit Union Management, "When You wish Upon an Imaging System . . . the Right Selection Process can be the Shining Star," Credit Union Management, Aug. 1993, printed from the Internet at <http://search.proquest.com/docview/227756409/14138420743684F7722/15?accountid=14 . . . >, on Oct. 19, 2013 (11 pgs).
DCU Member's Monthly—Jan. 2008, "PC Deposit—Deposit Checks from Home!", http://www.mycreditunionnewsletter.com/dcu/0108/page1.html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
Declaration of Peter Alexander, Ph.D., CBM2019-0004, Nov. 8, 2018, 180 pgs.
Defendant Wells Fargo Bank, N.A.'s Amended Answer, Affirmative Defenses, and Counterclaims to Plaintiff's Amended Complaint, *United Services Automobile Association* v. *Wells Fargo Bank, N.A.*, Civil Action No. 2:18-cv-245, dated Mar. 7, 2019, 75 pgs.
Defendant Wells Fargo Bank, N.A.'s Amended Answer, Affirmative Defenses, and Counterclaims to Plaintiff's Complaint, *United Services Automobile Association* v. *Wells Fargo Bank, N.A.*, Civil Action No. 2:18-cv-366, dated Apr. 12, 2019, 32 pgs.
Defendant Wells Fargo Bank, N.A.'s Second Amended Answer, Affirmative Defenses, and Counterclaims to Plaintiff's Amended Complaint, *United Services Automobile Association* v. *Wells Fargo Bank, N.A.*, Civil Action No. 2:18-cv-245, dated Aug. 1, 2019, 72 pgs.
Defendant's Claim Construction Brief, filed in Civil Action No. 2:18-CV-366, dated May 31, 2019, 111 pgs.
Defendant's Claim Construction Brief, filed in Civil Action No. 2:18-CV-366, dated May 31, 2019, 28 pgs.
DeYoung, Robert; "The Financial Performance of Pure Play Internet Banks"; Federal Reserve Bank of Chicsago Economic Perspectives; 2001; pp. 60-75; vol. 25, No. 1 (16 pgs).
Dhandra, B.V. et al., "Skew Detection in Binary Image Documents Based on Image Dilation and Region labeling Approach", IEEE, The 18th International Conference on Pattern Recognition (ICPR'06), 2006, 4 pgs.
Dias, Danilo et al., "A Model for the Electronic Representation of Bank Check", Brasilia Univ. Oct. 2006 (5 pgs).
Digital Transactions News, "An ACH-Image Proposal For Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
Doermann, D. et al., "The function of documents", Image and Vision Computing, vol. 16, 1998, pp. 799-814.
Doermann, David et al., "Progress in Camera-Based Document Image Analysis," Proceedings of the Seventh International Conference on Document Analysis and Recognition (IDCAR 2003) 0-7695-1960-1/03, 2003, IEEE Computer Society, 11 pages.
Duvall, Mel, "Remote Deposit Capture," Baseline, vol. 1, Issue 70, Mar. 2007, 2 pgs.
eCU Technologies, "Upost Remote Deposit Solution," Retrieved from the Internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faw.htm, downloaded Oct. 18, 2006 (3 pgs).
Excerpts from American National Standard for Financial Services, ANS, X9.100-140-2004-Specifications for an Image Replacement Document—IRD, Oct. 1, 2004, 16 pgs.
FDIC—Remote Capture: A Primer, 2009, 3 pgs.
FDIC: Check Clearing for the 21st Century act (Check21), FED, Deposit Ins. Corp., Apr. 25, 2016 (retrieved from https://web.archive.org/web/20161005124304/https://www.fdic.gov/consumers/assistance/protection/check21.html ("FDIC").
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, cited in U.S. Pat. No. 7,873,200, as dated Dec. 2005 (20 pgs).
Federal Reserve Adoption of DSTU X9.37-2003, Image Cash Letter Customer Documentation Version 1.8, dated Oct. 1, 2008, 48 pgs.
Federal Reserve Bank, "Reserve Banks to Adopt DSTU X9.37-2003 Format for Check 21 Image Services", 2004, 2 pgs.
Federal Reserve Banks Plan Black-and-White Image Standard and Quality Check, May 2004, 2 pgs.
Federal Reserve Board, "Check Clearing for the 21st Century Act", FRB, http://www.federalreserve.gov/paymentsystems/trucation/, Mar. 1, 2006 (1 pg).
Federal Reserve System, "12 CFR, Part 229 [Regulation CC; Docket No. R- 0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (6 pgs).
Fidelity Information Services, "Strategic Vision Embraces Major Changes in Financial Services Solutions: Fidelity's long-term product strategy ushers in new era of application design and processing," Insight, 2004, pp. 1-14.
Fielding, R. et al., "RFC-2616—Hypertext Transfer Protocol", Network Working Group, The Internet Society copyright 1999, 177 pgs.
Fisher, Dan M., "Home Banking in the 21st Century: Remote Capture Has Gone Retail", May 2008 (4 pgs).
Fletcher, Lloyd A., and Rangachar Kasturi, "A robust algorithm for text string separation from mixed text/graphics images", IEEE transactions on pattern analysis and machine intelligence 10.6 (1988), 910-918 (1988).
Fujisawa, H. et al., "Information Capturing Camera and Developmental Issues", IEEE Xplore, downloaded on Aug. 18, 2020, 4 pgs.

(56) References Cited

OTHER PUBLICATIONS

Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
Gates, *A History of Wireless Standards, Wi-Fi Back to Basics*, Aerohive Blog, Jul. 2015, located on the Internet at: http://blog.aerohive.com/a-history-of-wireless-standards, 5 pgs.
German Shegalov, Diplom-Informatiker, "Integrated Data, Message, and Process Recovery for Failure Masking in Web Services", Dissertation Jul. 2005 (146 pgs).
*Guidelines for Evaluation of Radio Transmission Technologies for IMT-2000*, dated 1997, ITU-R-M.1225, located on the Internet at: https://www.itu.int/dms_pubrec/itu-r/rec/m/R-REC-M.1225-0-199702-I!!PDF-E.pdf, 60 pgs.
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Gutierrez, L., "Innovation: From Campus to Startup", Business Watch, 2008, 2 pgs.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Halonen et al., GSM, GPRS, and EDGE Performance: Evolution Towards 3G/UMTS, Second Edition (2003).
Hartly, Thomas, "Banks Check Out New Image", Business First, Buffalo: Jul. 19, 2004, vol. 20, Issure 43, (3 pgs).
Heckenberg, D. "Using Mac OS X for Real-Time Image Processing" Oct. 8, 2003 (15 pgs).
Hello Ocean User Manual, located on the Internet at: https://standupwireless.com/wp-content/uploads/2017/04/Manual_PANTECH_OCEAN.pdf (excerpts attached as Exhibit 10 from the Defendant Wells Fargo Bank, N.A.'s Answer dated Aug. 14, 2018) 76 pgs.
Herley, Cormac, "Efficient Inscribing of Noisy Rectangular Objects in Scanned Images," 2004 International Conference on Image Processing, 4 pages.
Heron, Advanced Encryption Standard (AES), 12 Network Security 8 (2009).
Higgins, Ray et al., "Working With Image Cash Letters (ISLs) X9.37, 180 or 187 files", All My Papers, 2009, 36 pgs.
Hildebrand, C. et al., "Electronic Money," Oracle, http://www.oracle.com/oramag/profit/05-feb/p15financial.html, 2005, downloaded Oct. 18, 2005 (5 pgs).
Hill, "From J-Phone to Lumina 1020: A complete history of the camera phone", Digital Trends, 2020, 9 pgs.
Hill, Simon, "From J-Phone to Lumina 1020: A Complete History of the Camera Phone", dated Aug. 11, 2013, 19 pgs.
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Hoffman, J., "Before there Were Smartphones, There was I-Mode", 1999, 5 pgs.
HTC Touch Diamond Manual, copyright 2008, (attached as Exhibit 11 from the Defendant Wells Fargo Bank, N.A.'s Answer dated Aug. 14, 2018), 257 pgs.
Humphrey, David B. and Hunt, Robert, "*Getting Rid of Paper: Savings From Check* 21", Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
Iida, Jeanne, "The Back Office: Systems—Image Processing Rolls on as Banks ReapBenefits," American Banker, Jul. 19, 1993, printed from the Internet at <http://search.proquest.com/docview/292903245/14138420743684F7722/14?accountid=14 . . . >, on Oct. 19, 2013 (3 pgs).
Image Master, "Photo Restoration: We specialize in digital photo restoration and photograph repair of family pictures", http://www.imphotorepair.com, cited in U.S. Pat. No. 7,900,822, as downloaded Apr. 2007 (1 pg).
Immich et al., Performance Analysis of Five Interprocess CommunicAtion Mechanisms Across UNIX Operating Systems, 68 J. Syss. & Sofware 27 (2003).
Instrument—Definition from the Merriam-Webster Online Dictionary, dated Mar. 2, 2019, 1 pg.
Instrument—Definition of Instrument from the Oxford Dictionaries (British & World English), dated Jul. 2, 2017, 44 pgs.
Investment Systems Company, "Portfolio Accounting System," 2000, 34 pgs.
*iPhone App Store Downloads Top 10 Million in First Weekend*, Jul. 14, 2008, located on the Internet at: iPhone Store Downloads Top 10 Million in First Weekend, Jul. 14, 2008, located on the Internet at: https://wwwapple.com/newsroom/2008/07/14iPhone-App-Store-Downloads-Top-10-Million-in-First-Weekend, 4 pgs.
iPhone Application Programming Guide Device Support, dated Apr. 26, 2009, 7 pgs.
IPR2022-00049 filed Oct. 22, 2021 on behalf of PNC Bank N.A., 70 pages.
IPR2022-00050 filed Oct. 22, 2021 on behalf of PNC Bank N.A., 126 pages.
IPR2022-00075 filed Nov. 5, 2021 on behalf of PNC Bank N.A., 90 pages.
IPR2022-00076 filed Nov. 17, 2021 on behalf of PNC Bank N.A., 98 pages.
IPR2019-00815 U.S. Pat. No. 9,818,090, Decision Denying Institution of Inter *Parties* Review, dated Aug. 26, 2019, 28 pgs.
IPR2019-00815 U.S. Pat. No. 9,818,090, Declaration of Peter Alexander, PhD, as filed in the IPR on Mar. 20, 2019, 99 pgs.
IPR2019-00815 U.S. Pat. No. 9,818,090, Exhibit B Proposed Claim Constructions for the '571, '090, '779 and '517 Patents, filed on Feb. 28, 2019, 10 pgs.
IPR2019-00815 U.S. Pat. No. 9,818,090, Notice of Filing Date Accorded to Petition and Time for Filing Patent Pwner Preliminary Response, dated Mar. 27, 2019, 5 pgs.
IPR2019-00815 U.S. Pat. No. 9,818,090, Petition For Inter Parties Review of Claims 1-19 of U.S. Pat. No. 9,818,090, dated Mar. 20, 2019, 56 pgs.
IPR2019-00815 U.S. Pat. No. 9,818,090, Petitioner's Reply Brief to Patent Owner Preliminary Response Pursuant To Authorization Provided In Paper No. 13, dated Aug. 1, 2019, 9 pgs.
IPR2019-00815 U.S. Pat. No. 9,818,090, Petitioner's Supplement Exhibit List, dated Aug. 1, 2019, 5 pgs.
IPR2019-00815 U.S. Pat. No. 9,818,090, United Services Automobile Association ("USAA")'s Sur-Reply In Support of Patent Owner Preliminary Response, dated Aug. 8, 2019, 8 pgs.
IPR2019-00815, Declaration of Matthew A. Calman In Support of Patent Owner Preliminary Response, dated Jun. 27, 2019, 25 pgs.
IPR2019-00815, Federal Reserve Financial Services Retired: DSTU X9.37-2003, Specifications for Electronic Exchange of Check and Image Data, Copyright 2006 by Accredited Standards Committee X9, Inc., dated Mar. 31, 2003, 157 pgs.
IPR2019-00815, Invalidity Chart, uploaded on Jun. 27, 2019, 94 pgs.
IPR2019-00815, Supplementary Invalidity Chart, dated on Jun. 27, 2019, 16 pgs.
IPR2019-00815, United Services Automobile Association ("USAA")'s Patent Owner Preliminary Response, dated Jun. 27, 2019, 66 pgs.
IPR2019-01081—exhibit USAA Ex 2044-p 1 *Wells Fargo v USAA*, titled "Mitek Introduces ImageNet Mobile Deposit", copyright 2007 by Mitek Systems, 4 pgs.

(56) References Cited

OTHER PUBLICATIONS

IPR2019-01081—U.S. Pat. No. 9,336,517 B1, Decision Granting Institution of *Inter Partes* Review 35 U.S.C. § 314; 37 C.F.R. § 42.4, dated Jan. 13, 2020, 60 pgs.
IPR2019-01081 U.S. Pat. No. 9,336,517, Petition For *Inter Parties* Review of Claims 1, 5-10, 12-14, 17-20 of U.S. Pat. No. 9,336,517, dated Jun. 5, 2019, 78 pgs.
IPR2019-01081, Declaration of Peter Alexander, Ph.D, dated Jun. 5, 2019, 135 pgs.
IPR2019-01082—U.S. 8,977,571 B1, Decision Granting Institution of *Inter Partes* Review 35 U.S.C. § 314; 37 C.F.R. § 42.4, dated Dec. 13, 2019, 56 pgs.
IPR2019-01082 U.S. Pat. No. 8,977,571, Petition for *Inter Parties* Review of Claims 1-13 U.S. Pat. No. 8,977,571, dated Jun. 5, 2019, 75 pgs.
IPR2019-01082—U.S. Pat. No. 8,977,571 B1, Decision Granting Institution of *Inter Partes* Review 35 U.S.C. § 314, dated Jan. 9, 2020, 58 pgs.
IPR2019-01083 U.S. Pat. No. 8,699,779, Petition for *Inter Parties* Review of Claims 1-18 U.S. Pat. No. 8,699,779, dated Jun. 5, 2019, 74 pgs.
IPR2020-00091, U.S. Pat. No. 9,177,198, Petition for *Inter Parties* Review of Claims 1-3 and 5-20 U.S. Pat. No. 9,177,198, dated Nov. 7, 2019, 72 pgs.
IPR2020-00882—*Mitek Systems, Inc. v. United Services Automobile Association*, Petition for *Inter Partes* Review of U.S. Pat. No. 9,818,090, dated Apr. 30, 2020, 102 ps.
IPR2020-00976—*Mitek Systems, Inc. v. United Services Automobile Association*, Petition for *Inter Partes* Review of U.S. Pat. No. 8,699,779, dated May 22, 2020, 87 pgs.
IPR2020-01101—*Mitek Systems, Inc. v. United Services Automobile Association*, Petition for *Inter Partes* Review of U.S. Pat. No. 9,336,517, dated Jun. 12, 2020, 91 pgs.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC; Docket No. R 1176, "Availability of Funds and Collection of Checks". cited in U.S. Pat. No. 7,900,822, as dated 2009, (89 pgs).
Joinson et al., *Olympus E-30 Review* (pts. 1,4,8), Digital Photography Review, Mar. 24, 2009, located on the internet at: www.dpreview.com/reviews/olympus30, 26 pgs.
Jung et al, "Rectangle Detection based on a Windowed Hough Transform", IEEE Xplore, 2004, 8 pgs.
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
Klein, Robert, Financial Services Technology, "Image Quality and Usability Assurance: Phase 1 Project", dated Jul. 23, 2004, 67 pgs.
Knerr et al., *The A2iA Intercheque System: Courtesy Amount and Legal Amount Recognition for French Checks in Automated Bancheck Processing* 43-86, Impedove et al. eds., 1997, 50 pgs.
Knestout, Brian P. et al., "Banking Made Easy" Kiplinger's Personal Finance Washington, Jul. 2003, vol. 57, Iss 7 (5 pgs).
Koga, M. et al., Camera-based Kanji OCR for Mobile-phones: Peactical Issues, IEEE, 2005, 5 pgs.
Kornal Andras et al., "Recognition of Cursive Writing on Personal Checks", Proceedings of International Workshop on the Frontiers in Handwriting Recognition, cited in U.S. Pat. No. 7,900,822, as dated Sep. 1996, (6 pgs).
Lacker, Jeffrey M., "*Payment System Disruptions and the Federal Reserve Following* Sep. 11, 2001", The Federal Reserve Bank of Richmond, (Dec. 23, 2003) (attached as Exhibit 19 from the Defendant Wells Fargo Bank, N.A.'s Answer dated Aug. 14, 2018), 55 pgs.

Laine, M. et al., "A Standalone OCR System For Mobile Cameraphones", IEEE, 2006, 5 pgs.
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).
Lange, Bill, "Combining Remote Capture and IRD Printing, A Check 21 Strategy For Community and Regional Banks", dated 2005, 25 pgs.
Leach, et al., A Universally Unique Identifier (UUID) URN Namespace, (Jul. 2005) retrieved from https://www.ietf.org/rfc/rfc4122.txt.
Lee, Jeanne, "Mobile Check Deposits: Pro Tips to Ensure They Go Smoothly", dated Feb. 19, 2016, 6 pgs.
Leica Digilux 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
Levitin, Adam J., Remote Deposit Capture: A Legal and Transactional Overview, Banking Law Journal, p. 115, 2009 (RDC), 8 pgs.
Liang, J et al., "Camera-based analysis of text and documents: a survey", IJDAR, vol. 7, 2005, pp. 84-104, 21, pgs.
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
MacKenzie, E., *Photography Made Easy*, copyright 1845, 80 pgs.
Magid, L., "A baby girl and the camera phone were born 20 years ago", Mercury News, 2017, 3 pgs.
Masonson, L., "Check Truncation and ACH Trends—Automated Clearing Houses", healthcare financial management associate, http://www.findarticles.com/p/articles/mLm3276/is_n7_v47/ai_14466034/prin t, 1993 (2 pgs).
Matthews, Deborah, "Advanced Technology Makes Remote Deposit Capture Less Risky," Indiana Bankers Association, Apr. 2008 (2 pgs).
Meara, Bob, "State of Remote Deposit Capture 2015 Mobile Is the New Scanner", dated May 2015, 56 pgs.
Meara, Bob, "USAA's Mobile Remote Deposit Capture", Dated Jun. 26, 2009, 2 pgs.
Metro 1 Credit Union, "Remote Banking Services," hltp://ww\\i.metro1cu.org/metro1cu/remote.html, downloaded Apr. 17, 2007 (4 pgs).
Microsoft Mobile Devices Buyer's Guide, 2012, 4 pgs.
Microsoft Mobile Devices Smartphone, 2003, 2 pgs.
Mirmehdi, M. et al., "Extracting Low Resolution Text with an Active Camera for OCR", in Proccedings of the IX Spanish Symposium on Pattern Recognition and Image Processing (pp. 43-48), 2001, 6pgs.
Mirmehdi, M. et al., "Towards Optimal Zoom for Automatic Target Recognition", in Proceedings of the Scandinavian Conference on Image Analysis, 1:447-454, 1997, 7 pgs.
Mitek Systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mitek Video titled "Mobile Deposit Tour", Published on Jul. 2, 2009 by Mitek Systems, duration 2 minutes and 13 seconds, located on the Internet at: https://www.youtube.com/watch?v=sGD49ybxS2Q, 25 pgs.
Mitek, "Video Release—Mitek MiSnap ™ Mobile Auto Capture Improves Mobile Deposit® User Experience at Ten Leading Financial Institutions", dated Jul. 15, 2014, 2 pgs.
Mitek's Mobile Deposit Processes More Than Two Billion Checks, $1.5 Trillion in Cumulative Check Value, dated Mar. 8, 2018, 2 pgs.
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," Connotech Experts-conseils, Inc., Apr. 1995 (31 pgs).

(56) References Cited

OTHER PUBLICATIONS

Motomanual for Motorazr, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Motomanual, MOTOROKR-E6-GSM-English for wireless phone, copyright 2006, 144 pgs.
Motorola RAZR MAXX V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
N. Ritter & M. Ruth, The Geo Tiff Data Interchange Standard for Raster Geographic Images, 18 Int. J. Remote Sensing 1637 (1997).
NCR, Mobile Remote Deposit Capture (RDC), copyright 2011, 8 pgs.
Nelson, B. et al., "Remote deposit capture changes the retail landscape," Northwestern Financial Review, http://findarticles.com/p/articles/miqa3799/is 200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nikon Digital Camera D300 User's Manual, located on the Internet at: http://download.nikonimglib.com/archive2/iBuJv00Aj97i01y8BrK49XX0Ts69/ D300,EU(En)04.pdf (attached as Exhibit 5 from the Defendant Wells Fargo Bank, N.A.'s Answer dated Aug. 14, 2018), 195 pgs.
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Nokia N90 Phone Features, 2005, 4 pgs.
Nokia N90 Review Digital Trends, dated Feb. 11, 2019, obtained from the Internet at: https://www.digitaltrends.com/cell-phone-reviews/nokia-n90- review/, 11 pgs.
Nokia N90 User Guide, 2005, 132 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60 pgs.
Nokia N95 8GB User Guide, copyright 2009, (from the Wells Fargo Bank, N.A. IPR2019-00815, filed on Mar. 20, 2019), Part 3 of 3, 53 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, cited in U.S. Pat. No. 7,900,822, as dated 2006 (3 pgs).
Oxley, Michael G., from committee on Financial Services: "Check Clearing For the 21$^{st}$ Century Act, 108$^{th}$ Congress, 1$^{st}$ Session House of Representatives report 108-132", Jun. 2003 (20 pgs).
Oxley, Michael G., from committee of conference: "Check Clearing For the 21$^{st}$ Century Act" 108$^{th}$ Congress, 1$^{st}$ Session Senate report 108-291, Oct. 1, 2003 (20 pgs).
P.R. 4-3 Joint Claim Construction and Pre-Hearing Statment, *United Services Automobile Association* v. *Wells Fargo Bank, N.A.*, Civil Action No. 2:18-cv-366, dated Apr. 5, 2019, 190 pgs.
Palacios, Rafael et al., "Automatic Processing of Brazilian Bank Checks", Cited in U.S. Pat. No. 7,900,822, as dated 2002 (28 pgs).
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
Panini My Vision X Operator Manual, Panini, 2004, (cited in IPR2020-00093, U.S. Pat. No. 9,892,454), 51 pgs.
Pappas, A., "Taking Sharper Pictures Is Now a Snap as Sprint Launches First 1.3-Megapixal Camera Phone in the United States", 2004, 2 pgs.
Parikh, T., "Mobile Phones and Paper Documents: Evaluating a New Approach for Capturing Microfinance Data in Rural India", CHI 2006 Proceedings, 2006, 10 pgs.
Parikh, T., "Using Mobile Phones for Secure, Distributed Document Processing in the Developing World", IEE Persuasive Computing, vol. 4, No. 2, 2009, 9 pgs.
Parties'P.R.4-5(D) Joint Claim Construciton Chart, filed in Civil Action No. 2:18-CV-245, dated Jun. 14, 2019, 28 pgs.
Parties'P.R.4-5(D) Joint Claim Construciton Chart, filed in Civil Action No. 2:18-CV-366, dated Jun. 18, 2019, 27 pgs.
Parties'P.R.4-5(D) Joint Claim Construciton Chart, *United Services Automobile Association* v. *Wells Fargo Bank, N.A.*, Civil Action No. 2;18-cv-245, dated May 9, 2019, 25 pgs.
Patent Dislaimer for U.S. Pat. No. 8,699,779, filed on Mar. 4, 2019, 2 pgs.
Patent Dislaimer for U.S. Pat. No. 8,977,571, filed on Feb. 20, 2019, 2 pgs.
Patent Dislaimer for U.S. Pat. No. 9,336,517, filed on Mar. 4, 2019, 2 pgs.
Patent Dislaimer for U.S. Pat. No. 9,818,090, filed on Feb. 20, 2019, 2 pgs.
Patterson, Scott "USAA Deposit@Home—Another WOW moment for Net Banking", NextCU.com, Jan. 26, 2007 (5 pgs).
Pbmplus—image file format conversion package, retrieved from https://web.archive.org/web/20040202224728/https:/www.acme.com/software/pbmplus/.
Petition filed by PNC Bank N.A. for Inter Partes Review of Claims 1-18 of U.S. Pat. No. 10,621,559, dated Jul. 21, 2021, IPR2021-01076, 111 pages.
Petition filed by PNC Bank N.A. for Inter Partes Review of Claims 1-18 of U.S. Pat. No. 10,621,559, dated Jul. 21, 2021, IPR2021-01077, 100 pages.
Petition filed by PNC Bank N.A. for Inter Partes Review of Claims 1-23 of U.S. Pat. No. 10,482,432, dated Jul. 14, 2021, IPR2021-01071, 106 pages.
Petition filed by PNC Bank N.A. for Inter Partes Review of Claims 1-30 of U.S. Pat. No. 10,013,681, filed Aug. 27, 2021, IPR2021-01381, 127 pages.
Petition filed by PNC Bank N.A. for Inter Partes Review of Claims 1-7, 10-21 and 23 of U.S. Pat. No. 10,482,432, dated Jul. 14, 2021, IPR2021-01074.
Petition filed by PNC Bank N.A. for Inter Partes Review of U.S. Pat. No. 10,013,605, filed Aug. 27, 2021, IPR2021-01399, 113 pages.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
Plaintiff and Counterclaim Defendant's Answer to Defendant and Counterclaims Plaintiff's Amended Answer, Affirmative Defenses, & Counterclaims, *United Services Automobile Association* v. *Wells Fargo Bank, N.A.*, Civil Action No. 2:18-cv-245, dated Mar. 21, 2019, 36 pgs.
Plaintiff and Counterclaim Defendant's Answer to Defendant and Counterclaims Plaintiff's Amended Answer, Affirmative Defenses, & Counterclaims, *United Services Automobile Association* v. *Wells Fargo Bank, N.A.*, Civil Action No. 2:18-cv-366, dated Apr. 26, 2019, 18 pgs.

(56) References Cited

OTHER PUBLICATIONS

Plaintiff's Notice of Decision Denying Institution of Covered Business Method Patent Review, filed in Civil Action No. 2:18-CV-245, dated May 15, 2019, 36 pgs.

Plaintiff's Notice of Decisions Denying Institution of Covered Business Method Patent Review, filed in Civil Action No. 2:18-CV-245, dated Jun. 6, 2019, 61 pgs.

Plaintiff's Notice of Filing Claim Construction Presentation, filled in Civil Action No. 2:18-CV-245, dated May 23, 2019, 106 pgs.

PNC Bank to Offer Ease of Online Deposit Service Integrated with QuickBooks to Small Business, RemoteDepositCapture.com, Jul. 24, 2006, 2 pgs.

*POP, ARC and BOC—A Comparison*, Federal Reserve Banks, at 1(Jan. 7, 2009), available on the Internet at: https://web.archive.org/web/20090107101808/https://www.frbservices.org/files/eventseducation/ pdf/pop_arc_boc_comparison.pdf (attached as Exhibit 13 from the Defendant Wells Fargo Bank, N.A.'s Answer dated Aug. 14, 2018), 3 pgs.

Provisional patent application filed by Wells Fargo Bank, dated Jan. 29, 2008, 134 pgs.

Public Law 108-100, 108 Congress; "An Act Check Clearing For the 21$^{st}$ Century Act", Oct. 28, 2003, 117 STAT. 1177 (18 pgs).

Quinn and Roberds, *The Evolution of the Check as a Means of Payment: A Historical Survey*, Federal Reserve Bank of Atlanta, Economic Review, 2008, 30 pgs.

Rao, Bharat; "The Internet And The Revolution in Distribution: A Cross—Industry Examination"; Technology in Society; 1999; pp. 287-306; vol. 21, No. 3 (20 pgs).

Readdle, Why Scanner Pro is Way Better Than Your Camera? (Jun. 27, 2016) retrieved from https://readdle.com/blog/why-scanner-pro-is-way-better-than-your-camera.

Remote Deposit Capture Basic Requirements, dated Aug. 22, 2009, 1 pg.

Remote Depsit Capture.com Scanner Matrix, dated Oct. 21, 2011, 3 pgs.

Remotedepositcapture, URL:www.remotedepositcapture.com, Cited in U.S. Pat. No. 7,900,822, as dated 2006 (5 pgs).

RemoteDepositCapture.com, Remote Deposit Capture News Articles from Jul. 6, 2006, "BankServ Announces New Remote Deposit Product Integrated with QuickBooks" (3 pgs).

Remotedepsitcapture.com, LLC, "Remote Deposit Capture Overview," ROC Overview, http://remotedepositcapture.com/overview/RDC_overview.htm, Cited in Pat. No. 7,900,822, as dated Mar. 12, 2007 (4 pgs).

Richey, J. C. et al., "EE 4530 Check Imaging," Nov. 18, 2008 (10 pgs).

Ritzer, J.R. "Hinky Dinky helped spearhead POS, remote banking movement", Bank Systems and Equipment, vol. 21, No. 12, Dec. 1984 (1 pg).

Rivlin, Alice M. et al., Chair, Vice Chair—Board of Governors, Committee on the Federal Reserve in the Payments Mechanism—Federal Reserve System, " The Federal Reserve in the Payments Mechanism", Jan. 1998 (41 pgs).

Rockwell, *The Megapixel Myth*, KenRickwell.com, 2008, located on the Internet at: http://kewrockwell.com.tech/mpmyth.htm, 6 pgs.

Rohs, M. et al., "A Conceptual Framework for Camera Phone-based Interaction Techniques", Swiss Federal Institute of Technology, Zurich, Switzerland, 19 pgs.

Rose, Sarah et al., "Best of the We: The Top 50 Financial Websites", Money, New York, Dec. 1999, vol. 28, Iss. 12 (8 pgs).

Rowles, Tony, USAA-v. Wells Fargo No. 2:16-cv-245-JRGL e-mail correspondence dated Jan. 24, 2019, 2 pgs.

Santomero, The Evolution of Payments in the U.S.: Paper vs. Electronic (2005) retrieved from https://web.archive.org/web/20051210185509/https://www.philadelphiafed.org/publicaffairs/speeches/2005_santomero9.html.

SCH0i910 Portable Dualmode Smartphone User Guide by Samsung, Copyright 2009 Samsung Electronics Canada, downloadable from www.manualslib.com, 168 pgs.

Schindler, Scanner Pro Review (Dec. 27, 2016) retrieved from https://www.pcmag.com/reviews/scAnner-pro.

Sechrest, Stuart et al., "Windows XP Performance", Microsoft, dated Jun. 1, 2001, 20 pgs.

Shah, *Moore's Law*, Continuous Everywhere But Differentiable Nowhere, Feb. 12, 2009, located on the Internet at: http://samjshah.com/2009/02/24/morres-law/, 5 pgs.

Shelby, Hon. Richard C. (Committee on Banking, Housing and Urban Affairs); "Check Truncation Act of 2003", calendar No. 168, 108$^{th}$ Congress, 1$^{st}$ Session Senate report 108-79, Jun. 2003 (27 pgs).

Sing Li & Jonathan Knudsen, Beginning J2ME: From Novice to Professional, Third Edition (2005), ISBN (pbk): 1-59059-479-7, 468 pages.

Sony Digital Camera User's Guide/ Trouble Shooting Operating Instrucitons, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.

Sony Ericsson K800i—Product Overview, 2006, 2 pgs.

Sony Ericsson K800i, User Manual, Part 1, 2006, 98 pgs.

SoyBank Anywhere, "Consumer Internet Banking Service Agreement," Dec. 6, 2004 (6 pgs).

Spencer, Harvey, "White Paper Check 21 Controlling Image Quality At The Point of Capture", dated 2004, 7 pgs.

Sprint PCS Vision Picture Phone, PM-8920 by Audiovox, User's Manual, Part 1, 2004, 103 pgs.

Stellin, Susan, "Bank Will Allow Customers to Direct Deposit by iPhone", the New York Times article dated Aug. 9, 2009, obtained from the Internet at: www.nytimes.com/2009/08/10/technology/10check.html, 3 pgs.

Sumits, *Major Mobile Milestones—The Last 15 Years, and the Next Five*, Cisco Blogs, Feb. 3, 2016, located on the Internet at: https://blogs.cisco.com/sp/mobile-vni-major-mobile-milesrones-the-last15-years-and-the-next-five, 12 pgs.

Teixeira, D., "Comment: Time to Overhaul Deposit Processing Systems," American Banker, Dec. 10, 1998, vol. 163, No. 235, p. 15 (3 pgs).

Thailandguru.com: How and where to Pay Bills @ www.thailandguru.com/paying-bills.html, © 1999-2007 (2 pgs).

The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).

The Green Sheet 2.0: Newswire, "CO-OP adds home deposit capabilities to suite of check imaging products", www.greensheet.com/newswire.php?newswire_id=8799, Mar. 5, 2008 (2 pgs).

Timothy R. Crews list of Patents, printed from the United States Patent and Trademark Office on Feb. 13, 2019, 7 pgs.

Tochip, E. et al., "Camera Phone Color Appearance Utility—Finding a Way to Identify Camera Phone Picture Color", 25 pages, 2007.

Tygar, J.D., Atomicity in Electronic Commerce, In ACM Networker, 2:2, Apr./May 1998 (12 pgs).

U.S. Appl. No. 61/022,279, dated Jan. 18, 2008, (cited in IPR2020-00090, U.S. Pat. No. 9,177,197), 35 pgs.

USAA's Objections to Magistrate Judge Payne's Claim Construction Memorandum Opinion and Order, filed in Civil Action No. 2:18-CV-245, dated Jun. 27, 2019, 6 pgs.

USAA's Objections To Magistrate Judge Payne's Claim Construction Memorandum Opinion and Order, *United Services Automobile Association* v. *Wells Fargo Bank, N.A.*, Civil Action No. 2:18-cv-366, dated Aug. 12, 2019, 10 pgs.

USAA's Opening Claim Construction Brief, filed in Civil Action No. 2:18-CV-366, dated May 17, 2019, 32 pgs.

USAA's Opening Claim Construction Brief, *United Services Automobile Association* v. *Wells Fargo Bank, N.A.*, Civil Action No. 2:18-cv-245, dated Apr. 11, 2019, 32 pgs.

USAA's Reply Claim Construction Brief, *United Services Automobile Association* v. *Wells Fargo Bank, N.A.*, Civil Action No. 2:18-cv-245, dated May 2, 2019, 227 pgs.

(56) References Cited

OTHER PUBLICATIONS

USAA's Reply to Claim Construction Brief, *United Services Automobile Association* v. *Wells Fargo Bank, N.A.*, Case No. 2:18-cv-245, dated May 2, 2019, 15 pgs.

USAA's Reply Claim Construction Brief, filed in Civil Action No. 2:18-CV-366, dated Jun. 7, 2019, 14 pgs.

Valentine, Lisa, "Remote Deposit Capture Hot Just Got Hotter," ABA Banking Journal, Mar. 2006, p. 1-9.

Van Dyke, Jim, "2017 Mitek Mobile Deposit Benchmark Report", copyright 2017, 25 pgs.

Varearn, Craig, "Image Deposit Solutions: Emerging Solutions for More Efficient Check Processing," JP Morgan Chase, Nov. 2005 (16 pgs).

Wade, Will, "Early Debate on Remote-Capture Risk," American Banker, New York, NY, May 26, 2004 (3 pgs).

Wade, Will, "Early Notes: Updating Consumers on Check 21" American Banker Aug. 10, 2004 (3 pgs).

Wallison, Peter J., "Wal-Mart Case Exposes Flaws in Banking-Commerce Split", American Banker, vol. 167. No. 8, Jan. 11, 2002 (3 pgs).

Wang, Ching-Lin et al. "Chinese document image retrieval system based on proportion of black pixel area in a character image", the 6th International Conference on Advanced Communication Technology, 2004, vol. 1, IEEE, 2004.

Wausau Financial Systems, *Understanding Image Quality & Usability Within a New Environment*, 2006, 22 pgs.

Wausau, "Understanding Image Quality & Usability Within a New Environment", copyright 2019, 1 pg.

Wells Fargo 2005 News Releases, "The New Wells Fargo Electronic Deposit Services Break Through Banking Boundaries In The Age of Check 21", San Francisco Mar. 28, 2005, www.wellsfargo.com/press/3282005_check21Year=2005 (1 pg).

Wells Fargo Commercial, "Remote Deposit", www.wellsfargo.com/com/treasury mgmtlreceivables/electronic/remotedeposit, Copyright 2008 (1 pg).

Wells Fargo's Objections to Magistrate Judge Payne's Claim Construction Memorandum and Order, filed in Civil Action No. 2:18-CV-245, dated Jun. 27, 2019, 7 pgs.

Wells Fargo's Objections To Magistrate Judge Payne's Claim Construction Memorandum Opinion and Order, *United Services Automobile Association* v. *Wells Fargo Bank, N.A.*, Civil Action No. 2:18-cv-366, dated Aug. 12, 2019, 7 pgs.

White, J.M. et al., "Image Thresholding for Optical Character Recognition and Other Applications Requiring Character Image Extraction", IBM J. Res. Development, Jul. 1983, vol. 27, No. 4 (12 pgs).

Whitney, Steve et al., "A Framework For Exchanging Image Returns", dated Jul. 2001, 129 pgs.

Wikipedia ®, "Remote Deposit," http://en.wikipedia.org/wiki/Remote_deposit, 2007 (3 pgs).

Windowsfordevices.com, "Software lets camera phone users deposit checks, pay bills", www.windowsfordevices.com/news/NS3934956670.html, Jan. 29, 2008 (3 pgs).

Wolfe, Daniel, "Check Image Group Outlines Agenda," American Banker, New York, N.Y.: Feb. 13, 2009, vol. 174, Iss. 30, p. 12. (2 pgs).

Woody Baird Associated Press, "Pastor's Wife got Scammed—She Apparently Fell for Overseas Money Scheme," The Commercial Appeal, Jul. 1, 2006, p. A. 1.

X9.100-180, "The New ICL Standard is Published", All My Papers, 2006, 3 pgs.

X9.37 Specifications | X9Ware LLC, dated 2018, 3 pgs.

Yeo, L.H. et al., "Submission of transaction from mobile workstations in a cooperative multidatabase environment", IEEE, 1994, (cited in IPR2020-00097, U.S. Pat. No. 7,885,880), 10 pgs.

Zandifar, A. et al., "A Video Based Interface To Textual Information For The Visually Impaired", IEEE 17th International Symposium on Personal, Indoor and Mobile Radio Communications, 1-5, 2002, 6 pgs.

Zandifar, A., "A Video-Based Framework for the Analysis of Presentations/Posters," International Journal on Document Analysis and Recognition, Feb. 2, 2005, 10 pages.

Zaw, Kyi Pyar and Zin Mar Kyu, "Character Extraction and Recognition for Myanmar Script Signboard Images using Block based Pixel Count and Chain Codes" 2018 IEEE/ACIS 17th International Conference on Computer and Information Science (CS), IEEE, 2018.

Zhang, C.Y., "Robust Estimation and Image Combining" Astronomical Data Analysis Software and Systems IV, ASP Conference Series, 1995 (5 pgs).

Zions Bancorporation, "Moneytech, the technology of money in our world: Remote Deposit," http://www.bankjunior.com/pground/moneytech/remote_deposit.jsp, 2007 (2 pgs).

Bruno-Britz, Maria "Mitek Launches Mobile Phone Check Capture Solution," Bank Systems and Technologies Information Week (Jan. 24, 2008).

V User Guide, https://www.lg.com/us/support/manualsdocuments?customerModelCode=%20LGVX9800&csSalesCode=LGVX9800, select"VERISON(USA) en"; The V_UG_051125.pdf.

MING Phone User Manual, 2006.

Patel, Kunur, "How Mobile Technology is Changing Banking's Future" AdAge, Sep. 21, 2009, 4 pages.

Spencer, Harvey, "Controlling Image Quality at the Point of Capture" Check 21, Digital Check Corporation & HSA 2004.

Moseik, Celeste K., "Customer Adoption of Online Restaurant Services: A Multi-Channel Approach", Order No. 1444649 University of Delaware, 2007, Ann Arbor: ProQuest., Web. Jan. 10, 2022 (Year: 2007).

Bieniecki, Wojciech et al. "Image Preprocessing for Improving OCR Accuracy", Computer Engineering Department, Technical University of Lodz, al. Politechniki 11, Lodz Poland.

Shaikh, Aijaz Ahmed et al., "Auto Teller Machine (ATM) Fraud—Case Study of Commercial Bank in Pakistan", Department of Business Administration, Sukkur Institute of Business Administration, Sukkur, Pakistan.

Tiwari, Rajnish et al., "Mobile Banking as Business Strategy", IEEE Xplore, Jul. 2006.

Lyn C. Thomas, "A survey of credit and behavioural scoring: forecasting financial risk of lending to consumers", International Journal of Forecasting, (Risk) (2000).

Non-Final Office Action issued on U.S. Appl. No. 14/293,159 dated Aug. 11, 2022.

Non-Final Office Action issued on U.S. Appl. No. 16/455,024 dated Sep. 7, 2022.

Non-Final Office Action issued on U.S. Appl. No. 17/071,678 dated Sep. 14, 2022.

Non-Final Office Action issued on U.S. Appl. No. 17/180,075 dated Oct. 4, 2022.

Non-Final Office Action issue on U.S. Appl. No. 17/511,822 dated Sep. 16, 2022.

Non-Final Office Action issued on U.S. Appl. No. 17/568,849 dated Oct. 4, 2022.

Yong Gu Ji et al., "A Usability Checklist for the Usability Evaluation of Mobile Phone User Interface", International Journal of Human-Computer Interaction, 20(3), 207-231 (2006).

Printout of news article dated Feb. 13, 2008, announcing a Nokia phone providing audio cues for capturing a document image.

IPR Petition 2022-01593, *Truist Bank* v. *United Services Automobile Association* filed Oct. 11, 2022.

Final Written Decision, IPR2021-01070, dated Jan. 19, 2023.

Final Written Decision, IPR2021-01073, dated Jan. 19, 2023.

Publication of U.S. Appl. No. 60/727,533, filed Oct. 17, 2005, related to U.S. Appl. No. 60/727,533, filed Oct. 17, 2005.

Ans X9.100-160-1-2004, Part 1: Placement and Location of Magnetic Ink Printing (MICR), American National Standard for Financial Services, approved Oct. 15, 2004.

Clancy, Heather, "Turning cellphones into scanners", The New York Times, Feb. 12, 2005: https://www.nytimes.com/2005/02/12/busienss/worldbusiness/turning-cellphones-into-scanners.html.

Consumer Guide to Check 21 and Substitute Checks, The Federal Reserve Board, The Wayback Machine—Oct. 28, 2004: https://web.archive.org/web/20041102233724/http://www.federalreserve.gov.

(56) References Cited

OTHER PUBLICATIONS

Curtin, Denis P., A Short Course in Digital Photography Chapter 7 Graphic File Formats.
Dance, Christopher, "Mobile Document Imaging", Xerox, Research Centre Europe, XRCE Image Processing Area, Nov. 2004.
Digital Photography Now, Nokia N73 Review, Oct. 28, 2006.
Federal Reserve System, 12 CFR Part 229, Regulation CC: Docket No. R-1176, Availability of Funds and Collection of Checks, Board of Governors of the Federal Reserve System Final rule.
Financial Services Policy Committee, Federal Reserve Banks Plan Black-and-White Image Standard and Quality Check, May 18, 2004.
MICR-Line Issues Associated With The Check 21 Act and the Board's Proposed Rule, Prepared by Federal Reserve Board Staff, Apr. 27, 2004.
Microsoft Computer Dictionary Fifth Edition—Copyright 2002.
HTTP Over TLS, Network Working Group, May 2000, Memo.
Nokia N73—Full phone specifications.
Ranjan, Amit, "Using a Camera with Windows Mobile 5", Jul. 21, 2006.
Reed, John, "FT.com site: Mobile users branch out", ProQuest, Trade Journal, Oct. 6, 2005.
Weiqui Luo et al., "Robust Detection of Region-Duplication Forgery in Digital Image" Guoping Qui, School of Computer Science, University of Nottingham, NG8 1BB, UK—Jan. 2006.
Final Written Decision relating to U.S. Pat. No. 8,699,779, IPR2021-01070, dated Jan. 19, 2023.
Final Written Decision relating to U.S. Pat. No. 8,877,571, IPR2021-01073, dated Jan. 19, 2023.
Final Written Decision relating to U.S. Pat. No. 10,621,559, IPR2021-01077, dated Jan. 20, 2023.
IPR2023-00829 filed Apr. 13, 2023, *Truist Bank* vs. *United Services Autombile Association*, 97 pgs.
"Reserve Banks to Adopt DSTU X9.37-2003 Format for Check 21 Image Services," Fed. Reserve Bank of Minneapolis Fin. Serv. Policy Comm., May 18, 2004.
"Camera Phone Shoot-Out", Phone Scoop, Dec. 18, 2002.
Shirai, K. et al., "Removal of Background Patterns and Signatures for Magnetic Ink Character Recognition of Checks," 2012 10$^{th}$ IAPR International Workshop on Document Analysis Systems, Gold Coast, QLD. Australia, 2012, pp. 190-194.
Ding, Y. et al., "Background removal for check processing using morphology in Two-and Three-Dimensional Vision Systems for Inspection, Control, and Metrology". vol. 5606, pp. 19-26, SPIE 2004.
Haskell, B.G. et al, "Image and video coding-emerging standards and beyond," in IEEE Transactions on Circuits and Systems for Video Technology, vol. 8 No. 7, pp. 814-837, Nov. 1998.

\* cited by examiner

SYSTEM, COMPUTING DEVICE, AND METHOD FOR DOCUMENT DETECTION AND DEPOSIT PROCESSING

BACKGROUND

Electronic check image detection and remote check depositing are part of technological improvements to the manual process of check depositing known as remote deposit. In general, checks provide a convenient method for an individual such as a payor to transfer funds to a payee. To use a check, an individual usually opens a checking account, or other similar account, at a financial institution and deposits funds, which are then available for later withdrawal. To transfer funds with a check, the payor usually designates a payee and an amount payable on the check. In addition, the payor often signs the check. Once the check has been signed, it is usually deemed negotiable, meaning the check may be validly transferred to the payee upon delivery. By signing and transferring the check to the payee, the payor authorizes funds to be withdrawn from the payor's account on behalf of the payee.

While a check may provide a payor with a convenient and secure form of payment, receiving a check may put certain burdens on the payee, such as the time and effort required to deposit the check. For example, depositing a check typically involves going to a local bank branch and physically presenting the check to a bank teller.

To reduce such burdens for the payee, as well as the payor, remote deposit technology has been developed to include systems and methods that enable the remote deposit of checks that overcome the need for some of the manual processes in prior check deposit procedures. However, existing remote deposit systems typically utilize specific, deterministic algorithms to analyze the various features of digital images of checks that are captured by remote devices of account holders and transmitted to financial institutions for deposit. The deterministic algorithms, while typically a good tool for handling digital images having a fixed set of characteristics, may not be as accurate as desired in identifying features or qualities of captured images over a wider variation of characteristics, and thus may lead to delays or failures in the processing of remote deposits.

DESCRIPTION OF THE FIGURES

The present disclosure may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2 shows an exemplary digital image depicting a check and a background.

FIG. 3 shows an exemplary modified digital image depicting a check and a background including edge coordinates.

FIG. 4 shows an exemplary segmented digital image depicting a check and a background.

FIG. 5 shows an exemplary grayscale histogram of a digital image.

DETAILED DESCRIPTION

Figure 1:
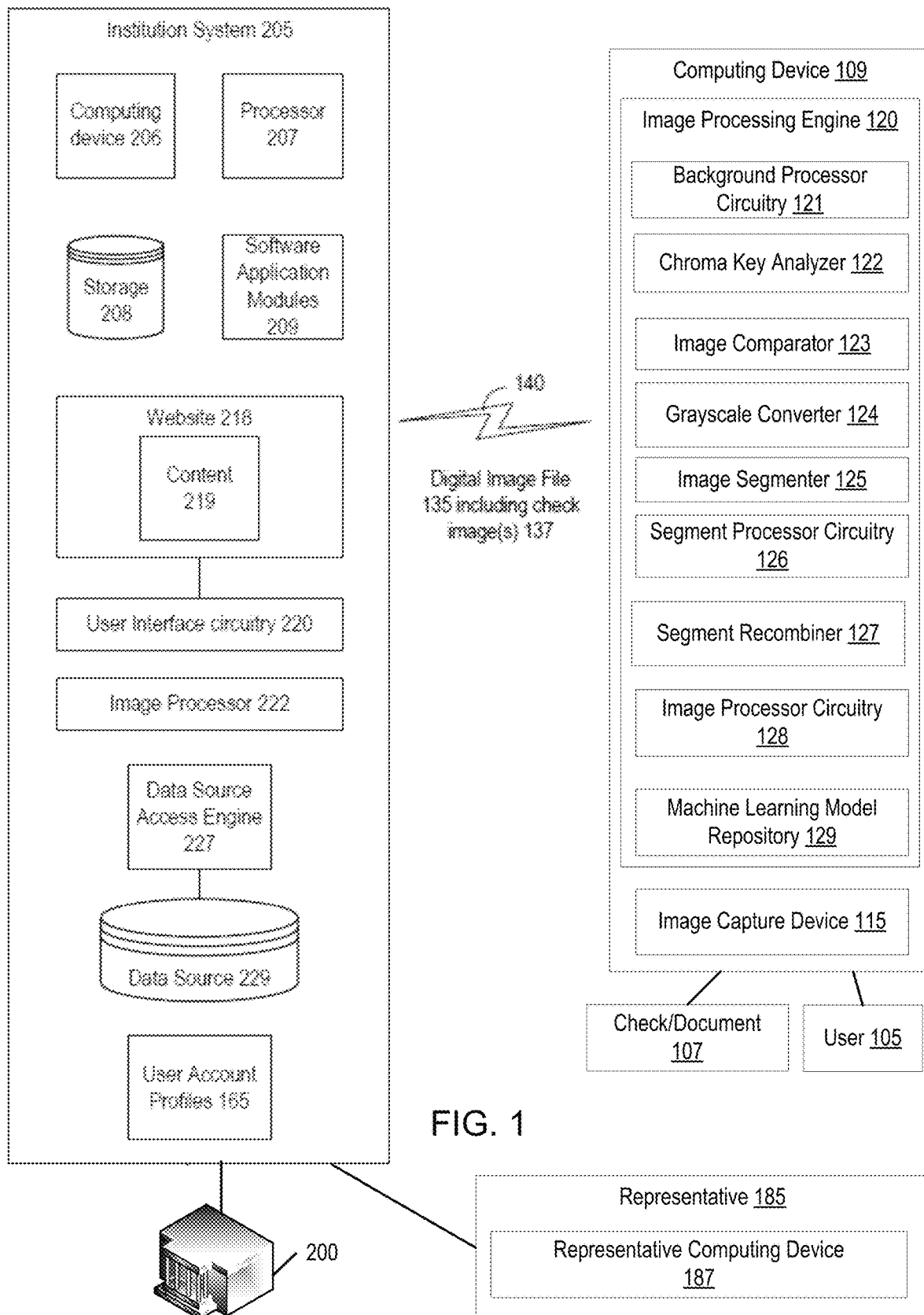
FIG. 1 shows an exemplary system for implementing remote deposit.

The methods, devices, and systems discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Within the technological field of remote deposit, a payor may present a check, either in paper or electronic versions, to a payee for deposit. To deposit the check with a financial account at a financial institution associated with the payee, the payee may scan a check in a digital image using a scanner, digital camera, or other imaging device in communication with a computing device. A financial institution may then receive from the payee the digital image of the check. The financial institution may then use the digital image to credit funds to the payee. Such remote deposit techniques utilize the efficient and accurate detection of a check depicted within a digital image, where part of the check image detection includes detecting and extracting the check image from background portions included in the digital image that are not part of the check image.

Traditional, deterministic, image processing algorithms can fail to clearly and reliably detect the border of a check. Such a failure can prevent successful processing of check contents and the failure of traditional algorithms can often be the result of insufficient contrast between the background portions and the check in a captured image. Another common challenge for successful image processing to find a check in an image with traditional algorithms is the presence of reflections or shadows in the image. As described herein, a machine learning model that may be more resilient over a range of color and lighting conditions than any single deterministic technique can be trained to identify a check from the background by, for example, identifying the bounding box coordinates (corners).

Yet another challenge presented by processing images captured of checks is that of de-morphing or de-warping a check image. Distortions in an image can occur when there is a large angle between the camera and the check, or where portions of the check are folded and appear at a different angle than another portion of the check in the image. Again, traditional, deterministic algorithms exist that can address certain of these distortions, however a deep learning (also referred to herein as machine learning) model is disclosed herein that may be trained to learn and apply the necessary translation, scaling, rotation and shearing of an image in a more robust manner that stand-alone algorithms.

Issues with identifying information within a check image may also be a challenge for systems that capture and process check images. For example, the printed text on a check often cannot be read correctly due to background noise. Traditional systems and deterministic algorithms can have difficulty consistently removing noise from the printed text. This noise may be in the form of the overlap of a signature or other handwritten notes on the printed text, reflections or shadows that are present in the image, creases or wrinkles in the check, and so on. Here again, a machine learning model may be generated and trained to identify and remove background noise so that a clean image is left for processing.

Yet another check processing task that institutions perform is duplicate check detection. Members of a bank or other financial institution may attempt to deposit the same check multiple times, either fraudulently or by accident. Existing techniques and systems for handling duplicate check detection typically involve a database of check numbers with a limited lookback window, or simply involve manual check reviews. These existing techniques are often subject to missed detection opportunities, and are ultimately susceptible to fraud losses. As also described herein, a machine learning model may be trained to recognize duplicate checks in a greater range of conditions than may be available in current techniques. In one implementation, a perceptual hash of an image may be encoded from the image that allows for an efficient image similarity check on a large scale that can handle many lighting and shadow variations.

The image processing steps for detecting and extracting the check image from the background portions may be implemented in whole, or in parts, on either a user device having captured the digital image, a remote server running an application for remote deposit, or both. Implementing these image processing steps are known to expend significant computing resources on a computing device, and so there are benefits to offloading, or sharing, some or all of the image processing between the user device and the remote server. However, with the improvements to the computing capabilities of mobile computing devices, it is within the scope of this disclosure for one or more, or all, of the image processing features to be implemented directly on the mobile computing device (e.g., user device). For example, the ability to select between existing deterministic algorithm and trained machine learning models may be implemented at the initial remote deposit application download stage, where the mobile computing device and/or remote server device communicate to exchange mobile computing device capabilities.

In one implementation, only a limited set of total available deterministic or machine learning enables techniques that the mobile computing device can efficiently be expected to execute will be transferred to the mobile device with the remote deposit application. In other implementations, the complete set of deterministic and trained machine learning models for image processing may be included in the downloaded app and the mobile computing device may select which of the algorithms or machine learning models to apply for a given image capture and processing session. Alternatively, the machine learning model need not be persistent on the mobile device and may be temporarily downloaded, on an as-needed basis, via a web interface or a previously downloaded application programming interface (API). Additionally, the download of the machine learning model(s) to the phone or other mobile device need not be directly from the financial institution or third party remote check deposit handling service. Instead, the model(s) or deterministic algorithms may be downloaded to the phone or mobile device from a local network inside a user's home.

In the disclosed embodiments, features are disclosed for dedicating image processing from the remote server to the user device, as well as for dedicating image processing from the user device to the remote server. The determination of where the image processing will be implemented may be determined, for example, according to detected attributes of the captured digital image depicting the check, computing capabilities of the mobile device including the image capture device, and/or environmental conditions (e.g., ambient light levels) detected when the digital image was captured. Given the processing advantage typically afforded a server-based system as compared to a remote device, such as a handheld tablet or smart phone, the bulk of the processing may be described below as primarily taking place on a server of an institution rather than on the remote device of a user. However, some or all of the functionality and circuitry may be included on the user device in different implementations. Also, with respect to the training of deep learning (machine learning) models, the processing power of a remote server is generally used, regardless of the location of the processing that later implements the trained model. In some alternative implementations, training for one or more of the models discussed herein may be performed at the user device. The training of a machine learning model can be updated with localized data from end users. The end user data may be transmitted back to a central server periodically or in real-time for periodic or real-time training updates to better optimize the model.

FIG. 1 shows a block diagram of an implementation of a system 100 in which example embodiments may be implemented. A user 105 is shown along with an institution system 205. The institution system 205 may be affiliated with an institution 200, which may be any type of entity capable of processing a transaction involving a negotiable instrument, such as processing checks and/or providing funds associated with checks. For example, the institution 200 may be a financial services institution such as a retail bank, an investment bank, an investment company, a regional branch of the Federal Reserve, a clearinghouse bank and/or a correspondent bank. A representative 185 of the institution 200 may provide assistance, via a representative computing device 187, during any one or more of the processes described herein.

A negotiable instrument typically includes a type of contract that obligates one party to pay a specified sum of money to another party. Negotiable instruments may include checks, money orders, cashier's checks, drafts, bills of exchange, promissory notes, and the like. A check instructs a financial institution to pay an amount of money from a specific account held in the payor's name with that financial institution to an account held in the payee's name. A money order is a trusted financial instrument that is a payment order for a pre-specified amount of money. It is a more trusted method of payment than a personal check because the funds for the amount shown on the money order must be prepaid. A cashier's check (also known as a bank check, official check, teller's check, bank draft or treasurer's check) is a check guaranteed by a bank and may be purchased from a bank. Cashier's checks are usually treated as cash since most banks clear them instantly.

For example, the computing device 109 may be a personal computer (PC), a laptop computer, a handheld computing device, a personal digital assistant (PDA), a mobile phone, or a smartphone, for example. The computing device 109 includes an image capture device 115 for capturing an image of the check, where the image capture device 115 may be a digital camera, image scanner, or other device in which the image of the check 107 may be obtained. In some embodiments, the image capture device 115 may be camera with multiple different lenses, or multiple separate cameras each with its own lens. Each camera or camera lens of a multiple lens image capture device 115 may be controlled individually or concurrently to capture one or more images of a check at the same time or in sequence. Each camera lens may be the same or different to capture the image of a check from differing angles or offsets from each other camera lens. Alternatively or additionally, the lenses and/or the associated camera sensor or circuitry in a multiple camera embodiment of an image capture device 115 may be configured to capture a different portion of the electromagnetic spectrum, for example each lens or camera sensor may be calibrated to a respective one of visible frequencies, infrared frequencies or ultraviolet frequencies.

The user 105 may be an individual or entity who has an account 165 held at the institution 200 and is accessible via the institution system 205. The account 165 may be any type of account for depositing funds, such as a savings account, a checking account, a brokerage account, and the like. Although only one account 165 is shown, it is contemplated that the user 105 may have any number of accounts held at the institution 200. The user 105 may deposit a check 107 or other negotiable instrument document into the account 165 either electronically or physically. The institution 200 may process and/or clear the check 107, as well as other types of negotiable instruments.

The user 105 may remotely electronically deposit the check 107 at the institution 200 via the computing device 109 being operated by the user 105. For example, an application (sometimes referred to herein as an "app") for remotely electronically depositing checks may be downloaded, from a third party provider such as the APPLE App Store or from the institution system 205, and installed on the computing device 109, where running the application on the computing device 109 enables the user 105 to remotely electronically deposit the check 107. It is noted that although examples and implementations described herein may refer to a check, the techniques and systems described herein are contemplated for, and may be used for, any negotiable instrument, such as a money order, a cashier's check, a check guaranteed by a bank, or the like. Similarly, the techniques and systems described herein are contemplated for and may be used with any form or document whose image may be captured with a scanner, camera, or other imaging device for subsequent storage and/or processing.

The user 105 may access the institution 200 via the institution system 205 by opening a communication pathway via a communications network 140 using the computing device 109. The communications network 140 may be representative of an intranet, the Internet, a local area network (LAN), a wide area network (WAN), a wireless fidelity (Wi-Fi) network, a public switched telephone network (PSTN), a cellular network, a voice over Internet protocol (VoIP) network, or the like. The user 105 may also communicate with the institution 200 or the institution system 205 by phone, email, instant messaging, text messaging, web chat, facsimile, postal mail, and the like.

There may be several ways in which the communication pathway may be established, including, but not limited to, an Internet connection via a website 218 of the institution system 205, where the website 218 includes content 219 for accepting remote deposits. The user 105 may access the website 218 and log into the website 218 using credentials, such as, but not limited to, a username and a password.

The user 105 may operate the image capture device 115 installed on the computing device 109 to generate a digital check image of the check 107. The digital check image may be used to create a digital image file 135 that is sent to the institution system 205 and used by the institution 200, in conjunction with the institution system 205, to process a deposit of the check 107 whose image is depicted within the digital image file 135. In an implementation, the digital image file 135 may be augmented by secondary data which may be information relating to the deposit of the check 107, such as an account number and a deposit amount, for example.

When capturing the digital check image, the check 107 may be placed on a background, such that the digital check image that is captured by the image capture device 115 comprises an image of the check (e.g., a check image) and a portion of the background (e.g., a background image). Any background may be used, although a dark background or a consistently colored background may provide more optimal results for distinguishing the check image from the background image within the overall initial image. In an implementation, white and yellow backgrounds may not be used. It is noted that although examples and implementations described herein may refer to a check image and check data, the term "check image" may refer to the check in a digital image (as opposed to the background image) and the term "check data" may refer to any data in a digital check image (as opposed to background data). Thus, "check image" and "check data" may refer to the non-background portion of the image and data from the non-background portion of the image in implementations involving any negotiable instrument, form, or document.

Figures 2, 3:
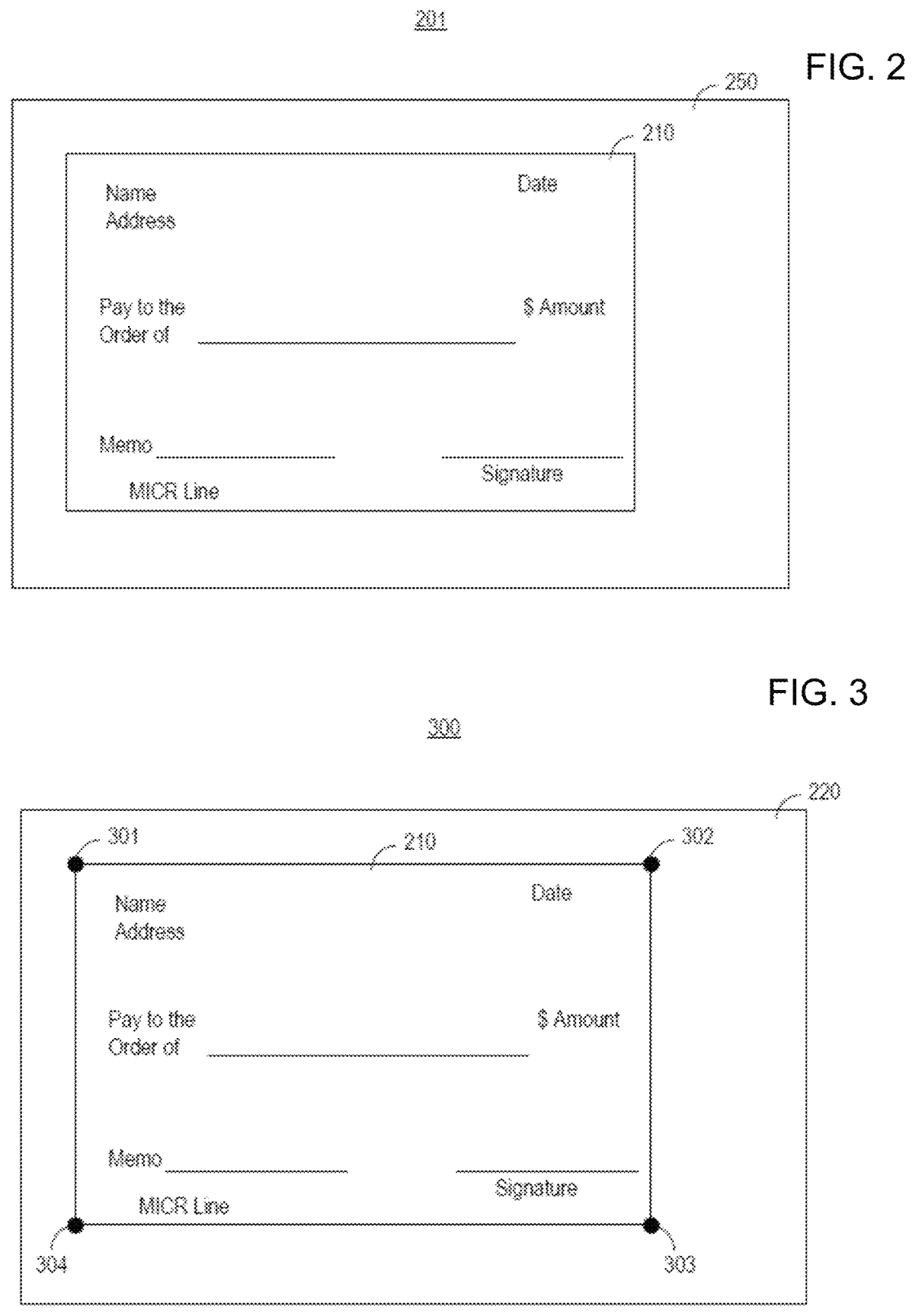

In an implementation, the digital check image generated by the image capture device 115 comprises check data and background data. The check data pertains to the check image in the digital check image and the background data pertains to the background in the digital check image on which the image of the check 107 is disposed. An example of such a digital check image 201 is further described with respect to FIG. 2. The digital check image 201 illustrated in FIG. 2 is comprised of a check image 210 and a background image 250 surrounding the check image 210. The check image 210 is shown to include check data such as name, address, date, payment instructions, payment amount, memo, signature line, and Magnetic Ink Character Recognition (MICR) line information. The background image 250 includes image data for the surface, or whatever other environment, is behind the check 107 when the image capture device 115 captured the digital check image 201. Between the check image 210 and the background image 250, are edges of the check 107. An edge separates the check image 210 from the background image 250, and edge detection techniques will be described in more detail herein.

In an implementation, a minimum ratio of check image size (or area) to background image size (or area) may be provided in the digital check image generated by the image capture device 115. Examples include, and are not limited to, at least a minimum portion (e.g., five percent) of the digital check image may comprise a check image. Other examples of check image to background size include at least a minimum portion (e.g., 1 percent) of the digital check image may comprise a background image, and the check image may be surrounded by at least one pixel of background all the way around the check image, or other predetermined requirements.

Referring back to the computing device 109 shown in FIG. 1, the computing device 109 may comprise an image processing engine 120 that executes image processing features used during the remote deposit process. The image processing engine 120 shown in FIG. 1 includes background processor circuitry 121, a chroma key analyzer 122, an image comparator 123, a grayscale converter 124, an image segmenter 125, segment processor circuitry 126, a segment recombiner 127, and image processor circuitry 128. Additionally, one or more machine learning models may be included in a model repository 129 of the image processing engine 120 that can be executed by the image processor circuitry 128 to handle one or more image processing tasks described herein rather than use a discrete, deterministic algorithm.

When a deterministic algorithm is selected for processing the digital check image 201 depicting the check 107, the background processor circuitry 121 may perform various tasks with respect to the background image 250 included on the digital check image 201. The background image 250 may be a surface on which the check 107 is placed when the digital check image 201 is captured by the image capture device 115. In conjunction with the image capture device 115, the background processor circuitry 121 detects portions of the digital check image 201 corresponding to the background image 250, and distinguishes the background image 250 from the check image 210. The background processor circuitry 121 may further generate a modified digital check image that replaces the background image with a replacement background image. The replacement background image may be selected from one or a plurality of predetermined background images. For example, a predetermined background image may be comprised of a solid color. In an implementation, the background processor circuitry 121 may store the background image 250 and/or the modified digital check image in a storage memory associated with the computing device 109.

Based on the background image 250 being separately detected from the check image 210 according to the techniques applied by the background processor circuitry 121, the image processing engine 120 may identify specific edge coordinates of the check image 210, such as edge coordinates 301, 302, 303, 304 illustrated in FIG. 3. A modified digital check image 300 may be generated by the image processing engine 120 that includes the edge coordinates, where the modified digital check image 300 is included in the digital image file 135 transmitted to the institution system.

An example of an existing deterministic algorithm, as compared to the machine learning model developed from deep learning approaches discussed in greater detail below, is first discussed. In an implementation, the deterministic approach to finding edges of a check may utilize chroma key technology to detect edge coordinates 301, 302, 303, 304 of the check image 210, and/or provide a uniform or consistent replacement background for the check image 210 in the digital check image 201. Chroma key is a technique for mixing two images together, in which a color or color range from one image is removed (or made transparent), revealing another image behind it. This technique is also known as color keying, green screen, and bluescreen. The chroma key analyzer 122 may use any known chroma key technique for removing the original background image 250 and replacing it with (e.g., revealing) a replacement background image. Based on the background image 250 being separately detected from the check image 210 according to the chroma key technique(s) applied by the chroma key analyzer 122, the image processing engine 120 may identify specific edge coordinates for the check image 210, such as the edge coordinates 301, 302, 303, 304 illustrated in FIG. 3. The modified digital check image 300 may be generated by the image processing engine 120 that includes the edge coordinates, where the modified digital check image 300 is included in the digital image file 135 transmitted to the institution system. Although the edge coordinates 301, 302, 303, 304 are illustrated to correspond to corners of the check image, other edge coordinates may correspond to non-corner edge portions that comprise an outer perimeter of the check.

Alternatively or additionally to the deterministic chroma key approach, the background image 250 may be separately distinguished from the check image 210 within the digital check image 201 based on a difference in image characteristics between the background image 250 and the check image 210 analyzed by the image comparator 123. After generating a modified digital check image that replaces the background image 250 with a predetermined replacement background image, the image comparator 123 may compare the modified digital check image with the predetermined replacement background image. By making this known image comparison, the image comparator 123 determines that overlapping the overlapping image portions correspond to a background portion, and the remaining image portions correspond to the check image 210. The image comparator 123 may then determine this difference and subtract the background portion from the modified digital check image to result in obtaining the check image 210 alone without background portions. Based on the check image 210 being separately extracted from the digital check image 201 according to the image comparison technique(s) applied by the image comparator 123, the image processing engine 120 may identify specific edge coordinates for the check image 210, such as the edge coordinates 301, 302, 303, 304 illustrated in FIG. 3. The modified digital check image 300 may be generated by the image processing engine 120 that includes the edge coordinates, where the modified digital check image 300 is included in the digital image file 135 transmitted to the institution system.

In addition, or alternatively, edge detection for the check image may be implemented by comparing the digital check image 201 to a predetermined rectangular shape that represents an outline of the check. This way, the check image 210 may be separately distinguished from the background image 250 within the digital check image 201 based on a matching of the predetermined rectangular shape with edge outlines of the check image 210 analyzed by the image comparator 123. After matching the predetermined rectangular shape to the edge outlines of the check image 210, the image comparator 123 may identify the edge coordinates of the check image 210. Based on the check image 210 being separately identified from the digital check image 201 according to the image comparison technique(s) applied by the image comparator 123, the image processing engine 120 may identify specific edge coordinates for the check image 210, such as the edge coordinates 301, 302, 303, 304 illustrated in FIG.

3. The modified digital check image 300 may be generated by the image processing engine 120 that includes the edge coordinates, where the modified digital check image 300 is included in the digital image file 135 transmitted to the institution system.

According to some embodiments, image processing, such as the edge detection, may be applied to segmented pieces of the digital check image 201. The grayscale converter 124 may convert the digital check image 201 generated by the image capture device 115 to grayscale using known techniques. In photography and computing, a grayscale digital image is an image in which the value of each pixel is a single sample, that is, it carries only intensity information. Images of this sort are composed exclusively of shades of gray, varying from black at the weakest intensity to white at the strongest. Conversion of a color image to grayscale is well known and any known technique(s) may be used.

Figures 4, 5:
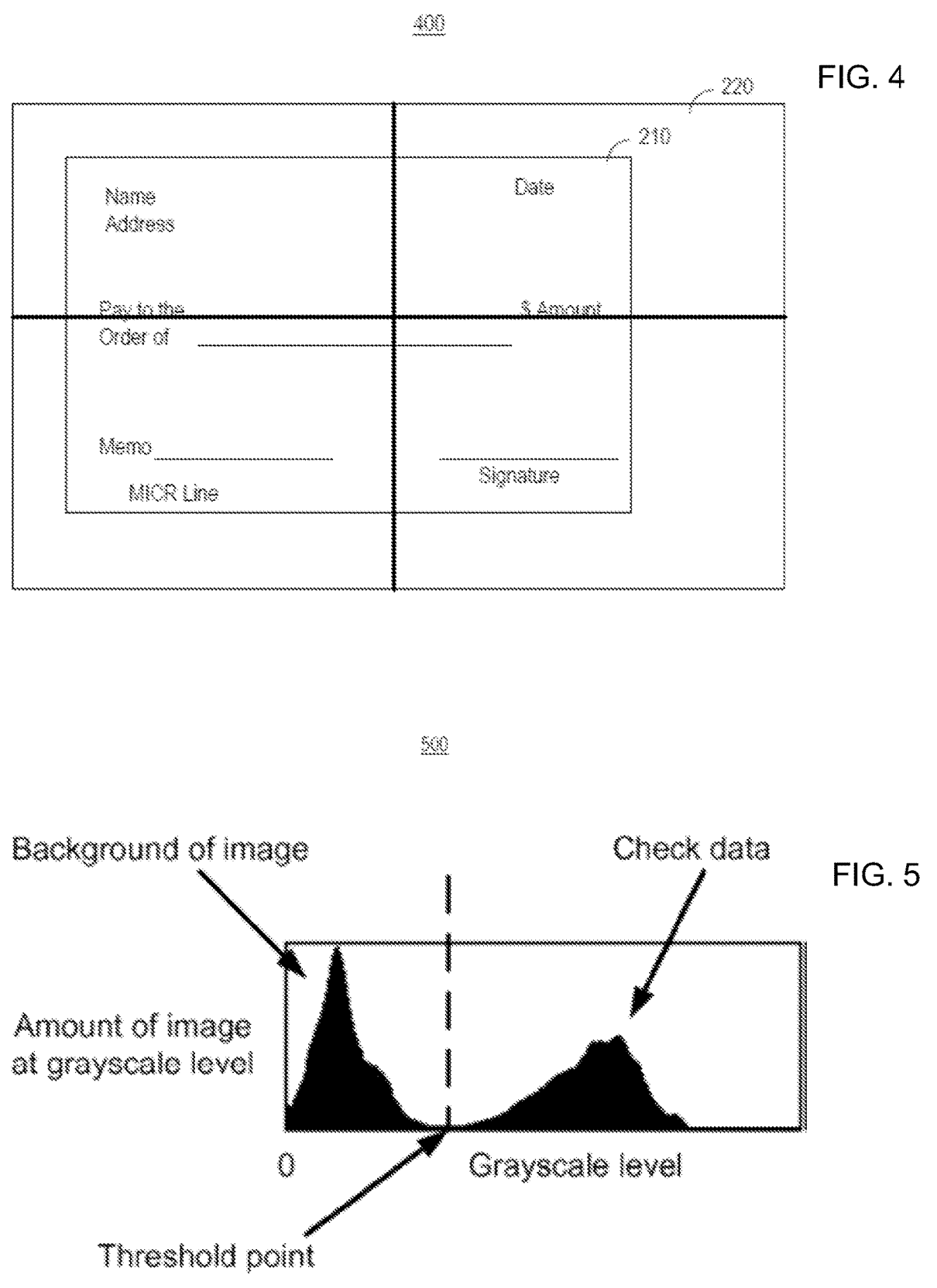

The grayscale image generated by the grayscale converter 124 may be provided to the image segmenter 125, where the image segmenter 125 divides the image into a predetermined number of segments, such as 4 segments, 6 segments, 8 segments, or other predetermined number. Each segment may comprise a portion of the check image 210 (i.e., the check data) and a portion of the background image 250 (i.e., the background data) and an edge between the two portions. The segments may be equal in size or may differ in size. An example of a segmented image 400 divided into four segments is shown in FIG. 4.

The segment processor circuitry 126 may process each of the segments to identify and/or remove background data. In an implementation, histograms may be used to detect or identify background data and check data. The histogram of each segment can be used to determine an edge of the check image 210 from the background image 250 within the segment, so that the background image 250 may be removed or disregarded for subsequent processing.

A histogram is a well-known graph and may be used to display where all of the brightness levels contained in an image are found, from the darkest to the brightest. These values may be provided across the bottom of the graph from left (darkest) to right (brightest). The vertical axis (the height of points on the graph) shows how much of the image is found at any particular brightness level. An example of a histogram 500 for a segment of an image comprising check data and background data is further described with respect to FIG. 5. An edge between the check image 210 and the background image 250 may be identified to be those points on the digital check image corresponding to the threshold point (i.e., low point) reflected on the histogram 500 shown in FIG. 5.

The segment recombiner 127 recombines the processed segments to generate a recombined image comprising a depiction of the check 107. Based on the recombined image, the image processing engine 120 may identify specific edge coordinates for the check depicted in the recombined image, such as the edge coordinates 301, 302, 303, 304 illustrated in FIG. 3. The segment recombiner 127 may process the recombined image (including the edge coordinates) to be included with the digital image file 135 transmitted to the institution system 205 for deposit of the check 107 depicted in the modified digital check image.

In addition to, or instead of, the deterministic techniques for various image processing tasks, such as the edge detection and corner identification noted above, the image processing engine 120 may include a machine learning model repository 129 containing one or more trained machine learning models for each desired image processing task.

Figure 6:
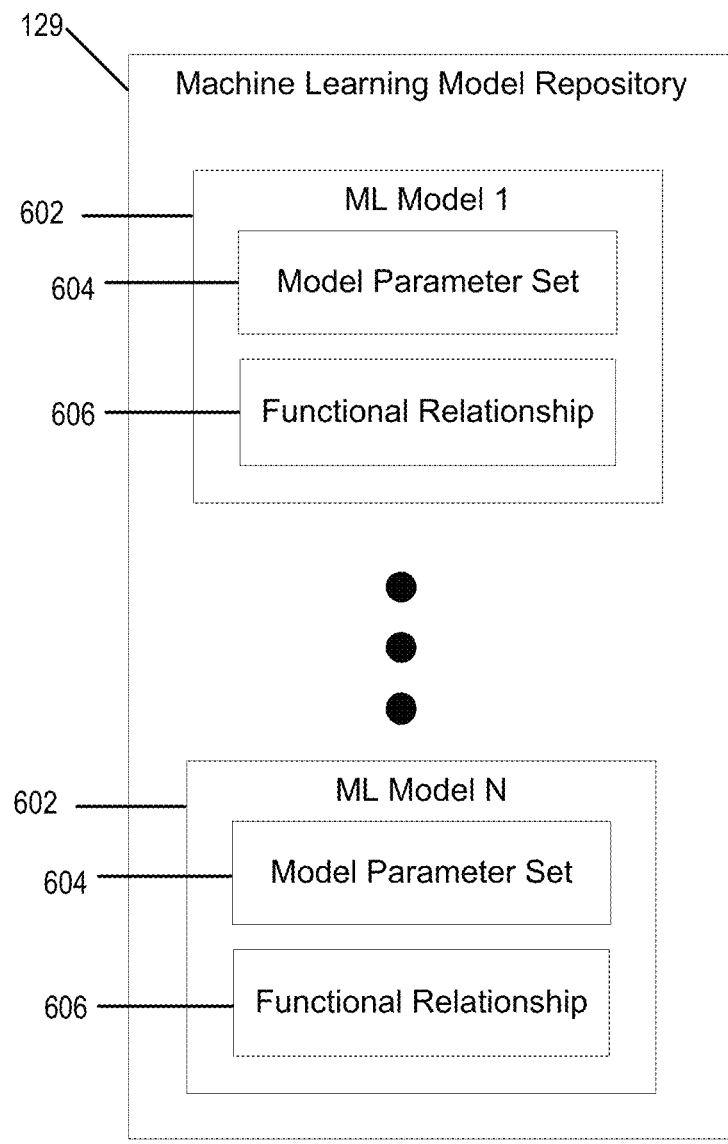
FIG. 6 shows a block diagram of a set of machine learning models that may be stored in the machine learning model repository illustrated in FIG. 1

Referring to FIG. 6, which illustrates one example of a machine learning model repository 129, several different trained machine learning models (ML models 1 through N) 602 may be included. Each of the ML models 602 in the model repository 129 may consist of a model parameter set 604 and the functional relationship component 606. As described below, the parameter set 604 contains the parameter data, that was achieved by training the model 602, and the parameter set 604 is used to process the input data (e.g. check image data from the captured image depicting the check) according to the functional relationship component 606. The functional relationship component 606 may include the type of matrix manipulation or convolution algorithm to be applied to the model parameter set 604 and the input data, and the basic instructions for how the input data and model parameters 604 are to be applied to the input data by the image processing circuitry 128. The model parameter set 604 is data that has been trained in a separate model training process prior to being made available for download to, and storage on, the computing device 109. For example, each ML model 602 may be trained at a central location and then downloaded as part of the remote deposit app from a 3rd party app store or the institution.

In order to improve on standard algorithmic/deterministic techniques for identifying the check 210 from the background and finding the corners or edges of the check, an ML model, such as an image cropping model 700 (See FIG. 7), may instead be implemented. In other words, rather than use one or more of the deterministic algorithm techniques discussed above for finding the corners and/or edges (e.g., via the chroma key, image comparator with background replacement and document segmentation described above) an image cropping model having been separately trained using deep learning techniques such as discussed in FIG. 7 may be downloaded as part of a downloadable app or software executable by the computing device 109. The final trained model may include the parameter set 604 that results from the training process and the relationship components 606 for the image cropping model. The relationship components may include the functions to be applied to the model parameters and digital image file, such as convolutions and/or matrices for manipulating and applying the parameters to the digital image of the check captured by, and being remotely deposited by, the computing device 109.

Figure 7:
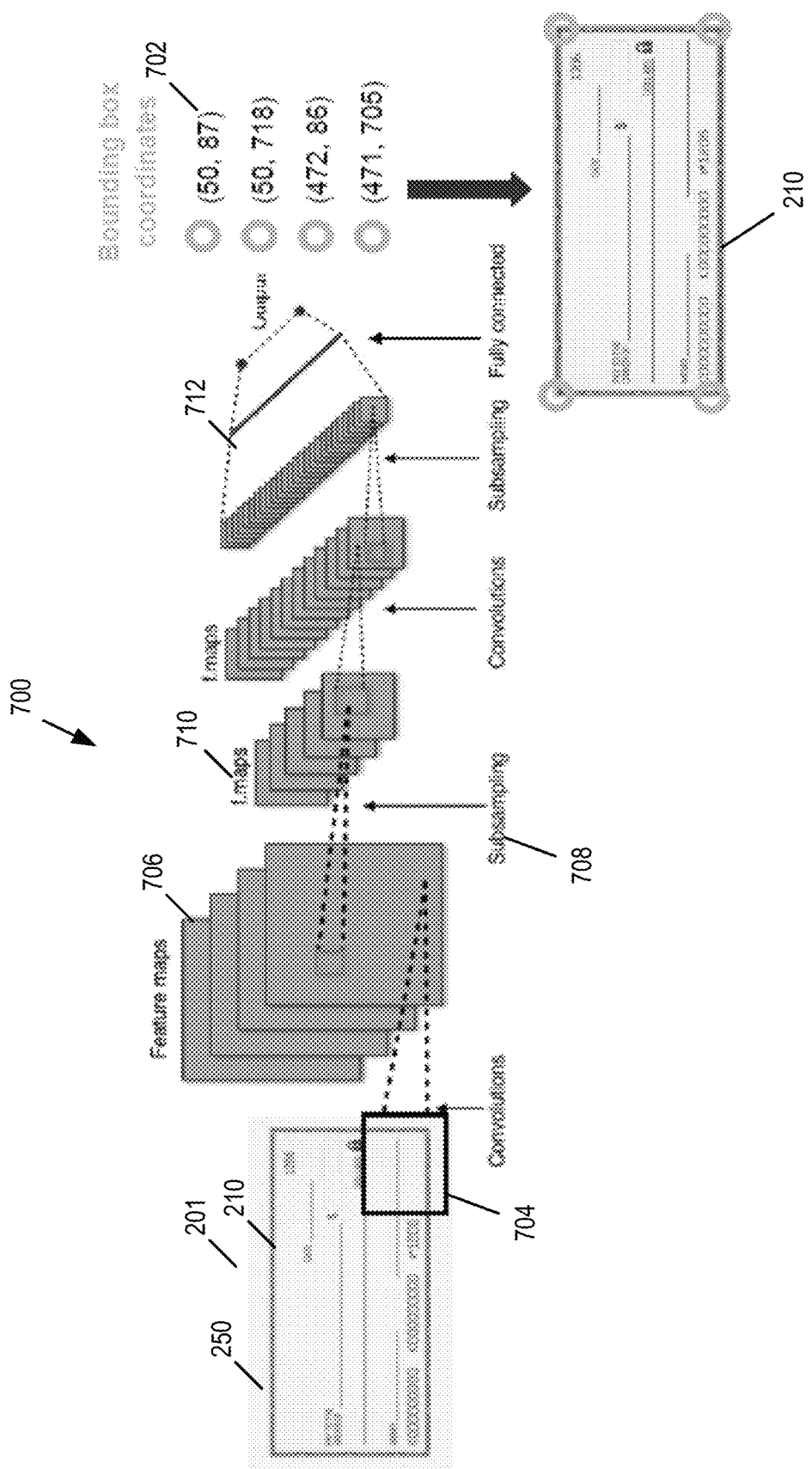
FIG. 7 shows a flow diagram of a model training technique for training a ML model to identify bounding corners and crop an image of a check.

Referring to FIG. 7, one embodiment of an image cropping model 701 may be trained using an efficient binarized convolutional network (XNOR-Net) to accurately identify bounding box coordinates for cropping the check in the digital check image. Each of a plurality of test check images, where the correct bounding box coordinates 702 of the check 210 inside the image 201 are already known, may be processed using the binarized convolutional network to "train" or converge on system parameters for the model that may then be applied to any random check to accurately identify the bounding box coordinates of that random check. The robustness of the image cropping model 700 be strengthened by using a large number of training checks that represent a very large variety of conditions, including different shadows, colors, lighting, creases and fold lines, and so on. The binarized convolutional network technique trains this model by taking a feature and performing a convolution across the test check. A predetermined number of features are each processed via convolution to create a plurality of feature maps, one for each feature.

In one implementation of training this image cropping model 700, a feature may be a two dimensional array of pixels (for example a 3×3 array of 9 total pixels) with a particular pattern. The pattern may be, for example, a specific number and location in the 3×3 array of dark pixels. That feature is then convolved with different 3×3 windows 704 of pixels of the test check and the result is stored in the first level feature map 706 for that feature. Essentially, the 3×3 window 704 of a feature is shifted by one pixel and convolved with the test check pixels at that location until the window has been scrolled through the entire test check image. This process of convolution is repeated for each feature (each different 3×3 pixel pattern in this example) until all of the predetermined features have had a respective feature map 706 generated of a plurality of features. Although the feature sets used in this step may include every possible permutation of numbers dark pixel and patterns for a 3×3 array, the computational power and time necessary to handle all permutations may be unnecessarily large and so only a fixed number of patterns, which may be predefined by the particular machine learning model, are typically convoluted with the test check into respective feature maps.

After creating the initial feature maps 706, the process of training the image cropping model illustrated in FIG. 7 next proceeds with a subsampling step 708 to achieve resolution reduction and more global feature mapping. The subsampling step 708 automatically reduces each region of the first feature map, for example taking each 50×50 portion of the each feature map and reducing it to a 5×5 array. A new set of features for that 5×5 array are then put through convolutions resulting in a new set of feature maps 710 for each of those new features, and this process of subsampling and then processing new feature convolutions is repeated a predetermined number of times set for the model. The output of the image cropping model for the test check is a set of bounding box coordinates 702 that are then compared to the known bounding box coordinates for that test check. When the coordinates of the model in training do not match the actual known coordinates, the processor of the computer system training the model will adjust one or more features (e.g., swap out a feature originally used with a different feature at one or more of the different convolution stages), and reprocess the test check to see if the next result is closer to the known correct result for the bounding box coordinates. Which feature is selected, and the amount and magnitude of the changes the computer system training the model applies to that particular feature, may be accomplished using a variety of algorithms. In one implementation, a gradient descent algorithm may be used to make changes and iterate until the parameters of the model converge to most accurately match the known output of the test check. This process is then repeated for each of the test checks used to train the model 700. The final feature set 712 achieved at the end of the training of the model 700 is then fixed and form the parameter set of a trained model that is stored with the functional relationship information on how to apply the model parameters to future check image information.

Figure 8:
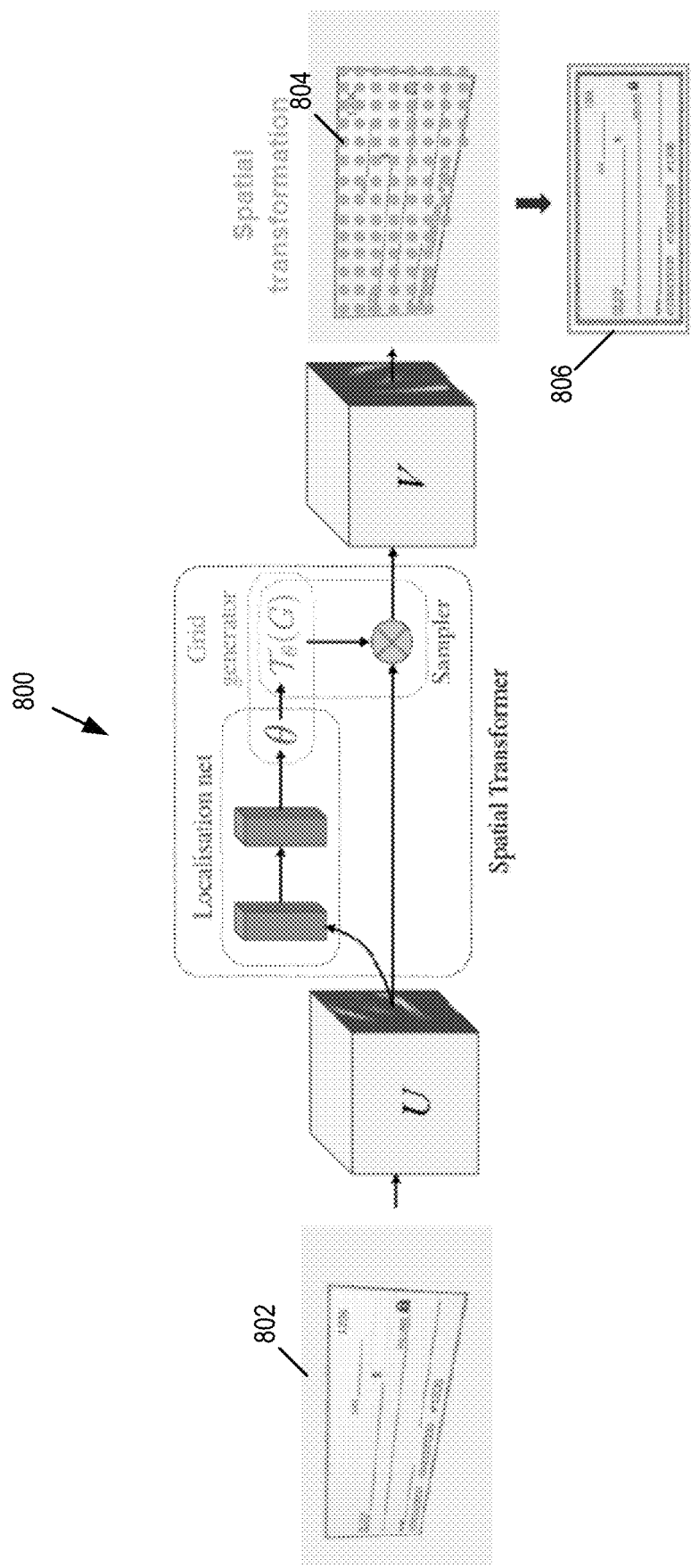
FIG. 8 shows a dewarping machine learning model.

Similarly, rather than use a discrete, deterministic algorithm to de-skew or de-warp check images, the model repository 129 of the image processing engine 120 may also include a trained demorphing transformation machine learning model 800. Referring to FIG. 8, the demorphing model 800 may be trained by providing training data consisting of images of checks 802 with skew or warp issues and known de-skewed, de-warped results. Any of a number of base algorithms for the training of this particular deep learning model may be implemented. As one example of a suitable candidate base algorithm for use in training the demorphing model 800, a spatial transformation network algorithm, such as described in Max Jaderberg et al. "Spatial Transformation Networks" June 2015 (available from https://arxiv.org/abs/1506.02025v1) may be used. As with the edge and corner detection of the image cropping model described above, the demorphing model may be trained with many different examples of training data inputs: differing warp or skew inputs and combined with different lighting, noise or other features. The resulting output may be a spatial transformation matrix 804 to apply to the digital image of the check to achieve the final image, or even a final de-skewed/de-warped image 806 in more sophisticated trained models.

Figure 9:
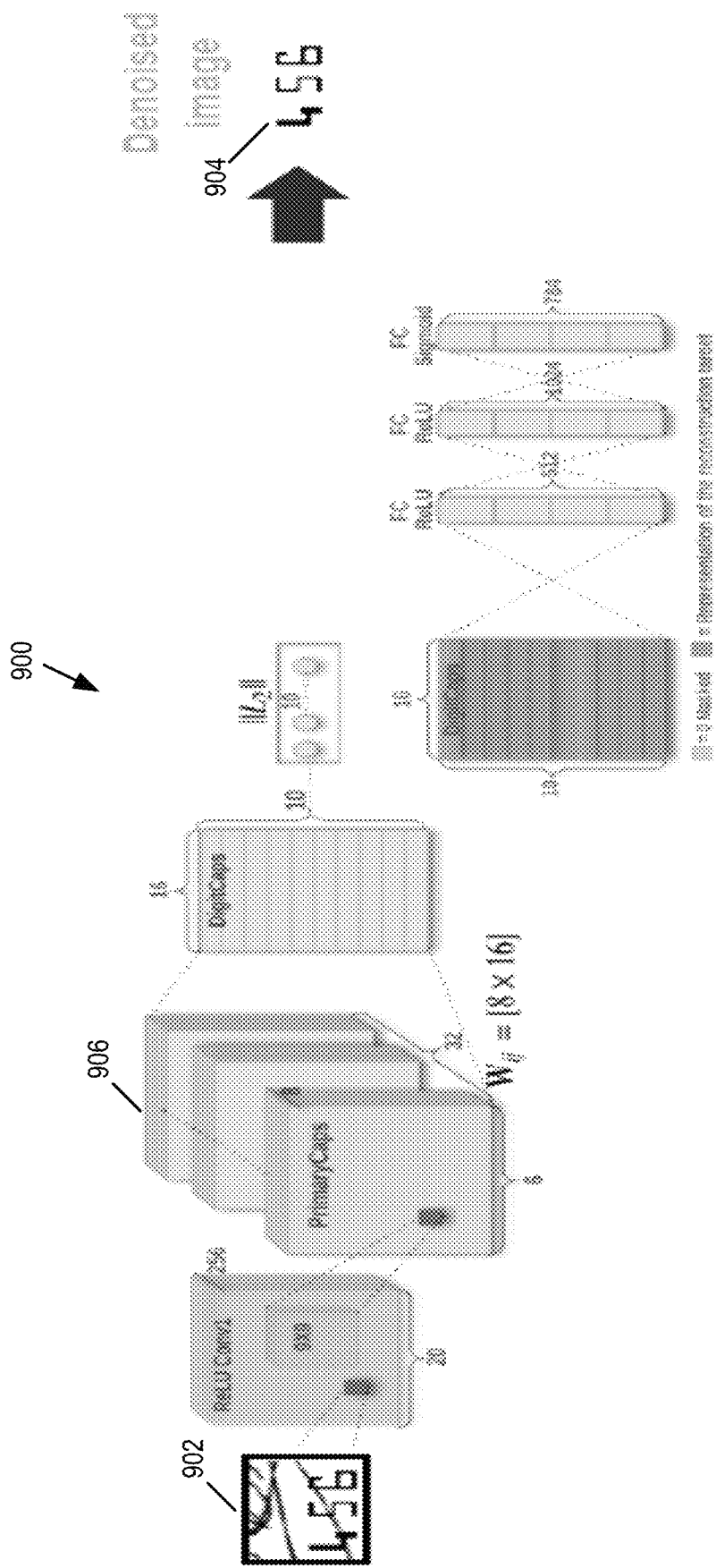
FIG. 9 shows a denoising machine learning model.

As illustrated in FIG. 9, another trained model that may be included in the model repository 129 of the image processing engine 120 is a denoising and binarization model 900. In order to recognize printed material on a check, an optical character recognition (OCR) process is typically applied during check processing. A challenge in the remote deposit of checks is the fact that, in many instances, there exists information that has been handwritten on the check that may obscure important printed information. For example, a signature or a memo line entry on a check may overlap the MICR information (which contains routing or account number information). This may, in turn, cause errors or general failure of an OCR process and thus cause a remote deposit attempt to fail. Other types of image noise that may cause an OCR process to fail include reflections or shadows across the text, or a crease or wrinkle crossing printed text. Instead of using typical determinative algorithms, a machine learning model may be trained to identify and remove this background noise.

As illustrated in FIG. 9, an example 902 of handwriting "noise" obscuring MICR text is shown, along with the desired output 904 of a denoising process prior to OCR being applied. Deterministic algorithms may be attempted to identify and remove specific types of noise, however a deep learning model may be trained and disseminated that may handle a wider variety of input noise variations in a faster and more effective manner.

As shown in FIG. 9, a server or other computing device may train a suitable denoising model 900 by using training data and processing that training data through one or more of convolutional auto-encoders, cycle-consistent adversarial networks and capsule networks 906. The training checks used for this particular machine learning model 900 may include checks with different parts of the printed data obscured and the known correct printed data available to adjust the parameters during the training.

Figure 10:
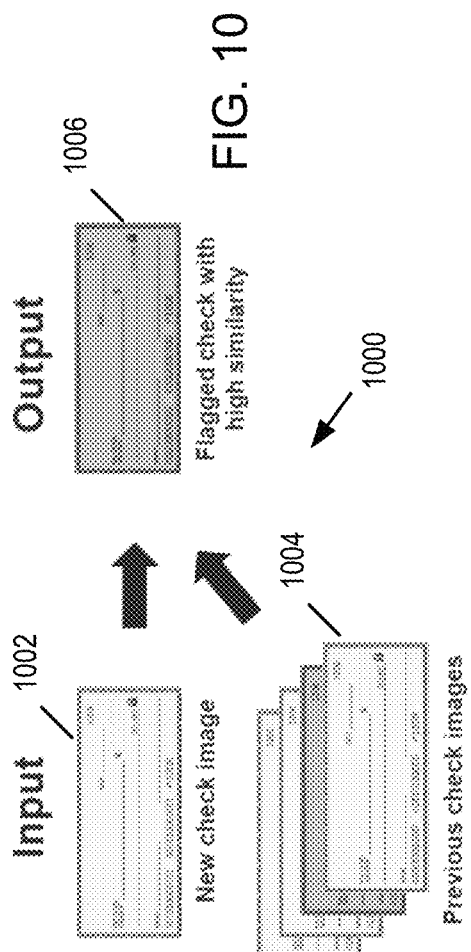
FIG. 10 shows a duplicate check detection process.

Yet another trained model that may be included in the model repository 129 of the image processing engine 120 is a duplicate check detection model 1000. Unlike the image cropping model 700, the demorphing model 800 and the denoising and binarization model 900, the duplicate check detection model 1000 is trained determine if a currently processed check is similar enough to be flagged as a duplicate of a previously deposited check. As illustrated in FIG. 10, a new check image 1002 processed in the computing device 120 is essentially compared to prior images of previously deposited checks 1004 and, if the new check image is very close to a prior deposited check image, then the remote deposit process may be stopped, or the transaction flagged 1006 for future closer inspection. Unlike a deterministic algorithm, which might simply compare MICR numbers of prior checks and the new check, the duplicate check detection model 1000 may be trained to analyze a large number of feature similarities, for a large number of different lighting or other differences, in addition to being able to recognize MICR information.

Figure 11:
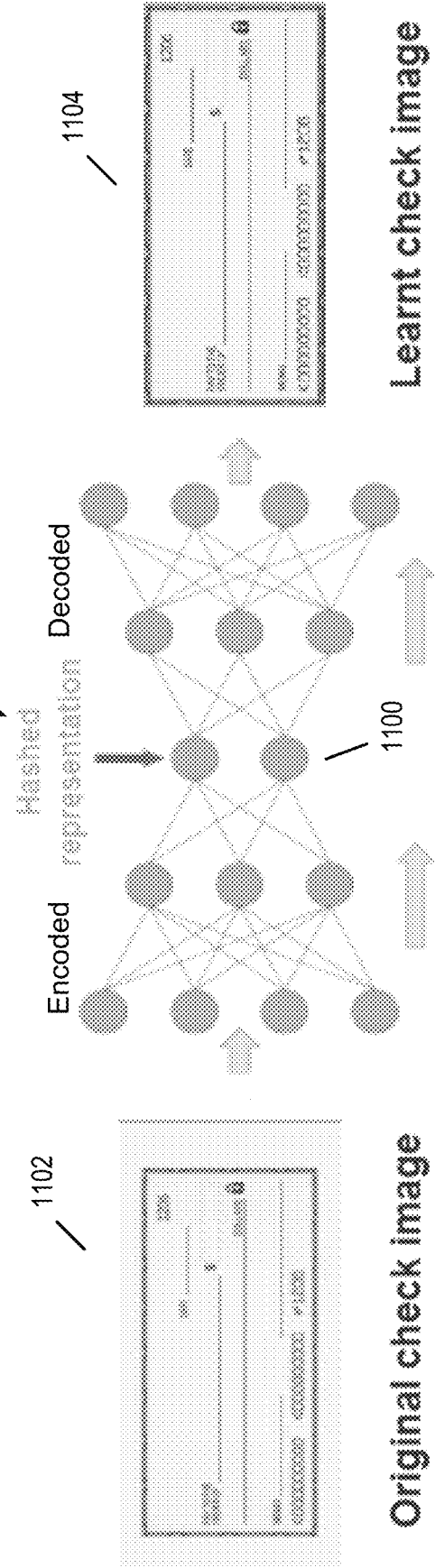
FIG. 11 shows a duplicate check detection machine learning model training diagram.

As shown in FIG. 11, the duplicate check detection model 1000 may be trained using deep auto encoders. The encoding process may be a perceptual hash (or pHash) technique 1100 that transforms original check image 1102 into a hashed representation that allows for a family of slight variations in the appearance of a check (e.g., different lighting, folds, tears, etc.) to be clustered in a node representing the variations of a learnt check 1104 that allows for a more robust comparison of an input check to prior check information. Application of the duplicate check detection model 1000 will allow the remote server receiving the check image for the mobile computing device to cease check processing and send a rejection message to the mobile computing device for display on the mobile computing device, or to flag the transaction for later review, when the new check image 1002 is determined to be a duplicate of a previously deposited check image 1004. If implemented on the mobile computing device, rather than the institution server or other central computing device, then the transmission of the device may alert the user to a potential problem and avoid sending the check information to the institution or other central server, automatically prevent transmission of the image or check information from the mobile device, or send an alert to the institution or central server to cease processing, when the trained model indicates that the new check image is identified as associated with a duplicate check.

As noted earlier with respect to FIG. 1, in an implementation, some or all of the image processing described as being implemented by one or more components of the image processing engine 120, may be performed by the institution system 205 after the institution system 205 receives the digital image file 135 from the computing device 109.

The image processor circuitry 128 of the computing device 109, alone or in combination with other of the components comprising the image processing engine 120, may operate to implement one or more image processing features such as to remove warping or de-warp a digital image, to crop a digital image, to de-skew a digital image (e.g., rotate the image to horizontal or vertical alignments), to identify the corners/edges within a digital image, or adjust brightness, tint, contrast, or other image attribute of a digital image, or other known digital image processing capability. In one implementation, the image processor circuitry 128 may include a single processing element, or multiple separate processing elements, such as embedded processors including specialized graphics processors known as graphics processing units (GPUs) available from NVIDIA Corporation of Santa Clara, Calif.

The user 105 may thus generate a digital check image of the check 107 using the image capture device 115 on the computing device 109. For example, after endorsing the check 107, the user 105 may operate the image capture device 115 to capture a digital image of the front sides and/or back sides of the check 107 and store the digital image(s) as a digital image file on a storage memory of the computing device 109. The images of the front side and the back side of the check 107 may be processed using the techniques described herein. The images may be processed as separate files or as images in a single file. The images of the front side and the back side of the check 107 may be captured sequentially, e.g., pursuant to the user 105 flipping the check 107 over after an image of the front of the check 107 has been captured.

The digital image file 135 comprising the digital image depicting the check 107 may be transmitted to the institution system 205. The digital image may be the original digital image captured by the image capture device 115, or a modified digital image having one or more image processing techniques applied. For example, the modified digital image may include the edge coordinates 301, 302, 303, 304 described herein. The computing device 109 transmits the digital image file 135, which may include secondary data, to the institution system 205 along with a request to deposit the check 107 into an account, such as the account 165. In an implementation, the user 105 may attach the digital image file 135 to an email, short message service (SMS) text, or other form of electronic message, and send the digital image file 135 to the institution system 205 using the computing device 109. However, other techniques for sending a digital image file 135 to the institution system 205 may be used, such as providing a digital image file 135 from storage to the website 218 associated with the institution system 205.

The institution 200 in conjunction with the institution system 205 may process the deposit request according to the digital image and any secondary data included in the digital image file 135. Thus, the institution 200 in conjunction with the institution system 205 may process the digital image file 135 comprising the digital image depicting the check 107 for deposit.

In an implementation, the institution system 205 may extract the check image 210 from the digital image file 135 and process the check 107 from the digital image for deposit, according to any one or more of the image processing techniques described herein. The institution system 205 may use only machine learning models, such as described in FIGS. 7-11, to process the check. The institution system may alternatively use a mix of deterministic algorithm and machine learning models, may selectively use deterministic or machine learning models that differ from those used at the computing device, or may utilize a mixture of machine learning models for some processing functions and deterministic algorithms for other functions. Any image processing technology, software, or other application(s) may be used to retrieve the digital image of the check 107 from the digital image file 135 and to obtain the relevant data of the check 107 from the digital image file 135. The institution system 205 may determine whether the financial information associated with the check 107 is valid. Also, because of the dynamic nature of prior check deposit information, in one embodiment only the institution system may apply the machine learning model for checking duplicate check detection.

Upon receipt and processing of the digital image file 135 and approval of the check 107 associated therewith, the institution 200 may credit the funds of the check 107 to the account 165. It will be appreciated that the examples herein are for purposes of illustration and explanation only, and that an embodiment is not limited to such examples.

In an implementation, the computing device 109 may be a mobile device that comprises a digital camera which can capture a digital image of the check 107 by taking a picture of the front and/or back of the check 107. The back of the check may provide endorsement verification, such as the signature of the person or party the check is made out to. The user 105 may send the digital image file 135, including the check image, to the institution system 205 using the mobile device. An exemplary computing device 109 is described with respect to FIG. 6. It is contemplated that any device that is capable of generating a digital image may be used to make a digital image of the check 107 which may be processed for sending to the institution system 205 as a digital image file 135. Additional devices that may be used in the generation and/or transmission of a digital image include a digital camera, a photocopier, a fax machine, and the like, for example.

The institution system 205 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image file 135 from the computing device 109.

The electronic devices may receive the digital image file 135 and may perform an initial analysis on the quality of the image of the check 107 in the digital image file 135, the readability of the data contained therein, or the like. For example, the electronic devices may determine whether the amount payable and other information may be readable such that it may be obtained and processed by the institution system 205 to credit the account 165 associated with the user 105.

The institution system 205 may include a user interface circuitry 220, an image processor 222, and a data source access engine 227. The user interface circuitry 220 may generate and format one or more pages of content 219 as a unified graphical presentation that may be provided to the computing device 109 or a representative computing device 187. In an implementation, the page(s) of content 219 may be provided to the computing device 109 and/or the representative computing device 187 via a secure website 218 associated with the institution system 205.

In an implementation, the institution system 205 may use the image processor 222 to process the digital image file 135 comprising the image(s) 137 of the check 107 received from the user 105 for use by the institution 200 in the processing and/or clearance of the check 107. The image processor 222 may process multiple frames of the image if the image is comprised of multiple frames (e.g., the front side and the back side of a check).

Figure 12:
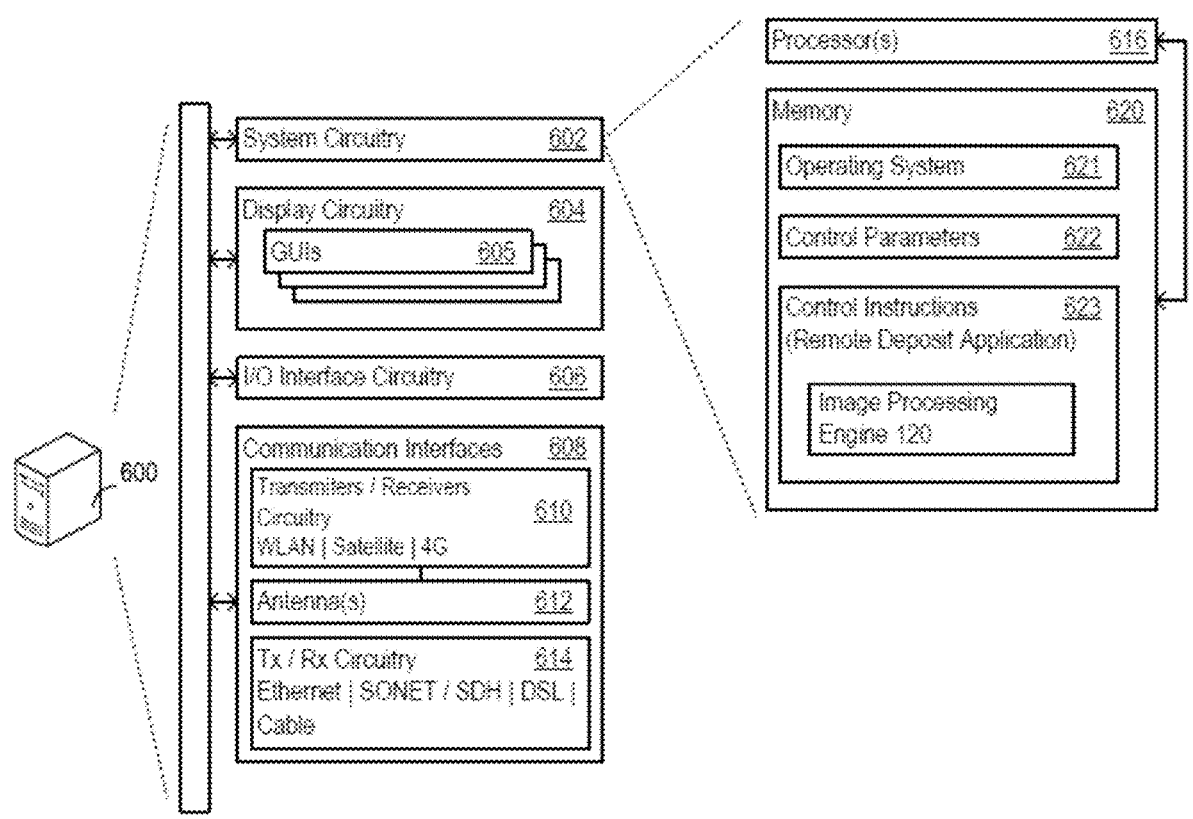
FIG. 12 shows a block diagram of an exemplary computer architecture of a computing device or institution computer.

FIG. 12 illustrates an exemplary computer architecture 1200 for a computing device such as any one of the computing device 109, institution system 205, or another computing device. The computer architecture 1200 includes system circuitry 1202, display circuitry 1204, input/output (I/O) interface circuitry 1206, and communication interfaces 1208. The graphical user interfaces (GUIs) 1205 displayed by the display circuitry 1204 may be representative of GUIs generated by the application for remote deposit. The GUIs may be displayed locally using the display circuitry 1204, or for remote visualization, e.g., as HTML, JavaScript, audio, and video output for a web browser running on a local or remote machine such as the computing device 109 or institution system 205.

The GUIs 1205 and the I/O interface circuitry 1206 may include touch sensitive displays, voice or facial recognition inputs, buttons, switches, speakers and other user interface elements. Additional examples of the I/O interface circuitry 1206 includes microphones, video and still image cameras, headset and microphone input/output jacks, Universal Serial Bus (USB) connectors, memory card slots, and other types of inputs. The I/O interface circuitry 1206 may further include magnetic or optical media interfaces (e.g., a CDROM or DVD drive), serial and parallel bus interfaces, and keyboard and mouse interfaces.

The communication interfaces 1208 may include wireless transmitters and receivers ("transceivers") 1210 and any antennas 1212 used by the circuitry of the transceivers 1210. The transceivers 1210 and antennas 1212 may support Wi-Fi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 1208 may also include serial interfaces, such as universal serial bus (USB), serial ATA, IEEE 1394, lighting port, I2C, slimBus, or other serial interfaces. The communication interfaces 1208 may also include wireline transceivers 1214 to support wired communication protocols. The wireline transceivers 1214 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol. The communication interfaces 1208 may communicate with remote computing devices via a network, such as the communications network 140.

The system circuitry 1202 may be representative of any combination of hardware, software, firmware, application programming interface, or other circuitry for implementing the features of the remote deposit application described herein. For example, the system circuitry 1202 may be implemented with one or more systems on a chip (SoC), application specific integrated circuits (ASIC), microprocessors, discrete analog and digital circuits, and other circuitry. The system circuitry 1202 may implement any of the image processing features described herein. As an example, the system circuitry 1202 may include one or more processors 1216 and memory 1220.

The memory 1220 stores, for example, control instructions 1223 for executing the features of the remote deposit application running on the computing device 109, and/or institution system 205, as well as an operating system 1221. In one implementation, the processors 1216 execute the control instructions 1223 and the operating system 1221 to carry out any of the features for the remote deposit application. For example, the control instructions 1223 for the remote deposit application includes instructions that, when executed by the processors 1216, implement the features corresponding to the image processing engine 120, which may include the deterministic image processing algorithms and or the ML models discussed previously. The memory 620 also includes control parameters 1222 that provide and specify configuration and operating options for the control instructions 1223 (such as the image processing technique selection instructions discussed herein), operating system 1221, and other functionality of the computer architecture 1200.

Figure 13:
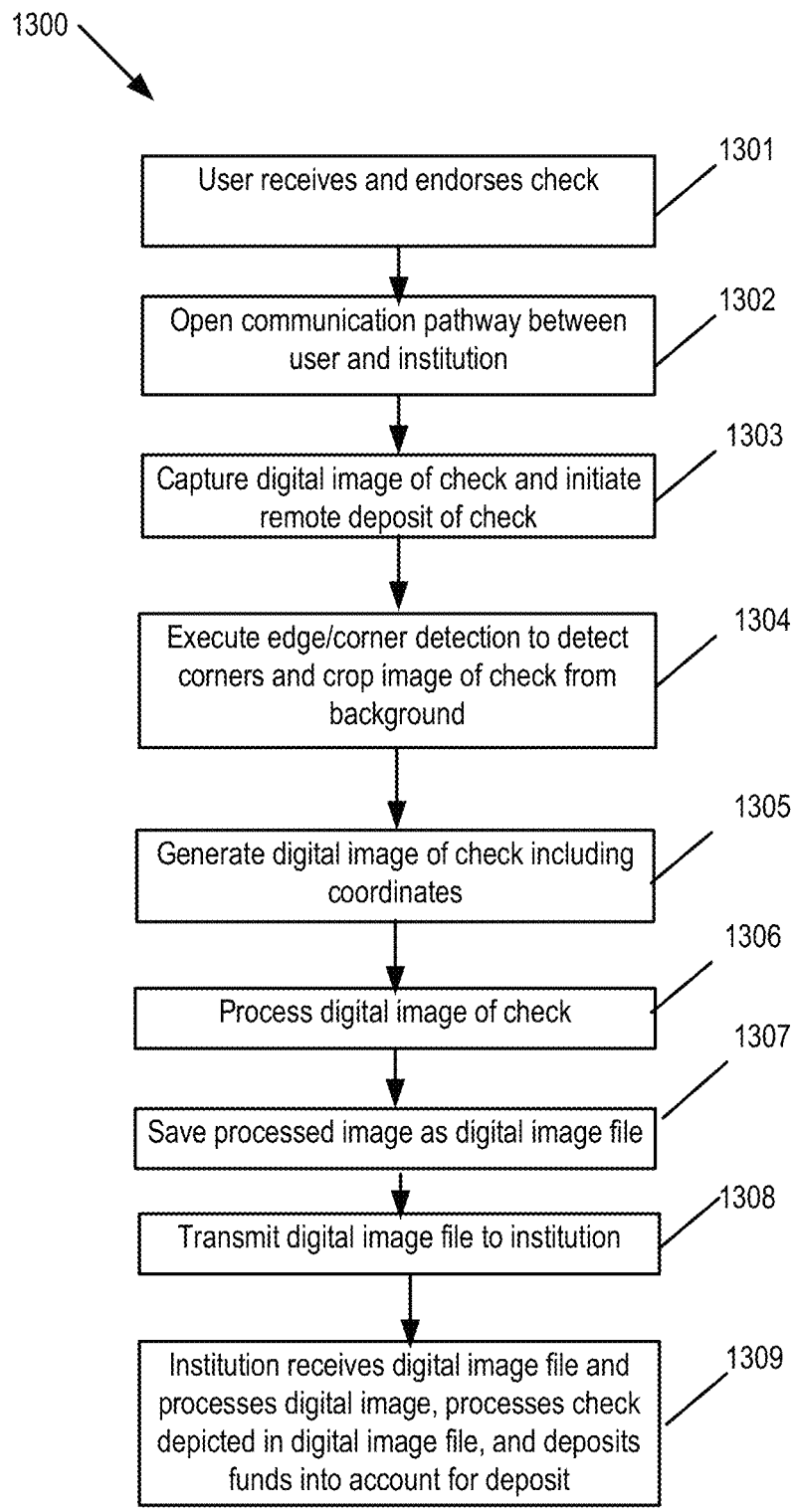
FIG. 13 shows a flow diagram of an image processing feature.

FIG. 13 shows a flow diagram 1300 describing one implementation of image processing features by the image processing engine 120 as part of a remote deposit solution. The image processing features described by the flow diagram 1300 includes those relating to edge/corner detection for determining coordinates of the edges of a check depicted in a digital image.

At 1301, an account owner (e.g., payee to an amount written on a check document, referred to herein as a user) may receive a check from a third party (e.g., payor of the check), and may endorse the check by signing the back of the check in the designated field. If the user wishes to deposit the check into an account, such as a savings and/or checking account, the user may also write in an account number below the signature on the back of the check.

At 1302, the user may operate the computing device 109 to open a communication pathway with the institution system 205 associated with an account of the user for depositing funds. The communication pathway may be implemented by logging into a website operating within the institution system 205, for example. In addition to, or alternatively, a remote deposit application may be downloaded onto the computing device 109. Executing the remote deposit application to run on the computing device 109 may initiate opening of the communication pathway. The communication pathway may be established after the user authenticates access to the institution system 205 using user specific authentication credentials such as, but not limited to, a username and a password, or biometric information such as fingerprints, voice recognition, or facial recognition information.

At 1303, a digital check image of the check may be captured by the image capture device 115. The user may manually operate the image capture device 115 to capture the digital check image to include the check and a background portion. According to some embodiments, the remote deposit application running on the computing device may automatically capture the digital check image when a set of predetermined criteria is determined to be satisfied. For example, the remote deposit application may control the image capture device 115 to capture the digital check image after detecting the check is aligned within an alignment guide displayed on a display screen of the computing device 109, where the display screen displays a field of view of the image capture device 115. According to another example, the remote deposit application may control the image capture device 115 to capture the digital check image after detecting the check is in focus for the digital image capture by the image capture device 115. According to another example, the remote deposit application may control the image capture device 115 to capture the digital check image after detecting the check comprises at least a predetermined portion of the digital check image to be captured by the image capture device 115.

Also at 1303, a deposit request is initiated. The deposit request may include selecting an account in which to deposit the check. In an implementation, the user may select a "deposit check" option provided on a graphical user interface (GUI) displayed on the computing device 109. The user may also input one or more of the following check information through the GUI: check amount, date, the account the check funds should be deposited in, comments, routing number, or other check data.

At 1304, edge detection and corner identification is executed by the image processing engine 120 according to any one or more of the edge detection processes described herein. In one implementation, the cropping machine learning model 700 is executed by processing the captured digital image using the trained model. The edge detection process includes distinguishing the check image from the background image that comprises the overall digital check image captured by the image capture device 115. By executing the edge detection on the digital check image, edge coordinates for the check image are determined. For example, the edge detection may determine the edge coordinates 702 as shown in FIG. 7.

According to some other embodiments, deterministic algorithms may be used instead of applying the machine learning model. In those other embodiments, the edge detection implemented at 1304 may include one or more of the following processes: scaling down the digital check image for faster processing (scale factor depends on image size), converting the digital check image to grayscale, using close and/or open morphs on the digital check image to eliminate noise, binarizing the digital check image using a dynamic threshold algorithm (e.g., Otsu algorithm), running through multiple cropping logic algorithms, e.g., using OpenCV, until a "check" is found within the digital check image (e.g., 4 predetermined algorithms may be applied). To determine if a crop was successful, the crop result may be run through a crop validator that checks aspect ratio, area, skew, zoom, and/or other image analysis for validating a successful crop. The resulting digital check image may be run through focus detection to determine if the digital check image is blurry, and a refocusing process may be applied if blurriness is detected within a predetermined range. After multiple "successful" digital check images have been processed, the final digital check image is ready (e.g., considered a modified digital check image), along with four corner check coordinates and/or an image size of the modified digital check image.

At 1305, a modified digital check image (e.g., modified digital check image 300) is generated that includes the edge coordinates (e.g., bounding box coordinates 702 from the cropping model as shown in FIG. 7 or edge coordinates 301, 302, 303, 304 from a deterministic model as shown in FIG. 3).

At 1306, the modified digital check image may undergo one or more further image processing steps. The image processing steps may include any one or more of the image processing functions attributed to the image processor 128, as described herein. These one or more additional image processing steps may include only processing the modified image via machine learning models such as those described above, only processing the image using techniques based on deterministic algorithms, or a mixture of both.

At 1307, the resulting processed image is stored within a digital image file. According to some embodiments, the digital image file may also include supplemental information, as described herein. At 1308, the digital image file is transmitted to the institution system 205. After receipt by the institution system 205, the institution system may further process the digital image file, and deposit the funds corresponding to the check depicted in the digital image file. The digital image file may include the digital check image in a known digital image format (e.g., a JPEG digital image file). According to some embodiments, the digital image file may further include edge coordinate information for edges detected within the digital check image by the image processing engine 120 at the computing device 109. The edge coordinate information may be in the following exemplary formats (exemplary coordinates are provided):

{
 "frontImageCoordinates": [
  186.0,
  282.0,
  1368.0,
  294.0,
  1374.0,
  828.0
  174.0,
  798.0
 ],
 "frontImageWidth": "1440",
 "backImageWidth": "1500", "frontImageHeight": "1080",
"backImageHeight": "1000"
}

Figure 14:
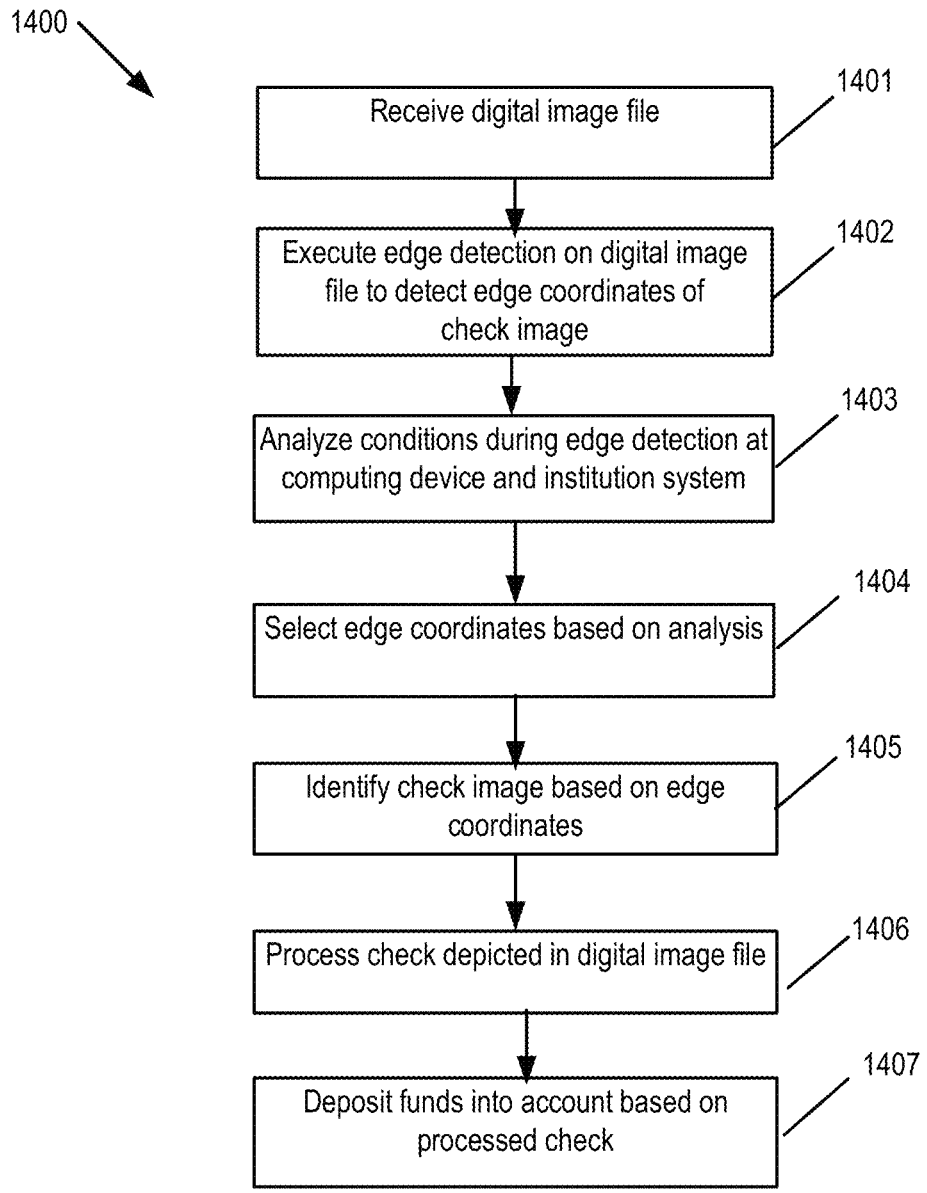
FIG. 14 shows a flow diagram of an image processing feature.

Further description of the processes that may be implemented on the digital image file by the institution system is described with reference to the flow diagram 800 shown in FIG. 14. According to the flow diagram 1400 shown in FIG. 14, the institution system 205 receives the digital image file from the computing device 109 at 801.

At 1402, edge detection is executed by the institution system 205 according to any one or more of the edge detection processes described herein. The edge detection process results in distinguishing the check image from the background image that comprises the overall digital check image captured by the image capture device 115. By executing the edge detection on the digital check image, edge coordinates for the check image are determined. For example, the edge detection may determine bounding box coordinates 702 from the trained machine learning cropping model as shown in FIG. 7 or edge coordinates 301, 302, 303, 304 from a deterministic model as shown in FIG. 3.

According to some embodiments, the edge detection executed by the institution system 205 may be different from the edge detection executed by the image processing engine 120 of the computing device 109. In one implementation, the edge detection at the institution system may be a machine learning model such as discussed above, while the edge detection at the computing device may be a deterministic algorithm version. In other implementations, the computing device and the institution system may both use different trained machine learning models, or may each use different deterministic algorithm edge detection techniques.

For example, with respect to the deterministic techniques of edge detection, the edge detection at 1402 at the institution system 205 may include one or more of the following: scaling the digital check image by a predetermined amount (e.g., scale down the digital check image by a half (½)), converting the digital check image to a gray scale image, using close and/or open morphs on the digital check image to eliminate noise, binarizing the digital check image using a dynamic threshold algorithm (e.g., Otsu's method), and/or applying Hough transform algorithm to identify lines in the digital check image. The edge detection at 1402 may further include iterating through all the identified lines from the digital check image, and discarding away any lines that do not correspond to a check edge, where a check edge may be determined according to one or more of the following rules: vertical lines must be angled between 95 and 85 degrees or between 275 and 265 degrees, horizontal lines must be angled between 195 and 175 degrees or between 360 and 355 degrees, discard away lines that lie completely in the top fourth or bottom fourth of the image as these lines have a high likelihood of being image noise data, discard away lines that lie completely in the right fourth or left fourth of the image as these lines have a high likelihood of being image noise data, and/or find the average distance between every line and the center of the digital check image and throw away any outlier lines that are more than a predetermined distance from the center of the digital check image. The edge detection at 1402 may further include creating a bounding box around remaining lines after the line removal process, as the remaining lines have a high likelihood of actually corresponding from the check depicted in the digital check image. If creating the bounding box around the remaining lines does not produce a check21 valid image, then another attempt to create a bounding box around contours of the digital check image may be implemented. The contours may be detected according to a contour detection algorithm such as the Suzuki85 algorithm.

At 1403, conditions detected during the edge detection implemented by the image processing engine 120 may be compared to conditions detected during edge detection implemented by the institution system 205. The conditions may include any environmental conditions (e.g., brightness levels) that may have affected the quality of the digital check image captured by the image capturing device 115. In addition or alternatively, as the edge detection implemented by the institution system 205 may be different from the edge detection implemented by the image processing engine 120 of the computing device 109, an accuracy of the edge detection implemented by the image processing engine 120 may be compared to an accuracy of the edge detection implemented by the institution system 205.

At 1404, the institution system 205 selects one of the edge coordinates from the edge coordinates included in the digital image file received from the computing device 109, or the edge coordinates determined by the institution system 205. The institution system 205 may select the edge coordinates based on predetermined criteria such as, for example, related to the detected conditions, or related to the determined accuracy of the edge coordinates. When the selection is based on the detected conditions, the institution system 205 may select the edge coordinates determined by the image processing engine 120 on the computing device 109 when the conditions indicate the edge detection processes implemented by the image processing engine 120 would result in a greater accuracy than the edge detection processes implemented by the institution system 205. When the selection is based on the accuracy of the edge detection, the institution system 205 may select the edge coordinates determined to be more accurate.

At 1405, the institution system 205 identifies the check image from the digital image file based on the selected edge coordinates. From the identified check image, the check data contained within the check image may be extracted.

At 1406, the institution system 205 processes the check depicted in the check image to extract the check data contained therein. Processing of the digital image file may include retrieving financial information regarding the check. The financial information may comprise the MICR number, the routing number, a check amount, or other information found on the check. The processing step may include implementation of one of more of ML models such as the dewarping 800, or denoising 900, models discussed above, or may implement deterministic techniques using known algorithms, before extracting financial information from the image.

At 1407, after retrieving the financial information from the check in an electronic data representation form, the institution system 205 determines whether the financial information is valid. For example, the institution system 205 may perform an initial analysis on the quality of the data representation, the readability of the data representation, or the like. For example, the electronic devices may determine whether the account number, amount payable, or the like may be readable such that they may be parsed and processed by the institution to credit an account associated with the user. If the financial information is determined to be valid, the electronic data representation may be processed by the institution system 205, thereby depositing the money in the user's account 165. If the financial information is determined to be invalid, then the user may be advised. For example, the institution system 205 may transmit an email, a web message, an instant message, or the like to the user indicating that the financial information associated with the electronic data representation may be invalid. The user may determine how to proceed by selecting an option on the web message, replying to the email, or the like.

Figure 15:
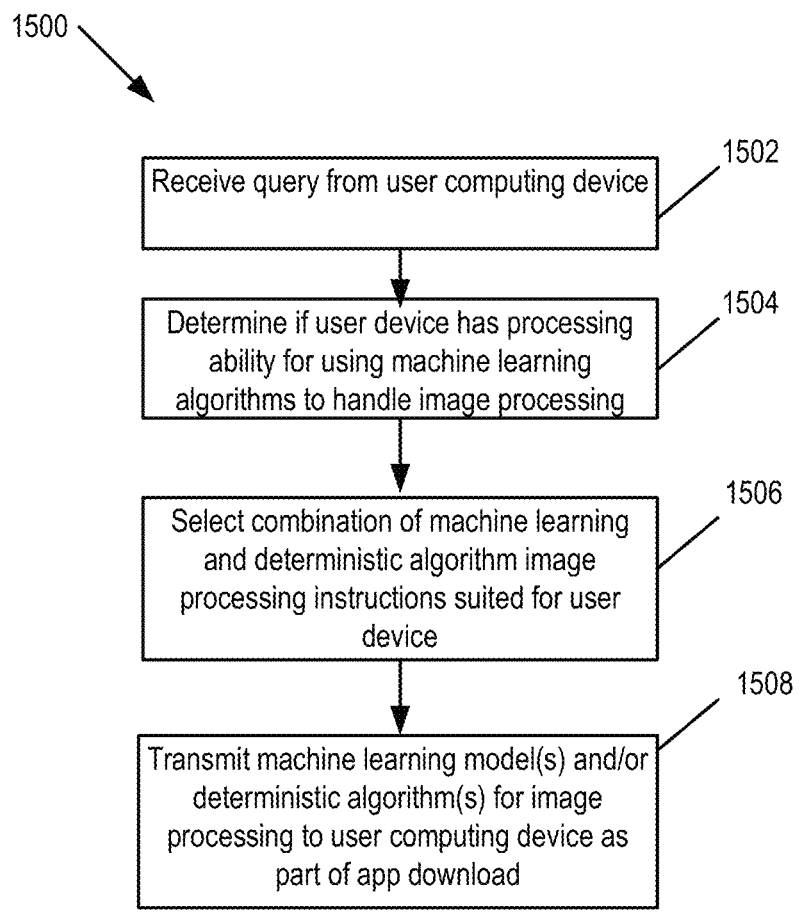
FIG. 15 shows a flow diagram of a method of determining suitability of a computing device for including machine learning models and deterministic algorithms for image processing tasks.

The remote deposit software application, or app, that a user computing device 109 downloads from a third party or institution may be customized by the third party or institution. In one embodiment, the ability for a computing device 109 that is user operated, such as a smartphone, tablet or other computing device, to handle certain machine language models for image processing or duplicate check detection may be determined when the app is requested, such that the computing device is only provided those features or types of image processing software that the computing device can properly execute. For example, the hardware and operating system information for the computing device 109 may be provided to the third party or institution system 205 and the computing device 109 capabilities assessed by the third party app provider or institution. Referring to FIG. 15, when the third party app provider or institution is queried by the computing device for a remote deposit app, or for an update to an existing remote deposit app, the information on the computing device capabilities may be looked up in a database at the third party or institution (at 1502). Alternatively, the query may include the processor of the computing device 109 automatically generating the computing device capabilities in a message that is provided to, or requested by, the third party or institution system 205. The data may include model information, processor information, operating system, memory availability and so on.

Upon receipt of the information, the institution system 205 may determine if the computing device of the user is capable of handling the processing and memory requirements for each machine learning model that the institution system 205 or third party app store can include in the downloadable remote deposit app (at 1504). The institution system 205 may, for example, be able to select from one or more machine learning models and deterministic models and match the computing device capabilities with only machine learning models, in type or number, that the computing device can effectively handle (at 1506). Alternatively, or in addition, to the computing device capability check, the institution system 205 may selectively include machine learning models or deterministic models in the remote deposit app that will differ from any machine learning or deterministic algorithm techniques the institution system 205 will itself be using on check images sent via the app during a remote deposit process.

After selecting the machine learning modes and/or deterministic technique instructions the computing device 109 can best utilize, the downloadable app may be configured to include those models or techniques and the institution system 205 may transmit them over the network connection to the computing device (at 1508). In yet other implementations, the downloadable app may be configured by the institution server 205 with a plurality of machine learning models and/or deterministic algorithm instructions at the time the app is first downloaded, and the institution server 205 may dynamically select which of the machine learning models or deterministic techniques to activate at the computing device 109 at the time a remote deposit query is initiated by the computing device.

Figure 16:
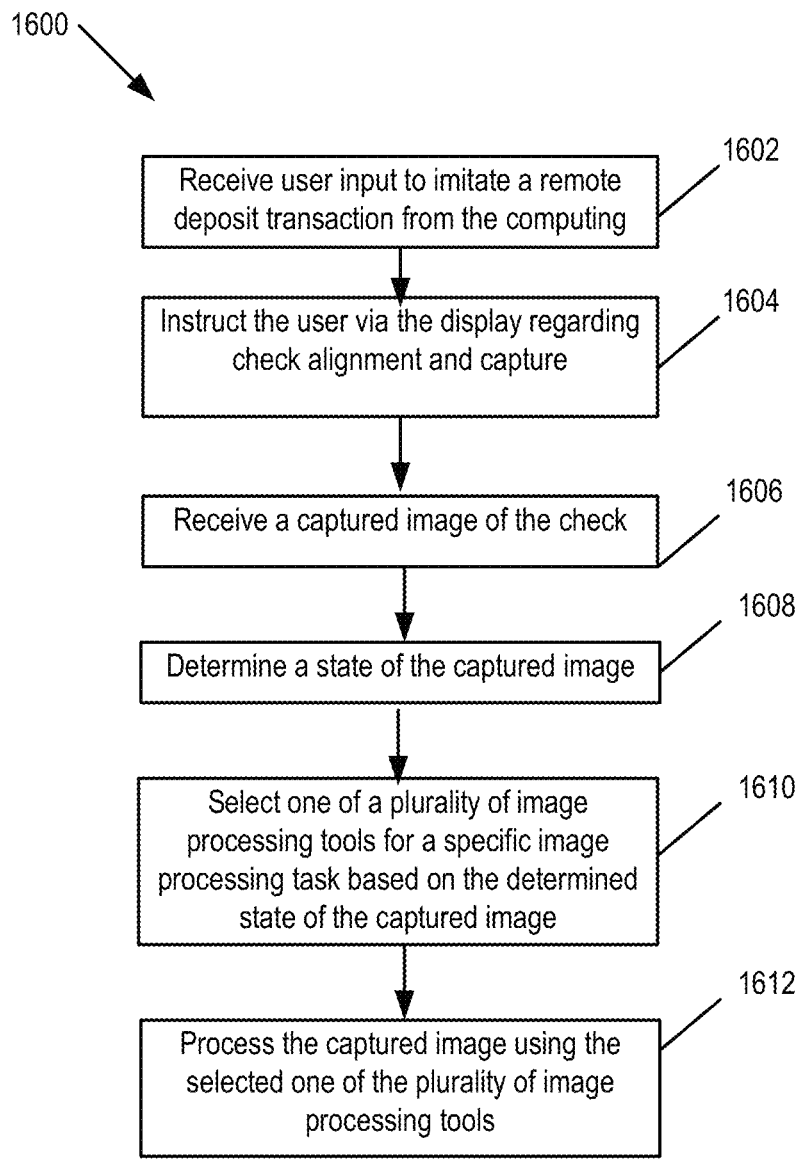
FIG. 16 shows a flow diagram of a method of determining which machine learning model or deterministic algorithm for image processing tasks to select for a particular remote deposit transaction.

In another embodiment illustrated in FIG. 16, when the downloaded app stored on the computing device already includes more than one ML model and/or deterministic algorithm technique for a given image processing task, for example a ML model and a deterministic technique are included in the app that are each capable of separately handling background detection and cropping, the computing device may select which particular method to use. The process may start when the computing device receives user input to initiate the remote deposit app for depositing a new check (at 1602). The remote deposit app would then be executed by the processor of the computing device to provide instructions, which may be text and/or graphics, to the user to properly locate and align the check in the viewing arear of a camera or other image capture mechanism associated with the computing device (at 1604). The image that is then captured by manual input from the user or automated capture by the device is received in memory at the computing device (at 1606). The computing device 109 may then determine the state of the captured image, such as the amount of contrast, lighting variations and so on (at 1608). Based on the determined state, the computing device 109 may select which of the two or more image processing techniques available for a particular image processing task should be selected (at 1610). For example, a quality measurement below a predetermined threshold would automatically cause the computing device to utilize a machine learning model for the task and a quality at or above the predetermined threshold would trigger use of a deterministic algorithm for the task. This may take place for only one of the typical image processing tasks, such as edge detection/cropping, or for more than one of the image processing tasks for which there are more than one ML model or deterministic algorithm available in the downloaded app. The captured image may then be processed at the computing device using the selected image processing too (ML model or deterministic algorithm) (at 1612).

Figure 17:
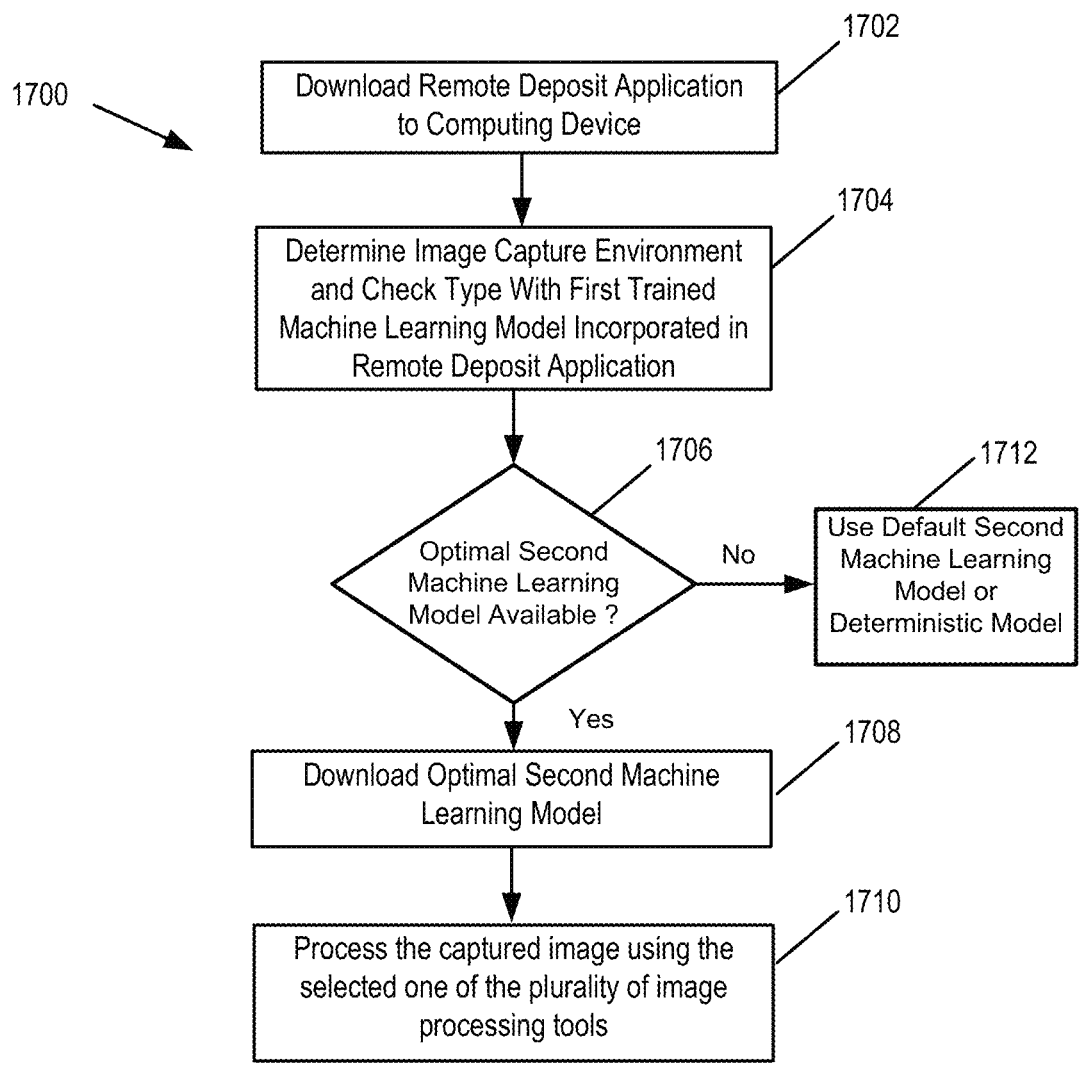
FIG. 17 shows a flow diagram of a method of using a first machine learning model to select or download a second machine learning model or deterministic model for processing a check image.

In an alternative embodiment, the process of FIG. 16 may be modified to both select the optimal machine learning model and to adjust the settings of the computing device to default to a particular set-up configuration. Referring to FIG. 17, the computing device 109 may download a remote capture application that includes a first machine learning model trained to select the optimal one of a plurality of trained image processing machine learning models (at 1702). This first trained model that recognizes the optimal second machine learning model may be part of a previously downloaded application, but the second machine learning model may be one that is selected from a plurality of trained models and later downloaded once the first machine learning model identifies the optimal second machine learning model. The first machine learning model may be one that has been trained to recognize the current environment the computing device 109 and check to be scanned are in, and for then selecting the second machine learning model that is best suited for handling image processing in view of the recognized environment. The environmental factors may include lighting and shadow detected, the type computing device used to capture the check image, and so on. This first machine learning model may also be trained to recognize specific check type (personal check, bank check, etc.) and check design type (e.g. striped, solid, personalized patterns, logos, cartoon characters and so on) and to factor in selection of the optimal second machine learning model for image processing not only optimized for the recognized environment, but for the specific type and design of the check.

The first trained machine learning model may be executed on the computing device 109 to capture an initial image of the check and automatically determine the image capture environment (for example, lighting, shadows, skew and/or noise) for the check that is captured, and may also may determine the type of check and the check design in the image (at 1704). Based on the information it has been trained to look for regarding image capture environment and check type and design, the first machine learning model may determine if there is an optimal trained second machine learning model that may be used to handle image processing and extract the check information (at 1706). The determination of whether a second model is "optimal" may be a comparison of percentage success rates, for the determined environment and check type/design, for a known plurality of specialized second machine learning models (each trained more rigorously for particular different environment or check type/design) in comparison to a default second trained model or deterministic technique that already may be part of the earlier downloaded application. If there is no second trained model that matches the determined environment and/or check type/design such that it would be more optimal than a more generalized default second machine learning model already present on the computing device 109, then the default second machine learning model may be used (at 1712). If there is a better match to the environment or check type/design in a second machine learning model known to the first machine learning model, then that optimal second machine learning model may be downloaded to the computing device 109 and used to process the captured image (at 1708, 1710).

In yet other embodiments, alone or in combination with any of the above, it is further contemplated that a trained machine learning model may also output computing device specific instructions to alter one or more settings of the computing device 109. Referring to the example of FIG. 17, the first trained machine learning model may not only identify the remote capture environment to select a second trained machine learning model for the image processing and data extraction, it may also instruct the computing device to adjust its image capture settings for a next image capture session, after the current one, based on the current determined image capture environment. As one example, the machine learning model may prepare the operating settings of the computing device 109 for a low light or other determined environmental condition based on the currently detected environmental conditions. The setting that may be automatically changed by the model may include the type of light capture. In one embodiment, the machine learning model may instruct the device to capture the check image in infrared light, or to change a charge coupled device (CCD) setting of a sensor in the image capture device associated with the computing device. In alternative embodiments, the machine learning model can not only automatically adjust current operating setting of the image capture device of the computing device, it may also change a default operating setting for a similar environmental setting (e.g. a low light environment) for a future image capture session.

In embodiments where the image capture device consists of a camera with multiple lenses or multiple cameras as noted previously, the processor of the user's computing device 109 may execute downloaded instructions to assist with check edge detection/corner identification, via a trained machine learning model or a discrete algorithm, by adding in the factor of depth perception available from simultaneously captured images from the multiple cameras that are separately positioned as the image capture device.

The use of multiple camera lenses/multiple cameras as the image capture device on a single computing device 109 can not only increase the detail provided on the checks themselves to improve the processing and accuracy of data pulled from the images, but can enhance security. In one implementation, the computing device 109 can use different information acquired by each lens of the same check to better identify/authenticate the user of the user device. As one example, the rotational angle and distance of each lens to the check during image capture of the check maybe used to determine a more precise angle of the user device to the check. This information may then, in turn be used in a deterministic algorithm or a machine learning model to compare to prior measurements of user device angle of rotation and distance from a check typically measured for that user. The multiple camera lens image capture device information may be used in combination with, or separately from, other user identifiable information entered into or gathered by the computing device. User entered data may include name, password, biometric, token or other direct verification information. This information may be combined with Global Positioning System (GPS) location information and sensed user information, such as how the computing device is being held via the multiple camera lenses, to modify a confidence level that the user is who he or she claims to be.

Deposit suspension actions, or additional verification tasks, may be triggered at the computing device when one of more of the verification criteria do not match expectations of the system for a given user. If one of more the rotational angle or distance measurements do not result in the computing device being held in a manner expected for that particular user, then an additional authentication step may be triggered at the computing device 109 and any further deposit processing stopped. For example, the processing circuitry may execute an application running on the computing device 109 that suspends check processing for that image until an additional authentication step (e.g. user is presented with an additional authentication challenge question, or an additional biometric assessment or measurement is requested) is successfully completed. Alternatively, a machine learning user verification model may be implemented that has been trained to assess all of the available user-entered and device-sensed parameters and automatically allow a deposit transaction to proceed when enough of the parameters provide a threshold confidence level of user authenticity.

The machine learning model may implement different levels of verification according to predetermined transaction risk levels. For example, the computing device may only utilize the rotational angle and/or distance measurements from each lens to recognize a particular user's usage pattern of the computing device when an amount of the check deposit is above a minimum amount. In this manner higher fraud risk transactions will trigger the user device usage pattern measurement and lower fraud risk (e.g. lower transaction amounts) will not trigger the elevated user verification mechanism. Computing device 109 processing resources and power usage may thus be reduced except for when higher risk transactions are involved.

Other implementations of a multiple camera lens image capture device may include examining details of the check the user plans to deposit to verify user-specific features. In this embodiment, the user-specific aspects of the check to be deposited may can be relied on alone, or in combination with other user verification methods, such as the device orientation pattern noted above, to verify a user or strengthen the collection of user verification parameters used to verify the user of the computing device. Rather than utilizing the various different perspectives of the multiple lenses to identify a way a user is holding the user device, the multiple camera lenses can take a more critical look at the check to be deposited to identify bends, creases, folds or tears in the check that match a pattern of those parameters found in prior checks deposited by that user. As one example, a machine learning model may be trained from past deposits from the user to look for a location of creases in a check representing a fold pattern in checks that the particular user puts in checks he or she deposits (e.g. from a habit of folding a check in a certain way, placing it in a wallet, and then later unfolding it for a remote deposit operation). As another example of check condition parameters that may be used to identify the user via a trained machine learning model, the multiple lens image capture device may be used to acquire information on the depth of the indentations made by the user's signature endorsing the check, the color and content of the ink used in the signature, the positioning of the endorsement signature and the endorse, endorsement signature itself. One or more of these pieces of information may be applied to a trained machine learning that will either permit a deposit transaction to move forward, or will interrupt and pause the deposit process for additionally authentication instructions to be displayed to the user and acted on before further processing is permitted.

In addition to the computing device usage and distinguishing check characteristics that may be tracked to determine or verify the user of the computing device, the background surrounding the check in the captured image may be used to verify authenticity of a user and raise the confidence level that a transaction is not fraudulent. Assuming a user typically deposits checks from a limited number of locations (e.g. kitchen counter or desk at home), then a same background or set of different backgrounds surrounding the check can be expected for deposits from the user. In one implementation, the image processing engine 120 of the computing device 109 may include in its machine learning model repository 129, or download from a remote server, a trained machine learning user verification model that identifies one or more of the device usage patterns, check feature patterns or background patterns of image capture transactions for a particular user. With respect to use of background patterns to verify user identity, a multi-camera lens image capture device may not only capture the overall pattern of the background, but may determine texture (e.g., wood grain, surface roughness or carpet fiber texture) and finer light quality details (content of light spectrum of lighting in area where image is being captured, amount or direction of types of lighting that may be analyzed in the trained machine learning model to verify a user or at least a trusted location that is being used for the user's deposit activities. This background determination, via a trained machine learning model established from that user's past deposits, may provide another layer of verification that the deposit transaction is from a legitimate source.

The features of how a computing device is being held or operated, where the computing device is located, and of the user treatment of the check to be deposited, may be the focus of separate of combined trained machine learning models that execute on the computing device or remotely via data provided by the computing device. Each user may have a separate account stored locally on the user computing device, at a financial institution server, or in cloud storage that stores previously captured checks and images from that user that is used to build a history for that user and that may be used to train a machine learning/artificial intelligence-type model to profile the user for authentication and fraud prevention in future remote deposit transactions.

In alternative embodiments, the computing device may also use the trained machine learning model(s) related to user verification to switch transaction modes from a check deposit transaction to a different transfer format. In one implementation, the computing device may search for the availability of another funds transfer mechanism to substitute for the more rigorous check deposit process. As one example, a person-to-person (P2P) transaction that bypasses typical check clearance and other check deposit procedures may be automatically investigated by the computing device. For example, if enough of the authentication/verification parameters have been satisfied in a predetermined number of transactions for the user, the computing device may automatically use the data gathered from the current check image to trigger a P2P transaction from the payor bank to the payee bank rather than proceed with a check deposit transaction. In this embodiment, the current image captured by the computing device may use the heightened authenticity scrutiny available from processing the check image captured (e.g. via the multiple camera lens image capture device) through the one or more machine learning models trained with user specific data on device usage, check features and/or background parameters. If the current image meets the authenticity and user verification threshold, and the user has met a threshold number of prior check deposit transactions also satisfying the authenticity and user verification tests, then the computing device may either automatically contact the payor and payee banks to initiate a P2P transaction, or it may interrupt the current check deposit operation to query the user, via the display of the computing device, regarding whether to proceed with a check deposit or to instead switch the transaction to a P2P transaction.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be spread across a plurality of devices. Such devices might include personal computers, network servers, and handheld devices, for example.

Various implementations have been specifically described. However, other implementations that include a fewer, or greater, number of features for each of the apparatuses, methods, or other embodiments described herein are also possible.

What is claimed is:

1. A portable computing device, comprising:
a processor;
memory; and
instructions stored on the computer-readable medium, the instructions configured to, when executed by the processor, cause the processor to:
capture a digital check image depicting a check;
input the data from the captured digital check image into a trained machine learning image cropping model to determine a plurality of edge coordinates corresponding to the check depicted in the digital check image;
detect a check image included in the digital check image based on the plurality of edge coordinates;
generate a digital image file including the digital check image and the edge coordinates; and
transmit the digital image file to a remote server for deposit.

2. The computing device of claim 1, wherein the instructions are configured to, when executed by the processor, further cause the processor to:
remove the background image from the digital check image by cropping the digital check image based on the edge coordinates determined by the trained machine learning model.

3. The computing device of claim 1, wherein the instructions are configured to, when executed by the processor, further cause the processor to generate the digital image file to include check data received via user input.

4. The computing device of claim 1, wherein the instructions are configured to, when executed by the processor, further cause the processor to:
input the data from the captured digital check image into a trained machine learning image denoising model;
remove handwriting from printed text on the check depicted in the digital check image based on an output of the trained machine learning image denoising model.

5. The computing device of claim 1, wherein the instructions are configured to, when executed by the processor, further cause the processor to:
input the data from the captured digital check image into a trained machine learning image dewarping model;
obtain a coordinate conversion map for dewarping the check depicted in the digital check image based on an output of the trained machine learning image dewarping model.

6. The computing device of claim 5, wherein the instructions are configured to, when executed by the processor, further cause the processor to:
input the data from the captured digital check image into a trained machine learning duplicate model, wherein the trained machine learning duplicate check model comprises a perceptual hash trained model;
when the trained machine learning duplicate model is stored on the portable computing device, prevent transmission of the data from the captured check to the remote server in response to a determination by the trained machine learning duplicate model that the check depicted in the digital check image based is a duplicate check.

7. The computing device of claim 4, wherein the instructions are configured to, when executed by the processor, further cause the processor to:
input the data from the captured digital check image, after removing the handwriting from the printed text based on an output of the trained machine learning image denoising model, into a trained machine learning image dewarping model;
obtain a coordinate conversion map for dewarping the check depicted in the digital check image based on an output of the trained machine learning image dewarping model.

8. A portable computing device, comprising:
a processor;
a memory; and
wherein the processor is configured to:
download an app for performing image processing on, and remotely depositing to an institution, a digital check image of a check, wherein the downloaded app comprises a trained machine learning model for executing a first image processing task:
control, using the downloaded app, an image capture device associated with the portable computing device to capture the digital check image;
input, using the downloaded app, the captured digital check image into the trained machine learning model to modify the digital check image in accordance with the first image processing task;
process the modified digital check image, using the downloaded app, with a deterministic algorithm to execute a second image processing task that is different from the first image processing task;
transmit the modified and processed digital check file to a remote server for deposit.

9. The portable computing device of claim 8, wherein the trained machine learning model for executing the first image processing task comprises an image cropping model configured to cause the processor of the portable computing device to remove a background image from the digital check image by cropping the digital check image based on edge coordinates determined by the trained machine learning model.

10. The portable computing device of claim 8, wherein the trained machine learning model for executing the first image processing task comprises an image demorphing model configured to cause the processor of the portable computing device to remove a skew from the digital check image.

11. The portable computing device of claim 10, wherein the image demorphing model causes the processor to generate a spatial transformation matrix to apply to the digital check image.

12. The portable computing device of claim 8, wherein the trained machine learning model for executing the first image processing task comprises a denoising model configured to cause the processor of the portable computing device to remove handwritten marks from overlapping printed text in the digital check image.

13. The portable computing device of claim 8, wherein the portable computing device comprises a smart phone and image capture device associated with the portable computing device comprises a digital camera.

14. The portable computing device of claim 8, wherein the downloaded app comprises a plurality of trained machine learning models and the processor is configured by the downloaded app to select between two or more trained machine learning models for use in a particular image processing task after determining a state of the captured digital check image.

15. A portable computing device, comprising:
a processor;
a memory; and
wherein the processor is configured to:
   download an app for performing image processing on, and remotely depositing to an institution, a digital check image of a check, wherein the downloaded app comprises a first trained machine learning model;
   control, using the downloaded app, an image capture device associated with the portable computing device to capture the digital check image;
   input, using the downloaded app, the captured digital check image into the first trained machine learning model to identify which of a plurality of second trained machine learning models is a best match for handling an image processing task; and
   based on the determined best match for handling the image processing task, select and execute a second trained machine learning model to modify the captured digital check image.

16. The portable computing device of claim 15, wherein the first trained machine learning model is trained to cause the processor to:
   recognize one of a specific check type or check design type of the captured digital check image; and
   select one of the plurality of second trained machine learning models that is a best match for handling the image processing task based on the check type or check design type.

17. The portable computing device of claim 16, wherein the first trained machine learning model is further trained to cause the processor to:
   recognize at least one environmental factor associated with the captured digital check image, wherein the environmental factor comprises one of a lighting or shadow detection in the captured digital check image; and
   cause the processor to select the one of the plurality of second trained machine learning models based on the recognized environmental factor.

18. The portable computing device of claim 16, wherein the processor is configured to, when the second trained machine learning model determined as the best match for handling the image processing task is not stored in the memory on the portable computing device, download the second trained machine learning model from a remote computer.

19. The portable computing device of claim 15, wherein the first trained machine learning model is further configured to cause the processor to alter a device setting of the portable computing device for an capture operation based on a currently detected environmental condition.

20. The portable computing device of claim 15, wherein the first trained machine learning model is further configured to cause the processor to alter a default device setting of the portable computing device for a future image capture operation after a current image capture operation based on a currently detected environmental condition.

* * * * *